(12) United States Patent
Fukumoto et al.

(10) Patent No.: US 7,292,227 B2
(45) Date of Patent: Nov. 6, 2007

(54) ELECTRONIC DEVICE, VIBRATION GENERATOR, VIBRATION-TYPE REPORTING METHOD, AND REPORT CONTROL METHOD

(75) Inventors: Masaaki Fukumoto, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 634 days.

(21) Appl. No.: 10/110,002

(22) PCT Filed: Aug. 3, 2001

(86) PCT No.: PCT/JP01/06680

§ 371 (c)(1),
(2), (4) Date: Apr. 5, 2002

(87) PCT Pub. No.: WO02/12991

PCT Pub. Date: Feb. 14, 2002

(65) Prior Publication Data

US 2002/0149561 A1    Oct. 17, 2002

(30) Foreign Application Priority Data

Aug. 8, 2000   (JP)   ............................. 2000-240473
Jul. 27, 2001  (JP)   ............................. 2001-228390

(51) Int. Cl.
*G09G 5/00*    (2006.01)
(52) U.S. Cl. .................................... 345/173; 178/18.04
(58) Field of Classification Search ................ 345/156, 345/158, 179, 173, 161, 169; 702/56; 703/7; 715/771, 773; 381/111; 720/624; 700/245; 318/568.11; 361/179, 182; 178/18.04
See application file for complete search history.

(56) References Cited

U.S. PATENT DOCUMENTS 5,528,697 A    6/1996   Saito (Continued)

FOREIGN PATENT DOCUMENTS

CA    2 135 434 A1    5/1995

(Continued)

OTHER PUBLICATIONS

Office Action corresponding to Japanese application JP2001-228390 (and translation).

(Continued)

*Primary Examiner*—Richard Hjerpe
*Assistant Examiner*—Abbas Abdulselam
(74) *Attorney, Agent, or Firm*—Brinker Hofer Gilson and Lione

(57) ABSTRACT

An electronic device drives an oscillatory actuator to cause generation of vibration when it is detected that an operation input to a touch panel or operation key has been received. The electronic device causes, by this vibration, the touch panel and operation key to vibrate in a direction perpendicular to their respective front surfaces. Alternatively, the housing of the electronic device is made to vibrate. Further, the oscillatory actuator has a weight, a support member for supporting the weight to allow it to reciprocate, and connected to the touch panel or housing or other vibratory member of the electronic device, or vibratory member of the base member of the oscillatory actuator in contact with the vibratory member, and a mechanism for imparting a magnetic force or electrostatic force to cause reciprocal movement of the weight.

82 Claims, 53 Drawing Sheets

U.S. PATENT DOCUMENTS

| | | | |
|---|---|---|---|
| 5,600,777 A | 2/1997 | Wang et al. | |
| 5,619,181 A | 4/1997 | Murray | |
| 5,682,132 A | 10/1997 | Hiroyoshi et al. | |
| 5,684,287 A | 11/1997 | Walts | |
| 5,709,219 A * | 1/1998 | Chen et al. | 600/595 |
| 5,894,263 A | 4/1999 | Shimakawa et al. | |
| 5,977,867 A | 11/1999 | Blouin | |
| 6,001,014 A * | 12/1999 | Ogata et al. | 463/37 |
| 6,039,258 A | 3/2000 | Durbin et al. | |
| 6,067,081 A | 5/2000 | Hahlganss et al. | |
| 6,171,168 B1 * | 1/2001 | Jessop | 446/297 |
| 6,211,775 B1 * | 4/2001 | Lee et al. | 340/407.1 |
| 6,448,670 B1 * | 9/2002 | Onodera et al. | 307/10.1 |
| 6,585,595 B1 * | 7/2003 | Soma | 463/36 |
| 6,645,076 B1 * | 11/2003 | Sugai | 463/30 |

FOREIGN PATENT DOCUMENTS

| | | | |
|---|---|---|---|
| CA | 2 258 762 C | | 12/1997 |
| DE | 4323863 | | 1/1995 |
| DE | 4323863 A1 | | 1/1995 |
| DE | 196 38 015 A1 | | 3/1998 |
| EP | 0 957 423 A2 | | 11/1999 |
| JP | 08221173 A | | 8/1996 |
| JP | H8-221173 | | 8/1996 |
| JP | H09-121236 | | 5/1997 |
| JP | 09215251 | * | 8/1997 |
| JP | 10-293644 | | 4/1998 |
| JP | 10-296187 | | 10/1998 |
| JP | H11-018157 | | 1/1999 |
| JP | 11-162277 | | 6/1999 |
| JP | H11-191795 | | 7/1999 |
| JP | H11-197601 | | 7/1999 |
| JP | 11-212725 | | 8/1999 |
| JP | 2000-029661 | | 1/2000 |
| JP | 2000-092163 | | 3/2000 |
| JP | 2000-124970 | | 4/2000 |
| JP | 2000-137576 | | 5/2000 |
| JP | 2000-148393 | | 5/2000 |
| JP | 2000137586 A | | 5/2000 |
| JP | 2000148393 A | | 5/2000 |
| WO | WO92/00559 | | 1/1992 |
| WO | WO93/18475 | | 9/1993 |

OTHER PUBLICATIONS

Office Action corresponding to Japanese application JP2001-228390 (and translation).

* cited by examiner

102

112a

| TOUCH BUTTON | AREA DATA | WAVEFORM DATA |
|---|---|---|
| A | | |
| B | | |
| C | | |
| ⋮ | ⋮ | ⋮ |

| OPERATION INSTRUCTION | WAVEFORM DATA |
|---|---|
| ENTER | |
| CANCEL | |
| CLICK | |
| DRAG | |
| SELECT ICON | |
| DELETE DATA | |
| OPEN FILE | |
| POWER OFF | |
| ⋮ | ⋮ |

| PARAMETER VALUE | WAVEFORM DATA |
|---|---|
| 0~25 | |
| 26~50 | |
| 51~75 | |
| 76~100 | |

112c

112d

| TOUCH BUTTON | AREA DATA | WAVEFORM DATA | |
|---|---|---|---|
| A | | TOUCH OPERATION | |
| | | PRESSING OPERATION | |
| B | | TOUCH OPERATION | |
| | | PRESSING OPERATION | |
| C | | TOUCH OPERATION | |
| | | PRESSING OPERATION | |
| ⋮ | ⋮ | ⋮ | ⋮ |

| AREA DATA | ID INFORMATION OF OSCILLATORY ACTUATORS |
|---|---|
| A1 | 115a |
| A2 | 115b |
| A3 | 115c |
| A4 | 115d |
| A5 | 115a, 115b, 115c, 115d |

995     996

1

ELECTRONIC DEVICE, VIBRATION GENERATOR, VIBRATION-TYPE REPORTING METHOD, AND REPORT CONTROL METHOD

TECHNICAL FIELD

The present invention relates to a user interface and vibration generation mechanism of an electronic device.

BACKGROUND ART

PDAs (personal digital assistants), personal computers, ATMs (automatic teller machines), and other various types of electronic devices have, for example, operation buttons or keyboards, touch panels, and other user interfaces. Users use these user interfaces to perform operation inputs to the electronic equipment, such as inputting words and selecting a processing to be executed.

In the case of a portable electronic device provided with a keyboard or operation buttons, however, keys or operation buttons are of a reduced size, weight, and thickness to conform with an overall reduction in size, weight, and thickness of the device; and, consequently, a user may not be able to feel that a button has been fully depressed. To confirm if depression of keys or operation buttons has been received in a portable electronic device, a user must view contents of a display of a screen of the device.

In the case of an electronic device provided with a touch panel, a user uses his or her fingertip or an attached pen to operate a touch panel. However, if the fingertip or pen is not properly pointed at the touch panel, or the touch panel is not pressed with sufficient force, the operation will be invalid. To confirm whether a touch operation on a touch panel has been received by an electronic device, as in the above case, a user must view contents of the display.

There are other types of electronic devices which report to a user, by way of a beep sound and the like, that an operation input has been received, but such an audio report is almost completely ineffective in a noisy environment such as in a street.

DISCLOSURE OF INVENTION

An object of the present invention is to provide an electronic device, a vibration generator, a vibration-type reporting method, and a report control method enabling a user to easily confirm without viewing a screen receipt of an input operation or a response of the electronic device with respect to an operation input.

To achieve the above object, the present invention provides an electronic device having an operating unit for receiving an operation input, a vibration generator for imparting vibration to a hand-touched portion of the electronic device, and vibration control means for causing the vibration generator to generate vibration when it is detected that an operation input in the operating unit has been received. Further, the present invention provides a vibration-type reporting method for an electronic device whereby a vibration generator provided in the electronic device is caused to vibrate, which vibration is transmitted to a hand-touched portion when it is detected that an operation input to the operating unit is received.

According to the present invention, the electronic device reports to a user that an operation input has been received, by causing the hand-touched portion of the electronic device to vibrate.

Further, the present invention provides an electronic device provided with an operating unit for receiving an operation input, a vibration generator for imparting vibration to the operating unit, and vibration control means for causing vibration from the vibration generator in the case of detecting that an operation input to the operating unit is received, the vibration generator being provided with a weight, a support member supporting the weight to allow it to reciprocate, and connected to the operating unit or a base member of the vibration generator in contact with the operating unit; and excitation generating means for imparting excitation to make the weight reciprocate. Further, the present invention provides a vibration-type reporting method in an electronic device comprising driving a vibration generator provided in the electronic device when it is detected that an operation input to an operating unit is received, and having the vibration generator cause reciprocation of a weight connected to the operating unit or a base member of the vibration generator in contact with the operating unit to cause vibration in the operating unit.

According to the present invention, the electronic device reports to a user that an operation input has been received by causing vibration at the operating unit.

Further, the present invention provides an electronic device provided with an operating unit for receiving an operation input, a vibration generator for imparting vibration to a user, and vibration control means for causing vibration from the vibration generator in the case of detecting that execution of processing instructed by an operation input to the operating unit has ended. Further, the present invention provides a vibration-type reporting method in an electronic device comprising causing vibration from a vibration generator provided in the electronic device to give vibration to the user in the case of detecting that execution of processing instructed by an operation input to the operating unit has ended.

According to the present invention, the electronic device reports to a user by vibration that the execution of processing instructed by operation input has ended.

Further, the present invention provides an electronic device provided with an operating unit for receiving an operation input, a first vibration generator for imparting vibration to the operating unit, a second vibration generator for imparting vibration to a hand-touched portion of the electronic device, and vibration control means for causing vibration from at least one of the first vibration generator and the second vibration generator designated in advance by the user in the case of detecting that an operation input to the operating unit has been received. Further, the present invention provides a vibration-type reporting method in an electronic device comprising causing vibration from at least one of a first vibration generator for imparting vibration to the operating unit and a second vibration generator imparting vibration to a hand-touched portion of the electronic device designated in advance by the user in the case of detecting that an operation input to the operating unit has been received, the first and second vibration generators being provided in the electronic device.

According to the present invention, the electronic device reports to the user that an operation input has been received by causing vibration at a location designated by the user in advance.

Further, the present invention provides an electronic device provided with an operating unit for receiving an operation input, a first vibration generator for imparting vibration to the operating unit, a second vibration generator for imparting vibration to a hand-touched portion of the electronic device, detecting means for detecting whether the electronic device is being held by a user, and vibration control means for selecting at least one of the first vibration generator and the second vibration generator in accordance with the results of detection of the detecting means and causing vibration to be generated from the selected vibration generator in the case of detecting that an operation input to the operating unit has been received. Further, the present invention provides a vibration-type reporting method in an electronic device comprising selecting at least one of a first vibration generator for imparting vibration to an operating unit and a second vibration generator for imparting vibration to a hand-touched portion of the electronic device provided in the electronic device and causing vibration to be generated from the selected vibration generator to give vibration to the user in the case of detecting that an operation input to the operating unit has been received.

According to the present invention, the electronic device reports to the user that an operation input has been received by causing vibration at a different location in accordance with whether the electronic device is being held by the user.

Further, the present invention provides an electronic device provided with a display panel over which a touch panel is superposed, a vibration generator set in the display panel, an elastic member comprised using an elastic body for supporting the display panel in a vibratable manner by vibration generated from the vibration generator, and vibration control means for causing vibration to be generated from the vibration generator in the case of detecting that a touch operation on the touch panel has been received, the vibration generator provided with a weight, a support member supporting the weight so as to allow it to reciprocate, and connected to the display panel or a base member of the vibration generator in contact with the display panel, and excitation generating means for imparting excitation for making the weight reciprocate.

According to the present invention, the electronic device reports to the user that a touch operation has been received by causing vibration at the touch panel together with the display panel.

Further, the present invention provides an electronic device provided with a display panel over which a touch panel is superposed, a vibration generator supporting the display panel and imparting vibration to the display panel, and vibration control means for causing vibration to be generated from the vibration generator in the case of detecting that a touch operation on the touch panel has been received, the vibration generator provided with a weight, a support member supporting the weight so as to allow it to reciprocate, and connected to the display panel or a base member of the vibration generator in contact with the display panel, and excitation generating means for imparting excitation for making the weight reciprocate.

According to the present invention, the electronic device reports to the user that a touch operation has been received by causing vibration at the touch panel together with the display panel.

Further, the present invention provides an electronic device provided with a display, a touch panel covering the display screen of the display, a vibration generator provided between the display and the touch panel, supporting the touch panel on the display screen, and imparting vibration to the touch panel, and vibration control means for causing vibration to be generated from the vibration generator in the case of detecting that a touch operation on the touch panel has been received.

According to the present invention, the electronic device reports to the user that a touch operation has been received by causing the touch panel to vibrate.

Further, the present invention provides an electronic device provided with a display, a touch panel covering a display screen of the display, a vibration generator placed at the touch panel and imparting vibration to the touch panel, a vibration absorbing member provided between the display and the touch panel and absorbing a vibration component which would be transferred to the display in vibration components generated from the vibration generator, and vibration control means for causing vibration to be generated from the vibration generator in the case of detecting that a touch operation on the touch panel has been received.

According to the present invention, the electronic device reports to the user that a touch operation has been received by causing only the touch panel on the display screen to vibrate.

Further, the present invention provides an electronic device provided with an operating unit for receiving an operation input, a vibration generator at least a part of which is provided exposed to the outside from a housing of the electronic device and imparting vibration directly to the user, and vibration control means for causing vibration to be generated from the vibration generator in the case of detecting that an operation input to the operating unit has been received.

According to the present invention, the electronic device reports that a touch operation has been received by directly imparting vibration to the user from the vibration generator.

Further, the present invention provides an electronic device provided with an operating unit for receiving an operation input, a vibration generator for imparting vibration to part of a housing of the electronic device different from the operating unit, and vibration control means for identifying a type of operation input and causing vibration to be generated from the vibration generator by a vibration mode linked with the type of the operation input in the case of detecting that an operation input to the operating unit has been received. Further, the present invention provides a vibration-type reporting method in an electronic device comprising identifying the type of operation input, causing vibration to be generated from a vibration generator provided in the electronic device by a vibration mode linked with the type of the operation input, and causing part of a housing of the electronic device different from the operating unit to vibrate.

According to the present invention, the electronic device reports to the user that an operation input has been received by causing part of the housing different from the operating unit to vibrate by a vibration mode in accordance with the type of the operation input.

Further, the present invention provides an electronic device provided with an operating unit for receiving an operation input, a vibration generator for imparting vibration to part of a housing of the electronic device different from the operating unit, changing means for changing a value of a parameter for controlling the electronic device in accordance with operation input to the operating unit, and vibration control means for causing vibration to be generated from the vibration generator by a vibration mode linked with a value of a parameter changed by the changing means by the operation input in the case of detecting that an operation input on the operating unit changing the value of a parameter has been received.

According to the present invention, the electronic device reports to the user that an operation input changing the value of a parameter has been received by causing part of the housing different from the operating unit to vibrate by a vibration mode in accordance with the changed value of a parameter.

Further, the present invention provides an electronic device provided with an operating unit for receiving an operation input, a vibration generator for imparting vibration to the operating unit, and vibration control means for identifying a type of the operation input and causing vibration to be generated from the vibration generator by a vibration mode linked with the type of the operation input in the case of detecting that an operation input to the operating unit has been received, the vibration generator provided with a weight, a support member for supporting the weight so as to allow it to reciprocate and connected to the operating unit or a base member of the vibration generator in contact with the operating unit, and excitation generating means for imparting excitation for causing reciprocation to the weight. Further, the present invention provides a vibration-type reporting method in an electronic device comprising identifying a type of an operation input and driving a vibration generator provided in the electronic device in the case of detecting that an operation input to an operating unit has been received and having the vibration generator cause the operating unit to vibrate by causing reciprocation in a weight connected to the operating unit or a base member of the vibration generator in contact with the operating unit.

According to the present invention, the electronic device reports to the user that an operation input has been received by causing an operating unit to vibrate by a vibration mode in accordance with the type of the operation input.

Further, the present invention provides an electronic device provided with an operating unit for receiving an operation input, a vibration generator for imparting vibration to the operating unit, changing means for changing a value of a parameter for controlling the electronic device in accordance with operation input to the operating unit, and vibration control means for causing vibration to be generated from the vibration generator by a vibration mode linked with the value of a parameter changed by the changing means by the operation input in the case of detecting that an operation input on the operating unit for changing the value of a parameter has been received, the vibration generator provided with a weight, a support member for supporting the weight so as to allow it to reciprocate, and connected to the operating unit or a base member of the vibration generator, and excitation generating means for imparting excitation for causing the weight to reciprocate.

According to the present invention, the electronic device reports to the user that an operation input changing a value of a parameter has been received by causing an operating unit to vibrate by a vibration mode in accordance with the changed value of a parameter.

Further, the present invention provides an electronic device provided with an operating member for causing a value of a parameter for controlling the electronic device to change continuously, a vibration generator for imparting vibration to a user, changing means for changing the value of a parameter based on an amount of operation of the operating member, and vibration control means for causing vibration to be generated from the vibration generator by a vibration mode linked with a value of a parameter changed by the changing means by the operation in the case of detecting that an operation input of the operating member has been received.

According to the present invention, the electronic device reports to the user that operation of the operating member continuously changing the value of a parameter has been received by a vibration mode in accordance with the changed value of a parameter.

Further, the present invention provides an electronic device provided with an operating unit for receiving an operation input and detecting a level of pressure of the operation input, a vibration generator for imparting vibration to a user, and vibration control means for causing vibration to be generated from the vibration generator by a vibration mode linked with the level of pressure of the operation input detected by the operating unit in the case of detecting that an operation input to the operating unit has been received.

According to the present invention, the electronic device reports to the user that an operation input has been received by a vibration mode in accordance with the level of pressure of the operation input.

Further, the present invention provides an electronic device provided with an operating unit for receiving an operation input, sound producing means for imparting an audio report to a user, a vibration generator for imparting vibration to the user, and report control means for reporting to the user that an operation input has been received using at least one of the sound producing means and the vibration generator designated by the user in advance in the case of detecting that an operation input to the operating unit has been received. Further, the present invention provides a report control method in an electronic device comprising reporting to a user that an operation input has been received using at least one of sound producing means for imparting an audio report to the user and a vibration generator imparting vibration to the user designated by the user in advance in the case of detecting that an operation input to the operating unit has been received, the sound producing means and the vibration generator being provided in the electronic device.

According to the present invention, the electronic device reports to the user that an operation input has been received by vibration or sound designated by the user in advance.

Further, the present invention provides an electronic device provided with an operating unit for receiving an operation input, sound producing means for imparting an audio report to a user, a vibration generator for imparting vibration to the user, measuring means for measuring a sound level of surroundings of the electronic device, and report control means for selecting at least one of the sound producing means and the vibration generator based on measurement results of the measuring means and reporting to the user that an operation input has been received using the selected one in the case of detecting that an operation input to the operating unit has been received. Further, the present invention provides a report control method in an electronic device comprising selecting at least one of sound producing means for imparting an audio report to a user and a vibration generator for imparting vibration to the user, provided in the electronic device, based on the measurement results of measuring means for measuring the sound level of surroundings of the electronic device and reporting to the user that an operation input has been received using the selected one in the case of detecting that an operation input to the operating unit has been received.

According to the present invention, the electronic device reports to the user that an operation input has been received by vibration or sound in accordance with the sound level of surroundings of the electronic device.

Further, the present invention provides an electronic device provided with an operating unit for receiving an operation input, sound producing means for imparting an audio report to a user, a vibration generator for imparting vibration to the user, receiving means for receiving a signal designating at least one of the sound producing means or a vibration generator from a base station covering an area in which the electronic device is located, and report control means for reporting to the user that an operation input has been received using at least one of the sound producing means or the vibration generator designated by a signal received from the receiving means in the case of detecting that an operation input to the operating unit has been received. Further, the present invention provides a report control method in an electronic device comprising reporting to a user that an operation input has been received using at least one means designated by a signal received from a base station covering an area in which the electronic device is located from among sound producing means imparting an audio report to the user and vibration generator imparting vibration to the user, provided in the electronic device, in the case of detecting that an operation input to the operating unit is received.

According to the present invention, the electronic device reports to the user that an operation input has been received by vibration or sound in accordance with an instruction from a base station covering an area in which the electronic device is located.

Further, the present invention provides an electronic device provided with an operating unit for receiving an operation input, a vibration generator able to give vibration to a user and simultaneously cause the generation of sound, and drive control means for combining a drive signal for driving the vibration generator to cause generation of vibration and an audio signal for driving the vibration generator to cause generation of sound and applying the combined signal to the vibration generator in the case of causing generation of vibration and sound from the vibration generator in the case of detecting that an operation input to the operating unit has been received. Further, the present invention provides a vibration-type reporting method in an electronic device comprising combining a drive signal for driving the vibration generator to cause generation of vibration and an audio signal for driving the vibration generator to cause generation of sound and using the combined signal to drive the vibration generator to give vibration to a user and simultaneously cause the generation of sound in the case of causing generation of vibration and sound from a vibration generator provided in the electronic device in the case of detecting that an operation input to the operating unit has been received.

According to the present invention, the electronic device reports to the user that an operation input has been received by vibration using a vibration generator and causes sound, based on the audio signal, to be generated from the vibration generator.

Further, the present invention provides an electronic device provided with an operating unit for receiving an operation input, sound producing means for imparting an audio report to a user, a vibration generator for imparting vibration to the user, acquiring means for acquiring location information of the electronic device, and report control means for selecting at least one of the sound producing means and the vibration generator based on location information acquired by the acquiring means and using the selected means to report to the user that an operation input has been received in the case of detecting that an operation input to the operating unit has been received. Further, the present invention provides a report control method in an electronic device comprising selecting at least one of sound producing means for imparting an audio report to a user and a vibration generator for imparting vibration to the user, provided in the electronic device, based on location information of the electronic device and using the selected means to report to the user that an operation input has been received in the case of detecting that an operation input to the operating unit has been received According to the present invention, the electronic device reports to the user that an operation input has been received by vibration or sound in accordance with the current location of the electronic device.

Further, the present invention provides an electronic device provided with an operation panel for receiving a touch operation, a plurality of vibration generators for imparting vibration to the operation panel, detecting means for detecting a touched position on the operation panel, and vibration control means for selecting at least one of the plurality of vibration generators based on a touched position of the touch operation detected by the detecting means and causing generation of vibration from the selected vibration generator in the case of detecting that a touch operation to the operation panel has been received. Further, the present invention provides a vibration-type reporting method in an electronic device comprising detecting a touched position, selecting at least one of a plurality of vibration generators provided in the electronic device based on a touched position, and causing generation of vibration from the selected vibration generator in the case of detecting that a touch operation to the operation panel has been received.

According to the present invention, the electronic device switches the vibration generators driven in accordance with a touched position in the case of reporting to the user by vibration that a touch operation has been received.

Further, the present invention provides an electronic device provided with an operation panel for receiving a touch operation, a plurality of vibration generators for imparting vibration to the operation panel, detecting means for detecting a touched position at the operation panel, generating means for generating drive signals for driving the plurality of vibration generators so that an amplitude of vibration caused at a touched position of the touch operation detected by the detecting means is increased due to mutual interference of oscillatory waves generated from the plurality of vibration generators in the case of detecting that a touch operation on the operation panel has been received, and vibration control means for applying drive signals generated by the generating means to the vibration generators to cause vibration to be generated from the vibration generators. Further, the present invention provides a vibration-type reporting method in an electronic device comprising detecting a touched position and generating drive signals for application to a plurality of vibration generators to drive the vibration generators to give vibration to the user so that an amplitude of vibration caused at a touched position of the operation panel is increased due to mutual interference of oscillatory waves generated from the plurality of vibration generators provided in the electronic device in the case of detecting that a touch operation to an operation panel has been received.

According to the present invention, the electronic device increases the amplitude of the vibration generated at a touched position on the operation panel by mutual interference of oscillatory waves generated from the vibration generators in the case of reporting to the user that a touch operation has been received by causing generation of vibration from the plurality of vibration generators.

Further, the present invention provides an electronic device provided with an operation panel over which a deformation layer able to deform by vibration is superposed, a plurality of vibration generators each imparting vibration to the operation panel, detecting means for detecting a touched position on the operation panel, generating means for generating drive signals for driving the plurality of vibration generators so that the thickness of the deformation layer at a touched position of the touch operation detected by the detecting means becomes thinner or thicker than that at the time of non-touching due to mutual interference of oscillatory waves generated from the plurality of vibration generators, and vibration control means for applying drive signals generated by the generating means to corresponding vibration generators and causing vibration to be generated from the vibration generators.

According to the present invention, the electronic device makes the thickness of a deformation layer of a touched position on the operation panel thinner or thicker than that at the time of non-touching by mutual interference of oscillatory waves generated from the vibration generators in the case of reporting to the user that a touch operation has been received by causing vibration to be generated from a plurality of vibration generators.

Further, the present invention provides a vibration generator provided with a weight, a support member for supporting the weight to be able to linearly reciprocate and connected to a vibratory member to which the vibration generator imparts vibration, or a base member of the vibration generator in contact with the vibratory member, excitation generating means for imparting excitation to cause reciprocation at the weight, and resistance imparting member for continually contacting a side surface parallel to a direction of reciprocation of the weight linearly reciprocating by excitation generated from the excitation generating means and imparting contact resistance to the weight.

According to the present invention, in the case that the generation of excitation from the excitation generating means stops, the reciprocation of the weight quickly stops due to contact resistance.

Further, the present invention provides a vibration generator provided with a weight, a support member for supporting the weight to be able to reciprocate and connected to a vibratory member given vibration by the vibration generator or a base member of the vibration generator in contact with the vibratory member, excitation generating means for imparting excitation for causing reciprocation to the weight, and brake means for contacting the weight and causing reciprocation of the weight to stop in the case that the generation of excitation from the excitation generating means has stopped.

According to the present invention, the brake means causes the reciprocation of the weight to immediately stop in the case that generation of excitation from the excitation generating means has stopped.

BRIEF DESCRIPTION OF THE DRAWINGS

FIG. 40 is a view illustrating a waveform data table stored in a memory in a PDA according to the second example of this embodiment.

BEST MODE FOR CARRYING OUT THE INVENTION

Next, embodiments of the present invention will be explained. These embodiments show some aspects of the present invention. They do not limit the invention and can be changed as desired within the scope of the present invention.

[A: First Embodiment]
[A-1: Configuration of First Embodiment]

Figure 1:
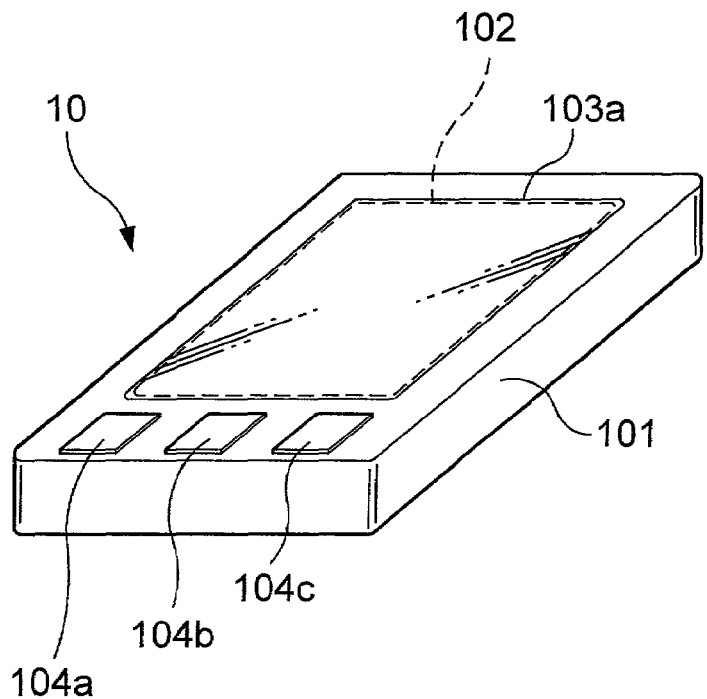
FIG. 1 is a perspective view illustrating the appearance of a PDA according to a first embodiment of the present invention.

FIG. 1 is a perspective view illustrating the appearance of a PDA 10 according to a first embodiment of the present invention. In the figure, a transparent touch panel 102 is overlaid on a display screen of a liquid crystal display panel 103a covering an opening of a main case 101. A user inputs operation instructions to the PDA 10 by touching the touch panel 102 by his or her fingertip. Note that the touch operation on the touch panel 102 may also be of a mode using a pen or other operation tools. Further, the top surface of the main case 101 is provided with push-button type operation keys 104a, 104b, and 104c for inputting operation instructions to the PDA 101 such as for turning the main power on or off.

Figure 2:
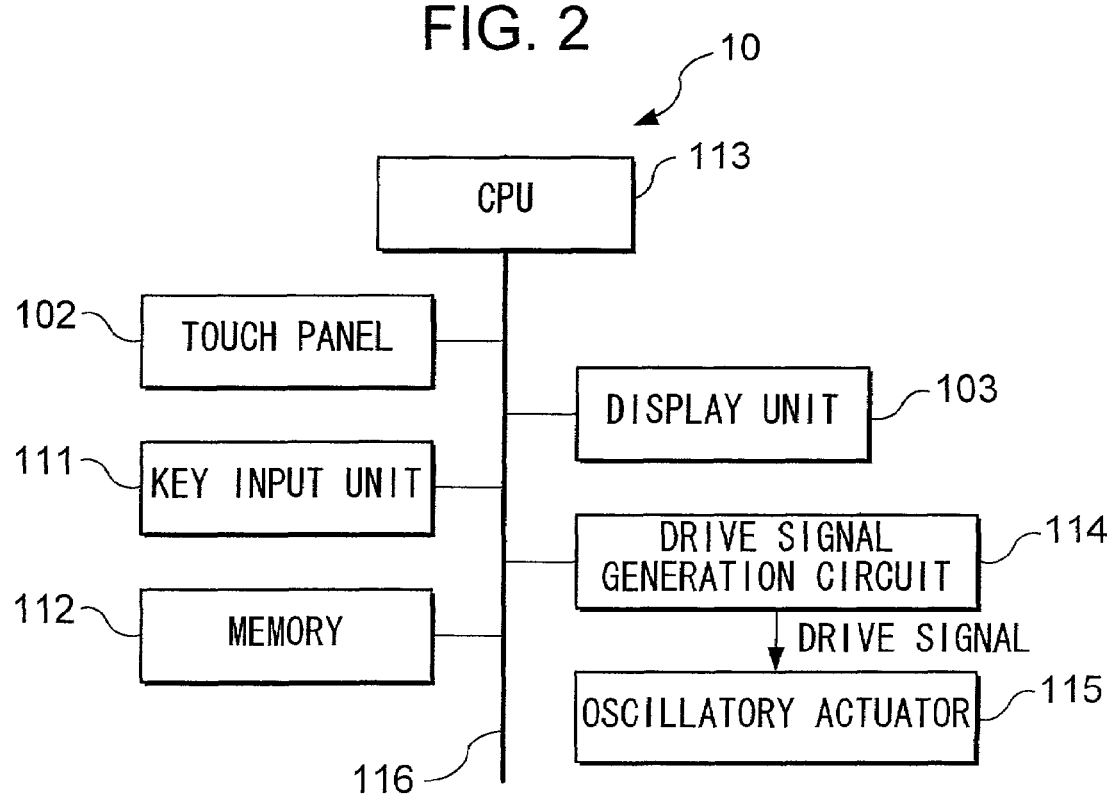
FIG. 2 is a block diagram illustrating a hardware configuration of a PDA according to the embodiment.

Next, FIG. 2 is a block diagram illustrating the hardware configuration of the PDA 10 shown in FIG. 1. As shown in this figure, the PDA 10 has a touch panel 102, a display unit 103, a key input unit 111, a memory 112, a CPU (central processing unit) 113, a drive signal generation circuit 114, and an oscillatory actuator 115.

The touch panel 102 outputs a signal showing a touched position on the touch panel 102 (hereinafter called a "touch signal") to the CPU 113 in response to a touch operation. Further, the display unit 103 has a liquid crystal display panel 103a and a drive circuit for controlling the display of the liquid crystal display panel 103a. The key input unit 111 outputs, to the CPU 113, a key operation signal in response to the pressing operation of the operation keys 104a to 104c by the user. The memory 112 stores programs, data, etc. for controlling the PDA 10. Further, the memory 112 stores waveform data of the drive signal for driving the oscillatory actuator 115.

The CPU 113 executes a program stored in the memory 112 to control the parts of the device interconnected through a bus 116. This CPU 113 executes a vibration control processing 1 (see FIG. 5). Upon detection of an operation input from the touch panel 102 or any one of operation keys 104a to 104c, it drives the oscillatory actuator 115 through the drive signal generation circuit 114 to cause the touch panel 102 or one of the operation keys 104a to 104c to vibrate.

The drive signal generation circuit 114 generates a drive signal for driving the oscillatory actuator 115 in accordance with waveform data supplied from the CPU 113. Further, the drive signal generation circuit 114 applies a drive signal to the oscillatory actuator 115 in accordance with instructions from the CPU 113.

The oscillatory actuator 115 is a linear oscillatory actuator of a so-called moving permanent magnet type which uses a permanent magnet as a movable weight (weight) and causes the movable weight to linearly reciprocate by electromagnetic force to cause generation of vibration. The oscillatory actuator 115 is driven by a drive signal applied from the drive signal generation circuit 114 and generates vibration.

Figure 3:
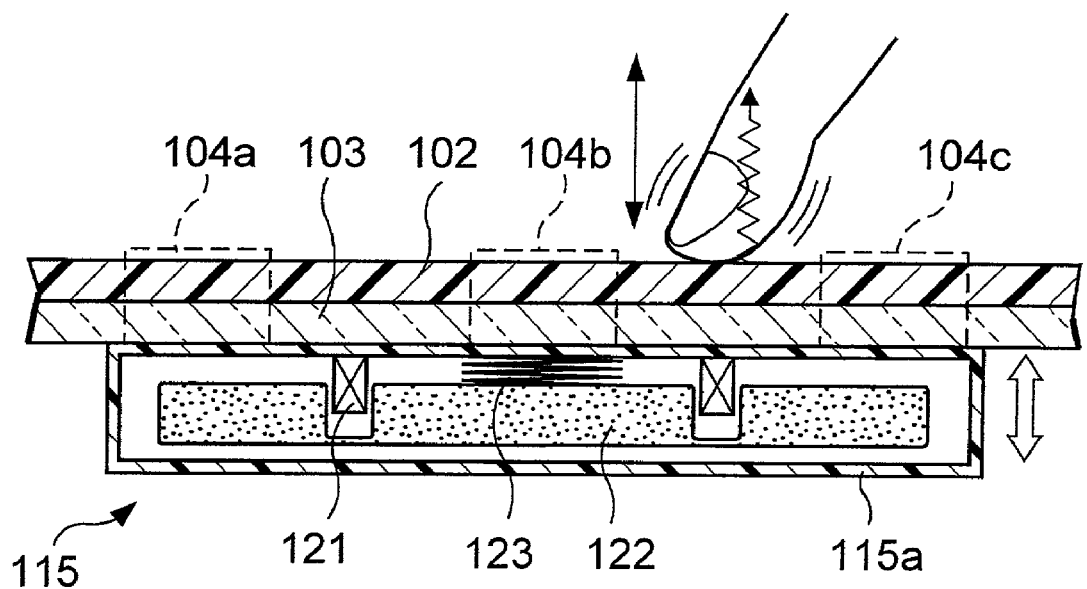
FIG. 3 is a sectional view schematically illustrating a state of placement of an oscillatory actuator in the main case of the PDA according to this embodiment.

FIG. 3 is a sectional view schematically illustrating a state of placement of the oscillatory actuator 115 in the main case 101 of the PDA 10. As shown in the figure, the top surface of the case 115a of the oscillatory actuator 115 is in contact with the liquid crystal display panel 103a and operation keys 104a to 104c. Further, the case 115a of the oscillatory actuator 115 is provided inside it with a cylindrical coil 121 fixed to the top surface of the case 115a, a columnar movable weight 122 made of permanent magnet and having an annular space in which the coil 121 fits, and a spring 123 for supporting the movable weight 122.

Note that the case 115a of the oscillatory actuator 115 is sealed and functions as a magnetic shield. The function as such a magnetic shield is given to the case 115a by, for example, forming the case 115a by a conductive substance and grounding it or making it the same potential. Alternatively, the case 115a may be made of a magnetic member having a high-permeability.

The movable weight 122 is supported by the spring 123 in a state where the weight 122 is able to linearly reciprocate in the vertical direction in the figure in the space formed inside the case 115a of the oscillatory actuator 115. The spring 123, as shown in FIG. 3, is connected at one end to the case 115a (base member) that is in contact with the liquid crystal display panel 103a and operation keys 104a to 104c and is connected at its other end to the movable weight 122. Note that a plurality of springs 123 may also be provided. Further, instead of the spring 123, it is also possible to use a support member formed using an elastic body such as a rubber band.

The movable weight 122 linearly reciprocates in the vertical direction in the figure by the magnetic force generated from the coil 121 when an AC (alternating) current (drive signal) is applied to the coil 121. By the counter force of the reciprocation of the movable weight 122, vibrational acceleration occurs at the portion of the case 115a to which the spring 123 is connected. Note that the portion of the case 115a to which the spring 123 is connected receives a vibration component transmitted from the movable weight 122 through the spring 123 in addition to the counter force of the reciprocation along with the reciprocation of the movable weight 122. The principle of generation of vibration by the oscillatory actuator 115 is however based on the use of the vibrational acceleration occurring by a counter force of the reciprocation of the movable weight 122.

Due to this vibrational acceleration, vibration is transmitted to the liquid crystal display panel 103a and the operation keys 104a to 104c. The direction of the vibration is a direction perpendicular to the front surface of the touch panel 102 and matches with the direction by which the user presses the touch panel 102 or any one of the operation keys 104a to 104c and its opposite direction. Due to this, the touch panel 102 and the operation keys 104a to 104c vibrate in a direction perpendicular to the front surface of the touch panel 102 and vibration is transmitted to the fingertip of the user performing the operation input.

Note that the oscillatory actuator 115 shown in FIG. 3 is sealed by the case 115a having an anti-magnetic effect, but it is also possible that it not be sealed by this case 115a. Further, the spring 123 supporting the movable weight 112 may also be connected directly to the rear surface of the liquid crystal display panel 103 rather than to the case 115a.

Using an oscillatory actuator 115 integrally packaged in this way has the following advantages. That is, in the case of using an oscillatory actuator which is not integrally packaged, it is necessary to divide members of the oscillatory actuator into those to be placed at the rear surface of the liquid crystal display panel on which the touch panel is laid and those to be placed at the main body of the electronic device supporting the liquid crystal display panel. For example, it is necessary to place the permanent magnet at the rear surface of the liquid crystal display panel while placing the coil at a position facing the permanent magnet at the main body side of the electronic device.

In such a case, if the accuracy in mounting the divided members is low or deteriorates due to the aging, the vibration of the touch panel is immediately led to malfunction; and it becomes difficult to have the touch panel to vibrate with a stable degree of accuracy. Further, because the number of parts is large, and also because an alignment between the permanent magnet and the coil is required, the assembly work of the electronic device becomes complicated. As a result, the cost of the product turns out expensive correspondingly.

Further, in the case of placing the members of the oscillatory actuator separately as in the above, to enable efficient vibration of the touch panel, the support members of the electronic device supporting the liquid crystal display panel such as the main body and the case must be firmly fixed; alternatively, the mass of the support members have to be made sufficiently large compared with the liquid crystal display panel. Therefore, such a separate placement of the oscillatory actuator is not suitable for a light weight electronic device or portable electronic device.

As opposed to this, in the case of using an integrally packaged oscillatory actuator 115, the movable weight 122 (permanent magnet) and the coil 121 are housed inside the case 115a in advance. Therefore, there is little possibility of causing the accuracy problem in mounting the permanent magnet and the coil. Further, compared with the separate placement, there is less probability of the mounting accuracy of the permanent magnet and the coil being deteriorated due to the aging. Thus, it is possible to cause the touch panel 102 to vibrate with a stable degree of accuracy. Further, it is sufficient to mount the integrally packaged oscillatory actuator 115 to a member desired to be caused to vibrate such as the rear surface of the liquid crystal display panel 103a. The process of the assembly work of the electronic device can therefore be simplified.

Further, the oscillatory actuator 115 gives the liquid crystal display panel 103a to which the movable weight 122 is connected the vibration occurring by a counter force of the reciprocation by causing reciprocation at the movable weight 122 supported in the air. Therefore, even when the support members of the PDA 10 such as the main body and the main case 101 are not firmly fixed or when the mass of the support member is not sufficiently large compared with the liquid crystal display panel 103a, the oscillatory actuator 115 can give a sufficiently large vibration to the liquid crystal display panel 103a etc. This is particularly suitable for use in a light weight electronic device or a portable electronic device.

Note that when an audio signal of audible band is applied to the coil 121 of the oscillatory actuator 115, the case 115a of the oscillatory actuator 115 or the main case 101 of the PDA 10 at which the oscillatory actuator 115 is placed, for example, is caused to vibrate, thereby creating a sound in accordance with the audio signal. That is, it is also possible to use the oscillatory actuator 115 as a sound source. In this case, it is desirable to use the liquid crystal display panel 103a or the main case 101 etc., as a sound amplification mechanism, to which vibration generated by the oscillatory actuator 115 in accordance with application of the audio signal is transmitted, thereby increasing the volume of the sound generated at the oscillatory actuator 115. If the oscillatory actuator 115 is used as both a vibration generator and a sound source in this way, it is possible to greatly reduce the space taken up by the components in compact electronic devices such as a mobile phone and a pager. In the case of using the oscillatory actuator 115 as a sound source, it is possible to provide sound amplification mechanism such as a paper cone or horn at the inside or outside of the oscillatory actuator 115.

Figure 4:
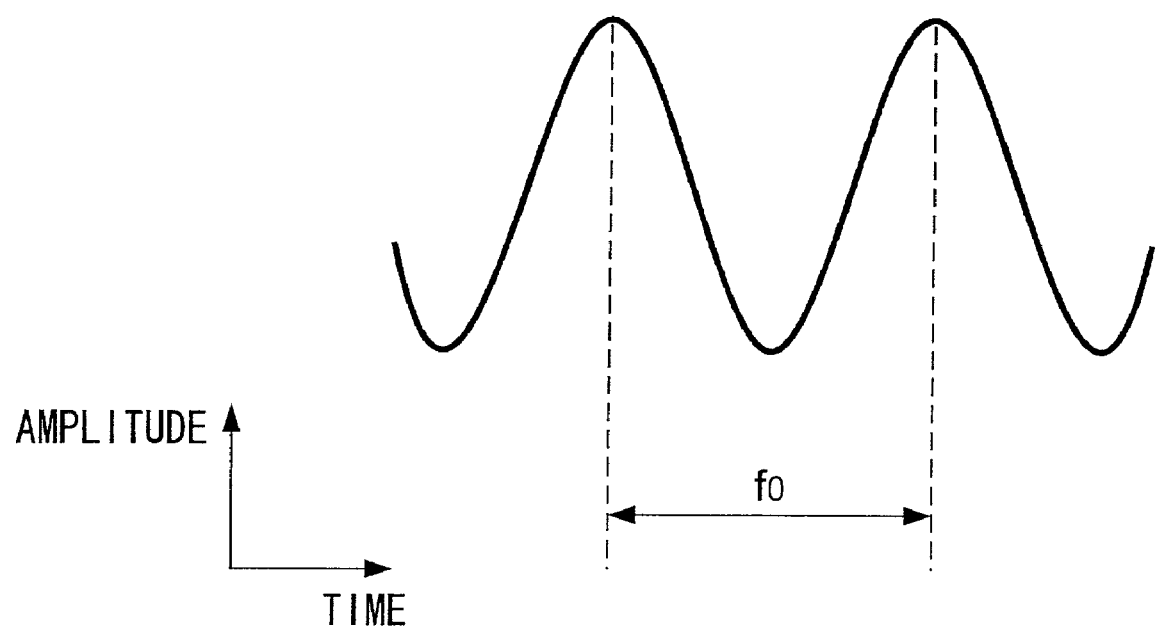
FIG. 4 is a view illustrating a waveform of a drive signal applied to the oscillatory actuator according to this embodiment.

Next, FIG. 4 is a view illustrating a waveform of a drive signal applied to the oscillatory actuator 115. In the figure, the frequency $f_0$ of the drive signal applied to the coil 121 of the oscillatory actuator 115 is made to match with the natural frequency $f_1$ of the main case 101 of the PDA 10 or the natural frequency $f_2$ of the oscillatory actuator 115 itself. Applying a drive signal of such a frequency $f_0$ to the coil 121 causes the main case 101 or the oscillatory actuator 115 of the PDA 10 to resonate, thereby imparting larger vibration to the user using small drive power. That is, it is possible to reduce the power consumption of the PDA 10. Such frequency data or amplitude data etc. is stored in the memory 112 as the waveform data of the drive signal.

Note that the frequency $f_0$ of the drive signal may also be set so that a frequency which is an integral multiple of the frequency $f_0$ corresponds to the natural frequency $f_1$ or natural frequency $f_2$. It is possible to cause the main case 101 or the oscillatory actuator 115 of the PDA 10 to resonate even with such a frequency $f_0$. Further, it should be understood that the waveform of the drive signal is not limited to the SIN wave illustrated in FIG. 4 but may also be a square wave, trapezoidal wave, triangular wave, and the like.

[A-2: Operation of First Embodiment]

Figure 5:
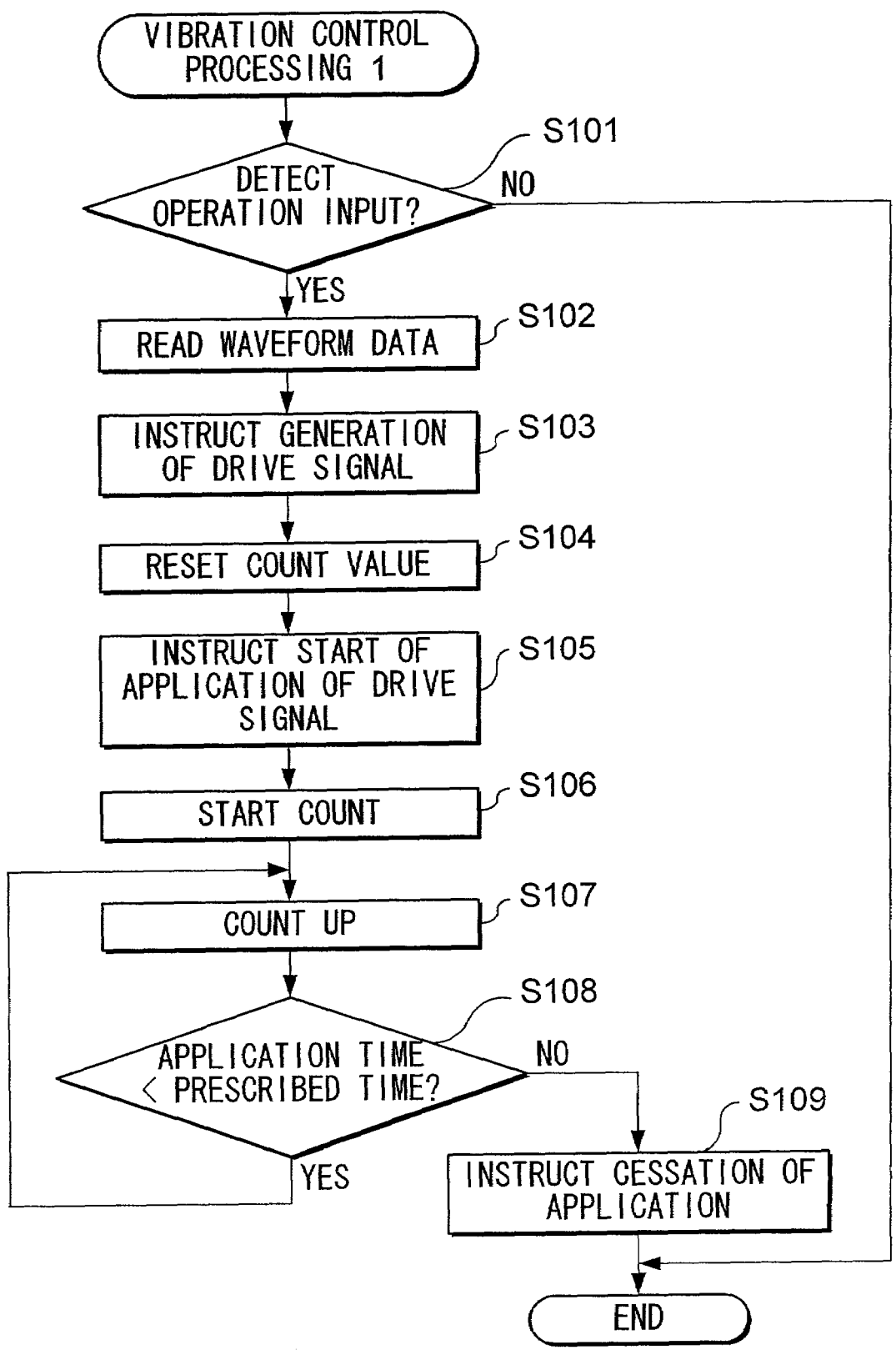
FIG. 5 is a flow chart for explaining the operation of a vibration control processing 1 executed by a CPU in the PDA according to this embodiment.

FIG. 5 is a flow chart explaining the operation of a vibration control processing 1 executed by the CPU 113 in the PDA 10 according to this embodiment. The vibration control processing 1 is executed by the CPU 113 at every predetermined period in a period where an operation input to the touch panel 102 or the operation keys 104a to 104c is permitted.

As shown in the figure, first, the CPU 113 determines whether a touch signal has been input from the touch panel 102 and whether a key operation signal has been input from the key input unit 111 (step S101). When the CPU 113 determines that neither the touch signal nor key operation signal has been input, it ends the vibration control processing 1. On the other hand, when the CPU 113 determines that at least one of the touch signal or key operation signal has been input, it first reads from the memory 112 the waveform data of the drive signal to be applied to the oscillatory actuator 115 (step S102).

Note that even when the CPU 113 determines that a touch signal has been input from the touch panel 102 at step S101, when it detects that a touched position of the touch panel 102 based on the signal falls outside the display areas of the touch buttons displayed on the display screen, the routine does not proceed to the processing of step S102, the vibration control processing 1 ends.

Next, the CPU 113 outputs the waveform data read from the memory 112 to the drive signal generation circuit 114. At the same time, the CPU 113 instructs the drive signal generation circuit 114 to generate a drive signal (step S103). In response to the processing of step S103, the drive signal generation circuit 114 generates a drive signal using the waveform data supplied from the CPU 113.

Next, the CPU 113 resets the count value for counting the time for the drive signal to be applied (step S104). Further, the CPU 113 instructs the drive signal generation circuit 114 to initiate applying the drive signal (step S105). At the same time, the CPU 113 starts counting the time for application (step S106). When instructed by the CPU 113 to start application, the drive signal generation circuit 114 applies the drive signal to the oscillatory actuator 115 for the period until the cessation of application is instructed by the CPU 113. Due to this, the oscillatory actuator 115 is driven and causes the touch panel 102 and the operation keys 104*a* to 104*c* vibrate in a direction perpendicular to the front surface of the touch panel 102.

Further, the CPU 113 increments the count value for counting the time of application in response to the start of counting of the time of application (step S107). Further, the CPU 113 determines whether the count has reached a count corresponding to a preset prescribed time (step S108). For example, in the present embodiment, the prescribed time is set to 0.5 second.

When the counted time of application is less than the prescribed time, the CPU 113 returns to step S107 and increments the time of application. In the case that it is determined that the time of application has exceeded the prescribed time, that is, when the counted time of application has reached 0.5 second, the CPU 113 instructs the drive signal generation circuit 114 to stop the application of the drive signal (step S109). The CPU 113 then ends the vibration control processing 1. When the cessation of application is instructed by the CPU 113, the drive signal generation circuit 114 stops applying the drive signal to the oscillatory actuator 115.

As explained above, according to the present embodiment, in the case of detecting an operation input to the touch panel 102 or any one of the operation keys 104*a* to 104*c*, the CPU 113 drives the oscillatory actuator 115 to cause the touch panel 102 or the operation keys 104*a* to 104*c* to vibrate. Therefore, the PDA 10 can report, to the user, that an operation input has been approved by way of vibration. As a result, the user can confirm if the operation input to the touch panel 102 or any one of the operation keys 104*a* to 104*c* has been approved by the PDA 10 without viewing the screen display.

Further, since a linear oscillatory actuator is used as the oscillatory actuator 115, the directional accuracy of vibration generated from the oscillatory actuator 115 is high. Therefore, by building the oscillatory actuator 115 into the PDA 10 so that the direction of vibration becomes perpendicular to the front surface of the touch panel 102 or the direction of depression of the operation keys 104*a* to 104*c*, it is possible to give the user by vibrational stimulus the feeling of pressing the touch buttons or operation keys when touching the touch panel 102 or when depressing thin operation keys 104*a* to 104*c*.

Further, by applying an audible band audio signal to the coil 121 of the oscillatory actuator 115, it is possible to use the oscillatory actuator 115 also as a sound source.

Further, the time of vibration may be set short such as 0.5 second. By doing this, when, for example, the touch panel 102 or any one of the operation keys 104*a* to 104*c* is operated, it is possible to give the user by vibrational stimulus a feeling of operation similar to that of a "click". Here, a "click" is the feeling of operation caused when pushing and releasing the button of a mouse when selecting an icon or button displayed on the screen of a display by operating the mouse. To give such a "click", the time of vibration is preferably not more than one second at the maximum. Further, by making the vibration time short, it is possible to reduce the drive power of the oscillatory actuator 115 and reduce the power consumption of the PDA 10.

Further, the oscillatory actuator 115 houses the coil 121 and movable weight 122 inside the case 115*a* sealed to function as a magnetic shield. Therefore, the oscillatory actuator 115 is not affected by the magnetic force from the components of the PDA 10 provided around it. Further, the magnetic force generated from the coil 121 in the oscillatory actuator 115 does not affect the surrounding components.

It is important to prevent the oscillatory actuator 115 from being affected by the magnetic force from the surrounding components to maintain the constant accuracy of direction of the reciprocation of the movable weight 122, that is, the accuracy of direction of the vibration generated from the oscillatory actuator 115. The reason is that if the direction of vibration generated from the oscillatory actuator 115 deviates from the right direction due to the magnetic force from the surrounding components, it becomes impossible to give the user a feeling of pressing the touch buttons or operation keys by vibrational stimulus.

Further, prevention of the magnetic force of the oscillatory actuator 115 from affecting the surrounding components is important in preventing malfunctioning of the surrounding components. In the present embodiment, the explanation was given of the case where the liquid crystal display panel 103*a* is used. However, in the case of using a CRT (cathode ray tube) instead of the liquid crystal display panel 103*a* and placing near the CRT an oscillatory actuator not having an anti-magnetic effect for vibration of the touch panel 102, the display of the CRT may be distorted in color or form due to the magnetic force generated from the oscillatory actuator.

Note that in the present embodiment, the explanation was given with respect to a configuration causing vibration of the touch panel 102 or operation keys 104*a* to 104*c* or other operation units Under this configuration, vibration is conveyed to the fingertip of the user performing the operation input. However, conveying vibration to the hand of the user holding the PDA 10 rather than the fingertip performing the operation input is also possible by employing a configuration that causes vibration at the main case 101 of the PDA 10.

[B: Second Embodiment]

In this embodiment, the explanation will be given of the case of employing a vibrator with a DC motor as a vibration generator. Note that in this embodiment, the same reference numerals are used for portions common with the first embodiment. Further, explanations of portions common with the first embodiment will be omitted.

[B-1: Configuration of Second Embodiment]

Figure 6:
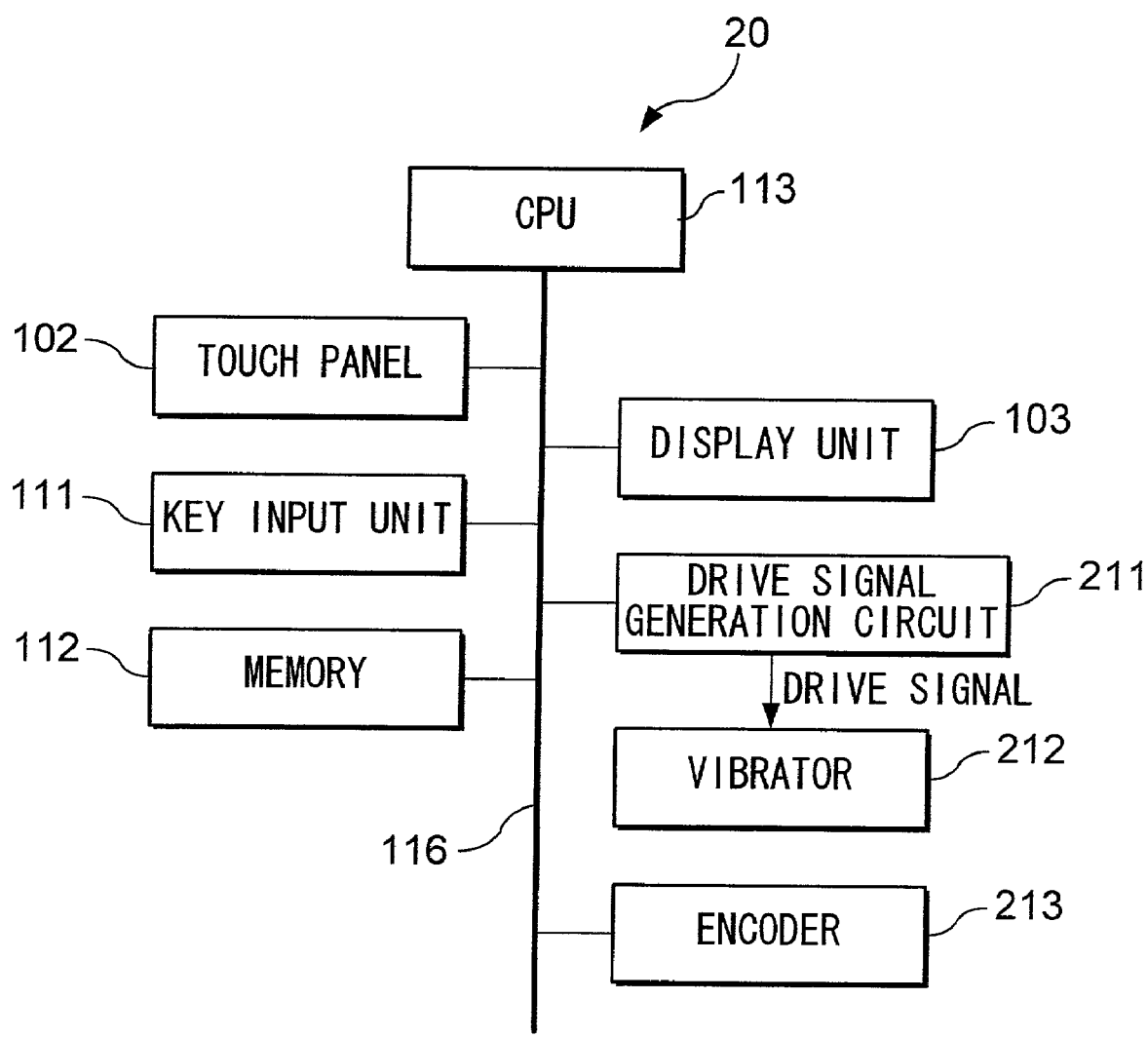
FIG. 6 is a block diagram illustrating the hardware configuration of a PDA according to a second embodiment of the present invention.

FIG. 6 is a block diagram illustrating the hardware configuration of a PDA 20 according to this embodiment. As shown in the figure, the PDA 20 has a touch panel 102, a display unit 103, a key input unit 111, a memory 112, a CPU 113, a drive signal generation circuit 211, a vibrator 212, and an encoder 213.

The memory 112 stores waveform data of a drive voltage for driving the vibrator 212. The CPU 113 executes a vibration control processing 2 (see FIG. 11). In the case of detecting operation input from the touch panel 102 or any one of the operation keys 104a to 104c, the CPU 113 drives the vibrator 212 through the drive signal generation circuit 211 to cause the touch panel 102 or one of the operation keys 104a to 104c to vibrate. Further, the CPU 113 determines the timing for stopping the application of the drive signal to the vibrator 212 on the basis of rotational angle information supplied from the encoder 213.

The drive signal generation circuit 211 generates a drive signal for driving the vibrator 212 in accordance with the waveform data supplied from the CPU 113. Further, the drive signal generation circuit 211 applies the drive signal to the vibrator 212 in accordance with an instruction from the CPU 113. The vibrator 212 is a DC motor having an eccentric weight attached to its shaft. The vibrator 212 is driven by a drive signal applied from the drive signal generation circuit 211 and generates vibration.

Figure 7:
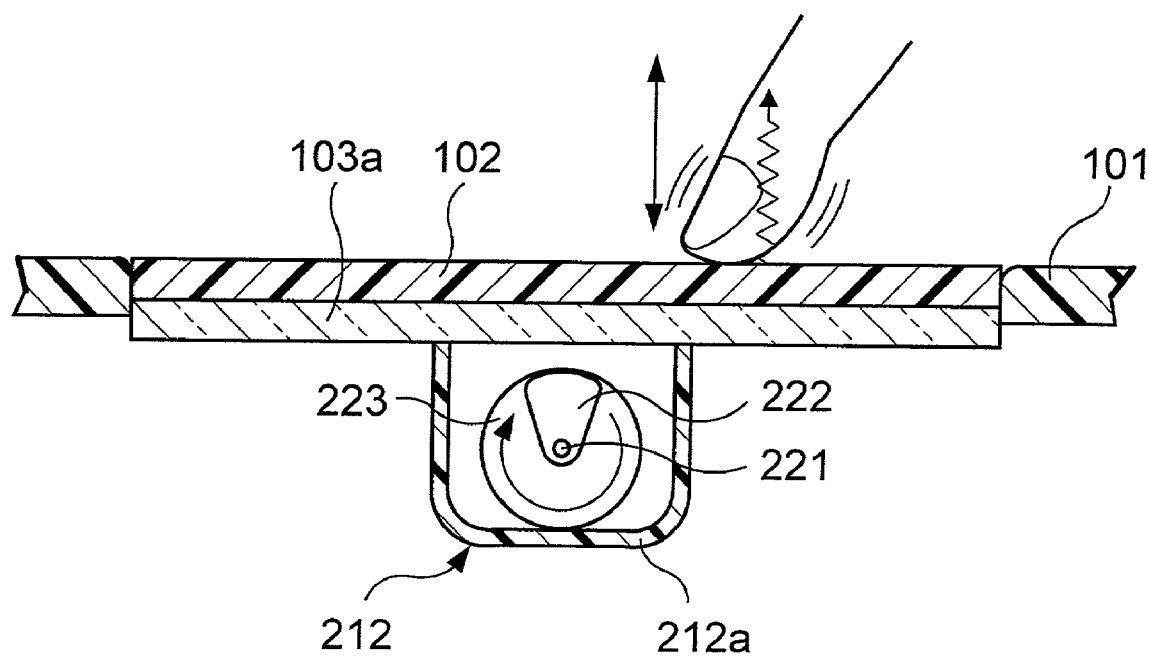
FIG. 7 is a sectional view schematically illustrating a state of placement of a vibrator in the main case of the PDA according to this embodiment.
Figure 8:
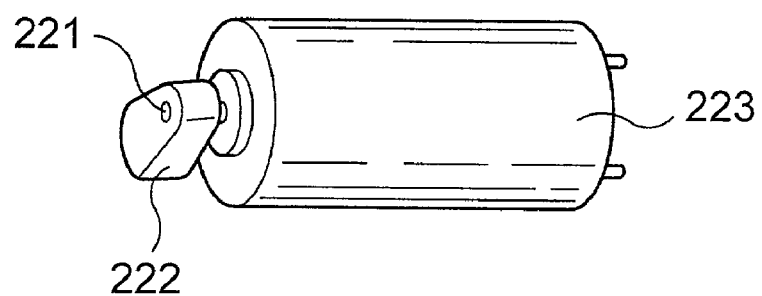
FIG. 8 is a perspective view illustrating the appearance of a DC motor according to this embodiment.

FIG. 7 is a sectional view schematically illustrating how the vibrator 212 is placed in the main case 101 of the PDA 20. Further, FIG. 8 is a perspective view illustrating the appearance of the vibrator 212. As shown in FIG. 7, the vibrator 212 housed in a case 212a is placed at the bottom surface of the liquid crystal display panel 103a. This vibrator 212 is fixed inside the case 212a by a support member (not shown). Further, as shown in FIG. 7 and FIG. 8, the vibrator 212 is configured by a DC motor 223 having an eccentric weight 222 attached to an end of a shaft 221.

When a drive voltage (drive signal) is applied to the DC motor 223, the eccentric weight 222 attached to the shaft 221 rotates, and the rotational movement of the eccentric weight 222 causes vibration at the case 212a. Note that when using the vibrator 212, unlike the case of the oscillatory actuator 115 explained in the first embodiment, the direction or mode of vibration generated from the vibrator 212 varies depending on the initial position of the eccentric weight 222 or the rotational direction of the DC motor 223. To cause the same vibration to be generated by the vibrator 212 every time, it is necessary to detect the position of the eccentric weight 222 and cause the eccentric weight 222 to rotate from the same position in the same direction at all times.

For this purpose, as shown in FIG. 6, the PDA 20 according to this embodiment is provided with the encoder 213. This encoder 213 detects the rotational angle information of the DC motor 223 and outputs it to the CPU 113. The CPU 113 determines the timing for stopping the application of the drive voltage to the DC motor 223 on the basis of the rotational angle information supplied from the encoder 213.

For example, in this embodiment, as shown in FIG. 7, the timing of cessation of application of the drive voltage to the DC motor 223 is determined so that the eccentric weight 222 stops at the position of exactly 12:00 when centered about the shaft 221. Note that when using a stepping motor instead of the DC motor 223, it is possible to detect the position of the eccentric weight attached to the shaft without using the encoder 213.

As explained above, by controlling the stopping position of the eccentric shaft 222, it is possible to make the direction of vibration generated from the vibrator 212 match the direction perpendicular to the front surface of the touch panel 102. The vibration generated from the vibrator 212 is transmitted to the touch panel 102 through the liquid crystal display panel 103a. Due to this, the touch panel 102 vibrates in a direction perpendicular to its front surface and this vibration is transmitted to the fingertip of the user operating the touch panel 102.

Figure 9:
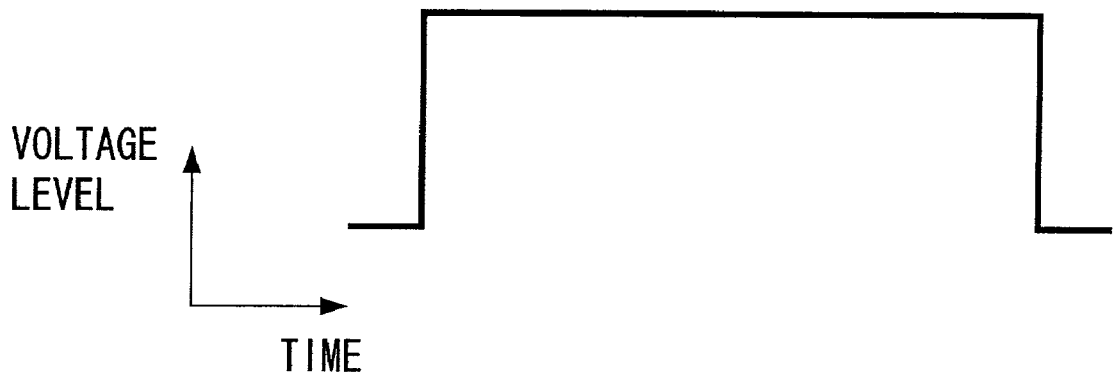
FIG. 9 is a view illustrating a waveform of a drive voltage applied to a vibrator according to this embodiment.
Figure 10:
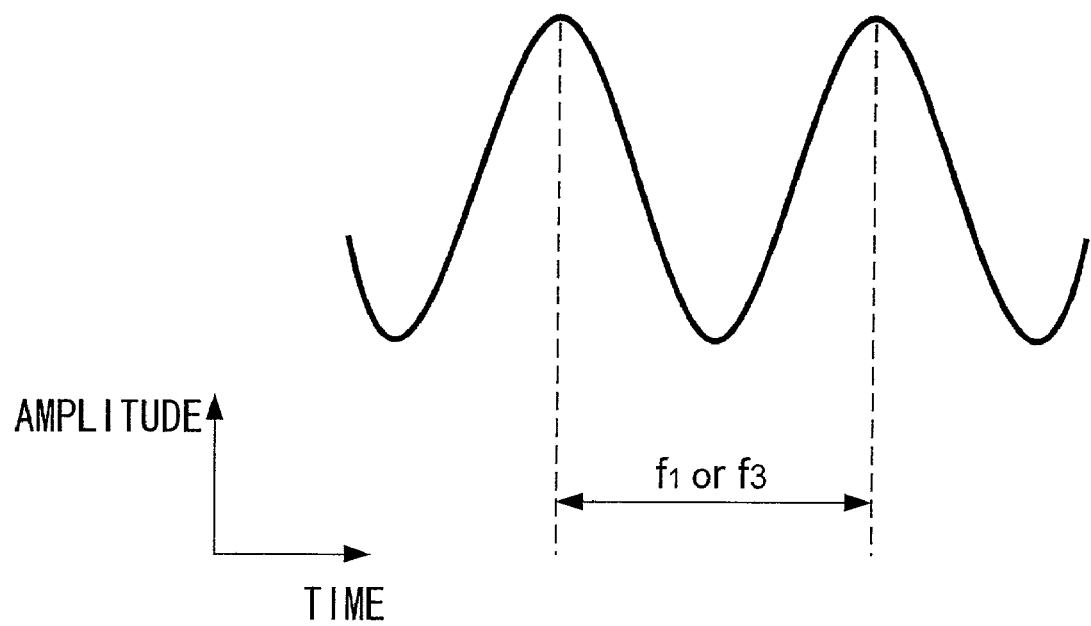
FIG. 10 is a view illustrating vibration occurring at the front surface of a touch panel according to this embodiment.

Next, FIG. 9 is a view illustrating a waveform of a drive voltage applied to the vibrator 212. FIG. 10 is a view illustrating vibration occurring at the front surface of the touch panel 102. In the case of the vibrator 212, the rotational speed of the DC motor 223 changes in accordance with the drive voltage applied. Here, when the rotational speed of the DC motor 223 matches with the natural frequency $f_1$ of the main case 101 of the PDA 20 or the natural frequency $f_3$ of the vibrator 212, the main case 101 of the PDA 20 or the vibrator 212 resonates.

Therefore, in the present embodiment, drive voltage is applied to the vibrator 212 so as to make the rotational speed of the DC motor 223 match with the natural frequency $f_1$ or natural frequency $f_3$. Therefore, as shown in FIG. 10, the touch panel 102 vibrates in a direction perpendicular to the front surface by a period of the natural frequency $f_1$ or natural frequency $f_3$. Due to this, it becomes possible to give a larger vibration by a small drive power and the power consumption of the PDA 20 can be reduced. Note that the waveform of the drive voltage is not limited to the square waveform illustrated in FIG. 9.

[B-2: Operation of Second Embodiment]

Figure 11:
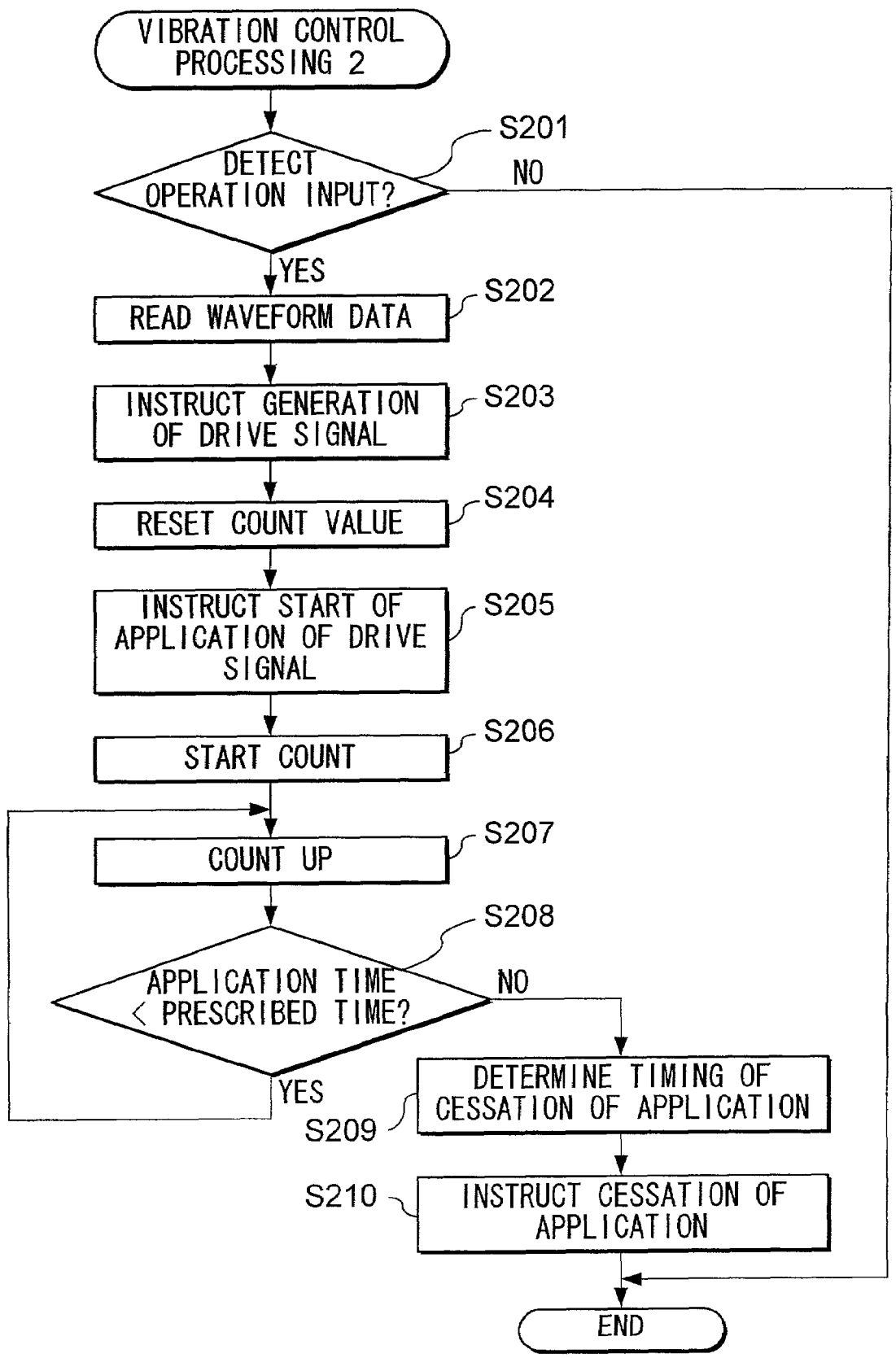
FIG. 11 is a flow chart for explaining the operation of a vibration control processing 2 executed by the CPU in a PDA according to this embodiment.

FIG. 11 is a flow chart for explaining the operation of the vibration control processing 2, in the PDA 20 according to this embodiment, the processing 2 being executed by the CPU 113. The vibration control processing 2 is executed by the CPU 113 at every predetermined period in a period during which operation input to the touch panel 102 or the operation keys 104a to 104c is permitted. Note that the processing shown in steps S201 to S208 of the second vibration control processing is similar to the processing of steps S101 to S108 of the vibration control processing 1 (see FIG. 5) explained in the first embodiment, so explanations thereof will be omitted.

In the present embodiment, however, since the vibrator 212 is used as a vibration generator, the drive signal generated in the drive signal generation circuit 211 becomes the drive voltage shown in FIG. 9. When this drive voltage is applied, the vibrator 212 causes the DC motor 223 to rotate at a rotational speed corresponding to the natural frequency $f_1$ of the main case 101 or the natural frequency $f_3$ of the vibrator 212. As a consequence, the eccentric weight 222 rotates and causes vibration. The vibration generated by the vibrator 212 causes the touch panel 102 and the operation keys 104a to 104c to vibrate in a direction perpendicular to the front surface of the touch panel 102.

In step S208, in the case that the CPU 113 determines that the time of application has exceeded a prescribed time, that is, when the time of application has reached 0.5 second, the CPU 113 proceeds to step S209. Next, the CPU 113 determines the timing for stopping the application of the drive voltage to cause the eccentric weight 222 to stop each time at the same position on the basis of the rotational angle information supplied from the encoder 213 (step S209). In the present embodiment, as shown in FIG. 7, the timing of cessation of application of the drive voltage is determined so that the eccentric weight 222 stops at the position of exactly 12:00 when centered on the shaft 221.

Next, the CPU 113 instructs the drive signal generation circuit 221 to stop the application of the drive signal in accordance with the determined timing of cessation of application (step S210). The CPU 113 ends the vibration control processing. When instructed to stop the application by the CPU 113, the drive signal generation circuit 221 stops the application of the drive signal to the vibrator 212. As a result, the eccentric weight 222 attached to the DC motor 223 of the vibrator 212 stops at the same position each time. The eccentric weight 222 is made to stop at the same position at all times and weight to rotate from the same stopped position in the same direction in this way thereby enabling to fix the direction of vibration generated by the vibrator 212. Further, the vibration generated by the vibrator 212 can be closely controlled. As explained above, according to the present embodiment, in the case of detecting operation input to the touch panel 102 or the any one of operation keys 104a to 104c, the CPU 113 drives the vibrator 212 to cause the touch panel 102 or one of the operation keys 104a to 104c to vibrate. Therefore, the PDA 20 can report to the user by vibration that an operation input has been approved.

Further, in the present embodiment, the eccentric weight 222 is made to stop at the same position at all times and rotation is started in the same direction from the stopped position. Due to this, it is possible to fix the direction of vibration generated by the vibrator 212 and to closely control the vibration generated by the vibrator 212. As a result, the user is provided with a pressing feeling or a "click" feeling of the touch buttons or the operation keys by vibrational stimulus when a touching operation to the touch panel 102 or a pressing operation to the thin operation keys 104a to 104c is performed. Imparting this pressing feeling or "click" feeling requires control of the stopping position of the eccentric weight 222 explained above and was not possible with the conventional eccentric weight motor.

[C: Third Embodiment]

In this embodiment, description will be made on a portable electronic device which reports, upon completion of a processing designated by an operation input, the completion of processing. Note that in the present embodiment, the same reference numerals are used for portions common with the first embodiment. Further, explanations of portions common with the first embodiment will be omitted.

[C-1: Configuration of Third Embodiment]

Figure 12:
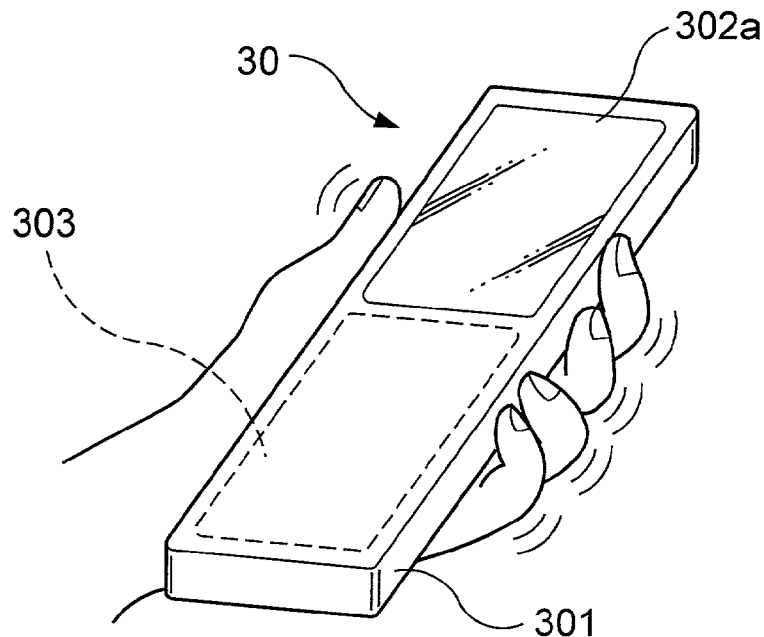
FIG. 12 is a perspective view illustrating the appearance of a PDA according to a third embodiment of the present invention.

FIG. 12 is a perspective view illustrating the appearance of a PDA 30 according to this embodiment. In the figure, the PDA 30 is provided with a display screen of a liquid crystal display panel 302a covering an opening of the main case 301. Further, the top surface of the main case 301 is provided with a key input unit 303 having a plurality of push-button type operation keys.

Figure 13:
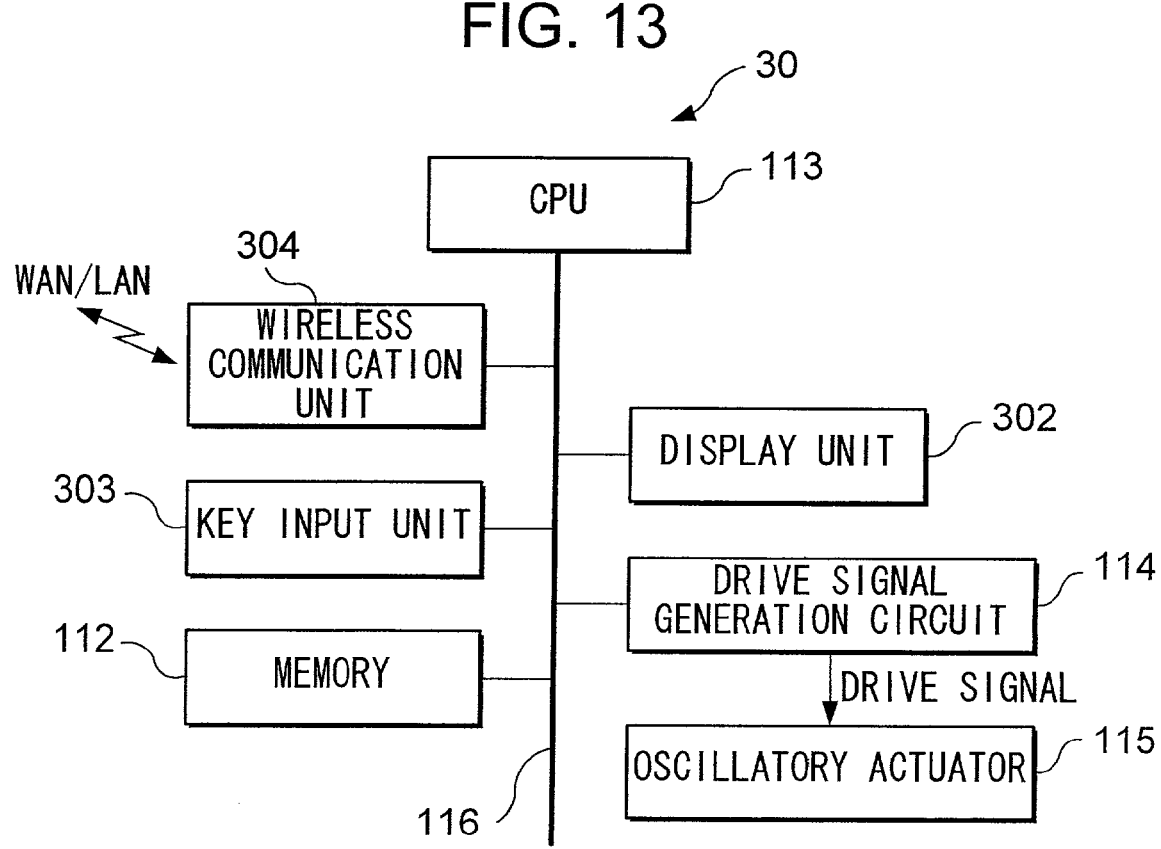
FIG. 13 is a block diagram illustrating the hardware configuration of a PDA according to this embodiment.

FIG. 13 is a block diagram illustrating the hardware configuration of the PDA 30 shown in FIG. 12. As shown in the figure, the PDA 30 has a display unit 302, a key input unit 303, a wireless communication unit 304, a memory 112, a CPU 113, a drive signal generation circuit 114, and an oscillatory actuator 115.

The PDA 30 has the function for performing data communication with other communications devices through networks such as WAN (wide area network) and LAN (local area network). The wireless communication unit 304 controls wireless communication performed with a wireless base station of the WAN or LAN. Also, the CPU 113 executes the vibration control processing 3 (see FIG. 14) and, in the case of detecting the completion of a processing instructed by an operation input, drives the oscillatory actuator 115 through the drive signal generation circuit 114 to cause the main case 301 to vibrate.

Note that the oscillatory actuator 115 is the same as the oscillatory actuator 115 explained in the first embodiment. In the present embodiment, however, the oscillatory actuator 115 is attached to the back surface of the PDA 30, that is, the inside of the main case 301 on the side opposite the back of the surface on which the display screen is provided, and causes the main case 301 to vibrate. Further, the vibration is transmitted to the hand of the user holding the PDA 30.

[C-2: Operation of Third Embodiment]

Figure 14:
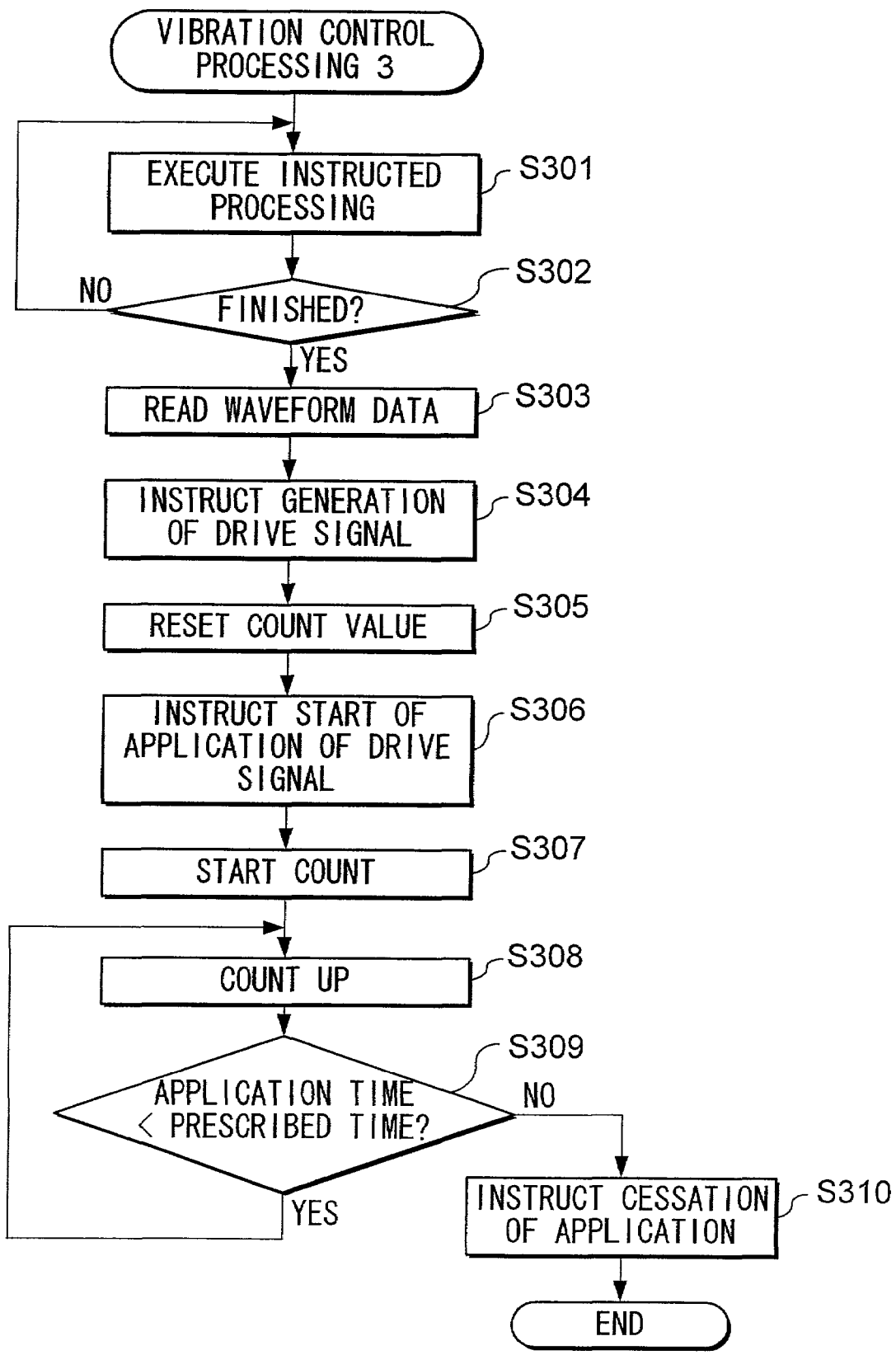
FIG. 14 is a flow chart for explaining the operation of a vibration control processing 3 executed by the CPU in a PDA according to this embodiment.

FIG. 14 is a flow chart for explaining the operation of a vibration control processing 3 executed by the CPU 113 in the PDA 30 according to this embodiment. The vibration control processing 3 is executed when the processing requiring a waiting time is instructed by operation input. Here, "processing requiring a waiting time" means, for example, file data downloading or uploading processing such as reading a web page, mail check processing for checking for e-mail addressed to oneself, start-up processing for starting up an application software, copying or deletion of file data, initialization processing for initializing a data storage area of the memory 112, and the like.

As shown in the figure, first, the CPU 113 executes the processing instructed by operation input (step S301). Next, the CPU 113 determines whether the processing being executed has been completed (step S302). When the processing has not ended, the CPU 113 returns to step S301 and continues to execute the processing. In the case that the CPU 113 determines in step S302 that the processing being executed has been completed, the CPU 113 proceeds to step S303. The processing from step S303 is similar to the processing from step S102 of the vibration control processing 1 (see FIG. 5) explained in the first embodiment, so explanations thereof will be omitted.

By configuring control in this way, in the case of detecting that the processing instructed by the operation input has finished, the CPU 113 drives the oscillatory actuator 115 through the drive signal generation circuit 114 to cause the main case 301 of the PDA 30 to vibrate. As a result, the vibration is transmitted to the hand of the user holding the PDA 30.

When reporting the completion of, for example, the mail check processing by vibration, it is effective to make the mode of vibration different depending on the presence or absence of e-mail addressed to oneself. Description will be given below on the control method for changing the mode of vibration in accordance with the result of the processing executed.

Figure 15:
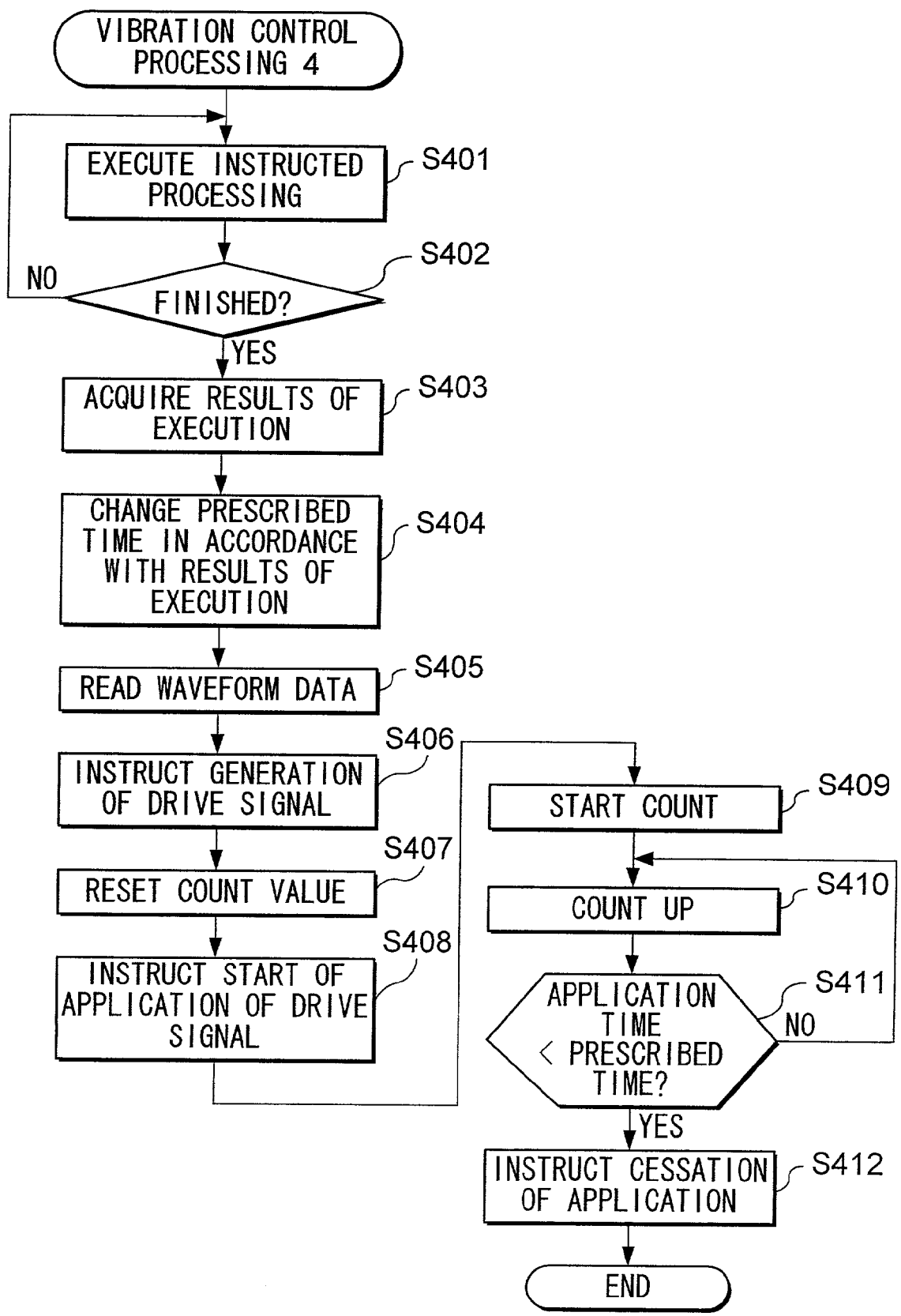
FIG. 15 is a flow chart for explaining the operation of a vibration control processing 4 executed by the CPU in a PDA according to this embodiment.

FIG. 15 is a flow chart for explaining the operation of a vibration control processing 4 executed by the CPU 113 in the PDA 30 according to this embodiment. As shown in the figure, first, the CPU 113 executes the processing instructed by the operation input (step S4301). Next, when determining that the processing being executed has ended (step S402), the CPU 113 proceeds to step S403.

Next, the CPU 113 acquires the result of execution of the processing executed at step S401 (step S403). The CPU 113 changes the time of application of the drive signal, that is, the count value of the prescribed time specifying the time of application, in accordance with the results of execution (step S404). For example, when mail check processing has been executed, the CPU 113 leaves the prescribed time as 0.5 second when the result of the check is that there is no e-mail addressed to itself. Further, it changes the prescribed time to 1.5 seconds when there is e-mail addressed to itself.

Note that the processing from step S405 is similar to the processing from step S303 of the vibration control processing 3 (see FIG. 14), so a detailed explanation will be omitted, but the CPU 113 changes the time of vibration of the main case 301 according to the results of execution of the processing.

As explained above, according to the present embodiment, in the case of detecting that processing instructed by operation input has ended, the CPU 113 drives the oscillatory actuator 115 to cause the main case 301 of the PDA 30 to vibrate. Therefore, the PDA 30 can report to the user the completion of processing instructed by operation input by vibration. Further, according to the present embodiment, the CPU 113 changes the time of vibration of the oscillatory actuator 115 in accordance with the results of execution of the processing. Therefore, the user can confirm the results of execution of the instructed processing on the basis of vibration time even without viewing the screen information.

Note that in the present embodiment, the explanation was given of the case of changing the time of vibration in accordance with the results of execution of the processing, but it is also possible to change the magnitude of the vibration, the number of vibrations, etc. The point is to change the mode of vibration generated from the oscillatory actuator 115 in accordance with the results of execution of the processing. Further, in the present embodiment, the entire main case 301 of the PDA 30 was made to vibrate. It is however also possible to make only the portion of the main case 301 held by the user when holding the PDA 30 vibrate.

Further, in the present embodiment, an explanation was given of a configuration causing the main case 301 of the PDA 30 to vibrate, in which case, vibration is transmitted to the hand holding the PDA 30. A configuration making a plurality of operation keys provided in the PDA 30 vibrate is also possible; that is, vibration is transmitted to the fingertip making the operation input.

[D: Fourth Embodiment]

In this embodiment, description will made on a portable electronic device switching the location where vibration is caused to a touch panel or hand-touched portion of a housing in accordance with whether the portable electronic device is being held by a user. Note that in the present embodiment, the same reference numerals are used for portions common with the first embodiment. Further, explanations of portions common with the first embodiment will be omitted.

[D-1: Configuration of Fourth Embodiment]

Figure 16:
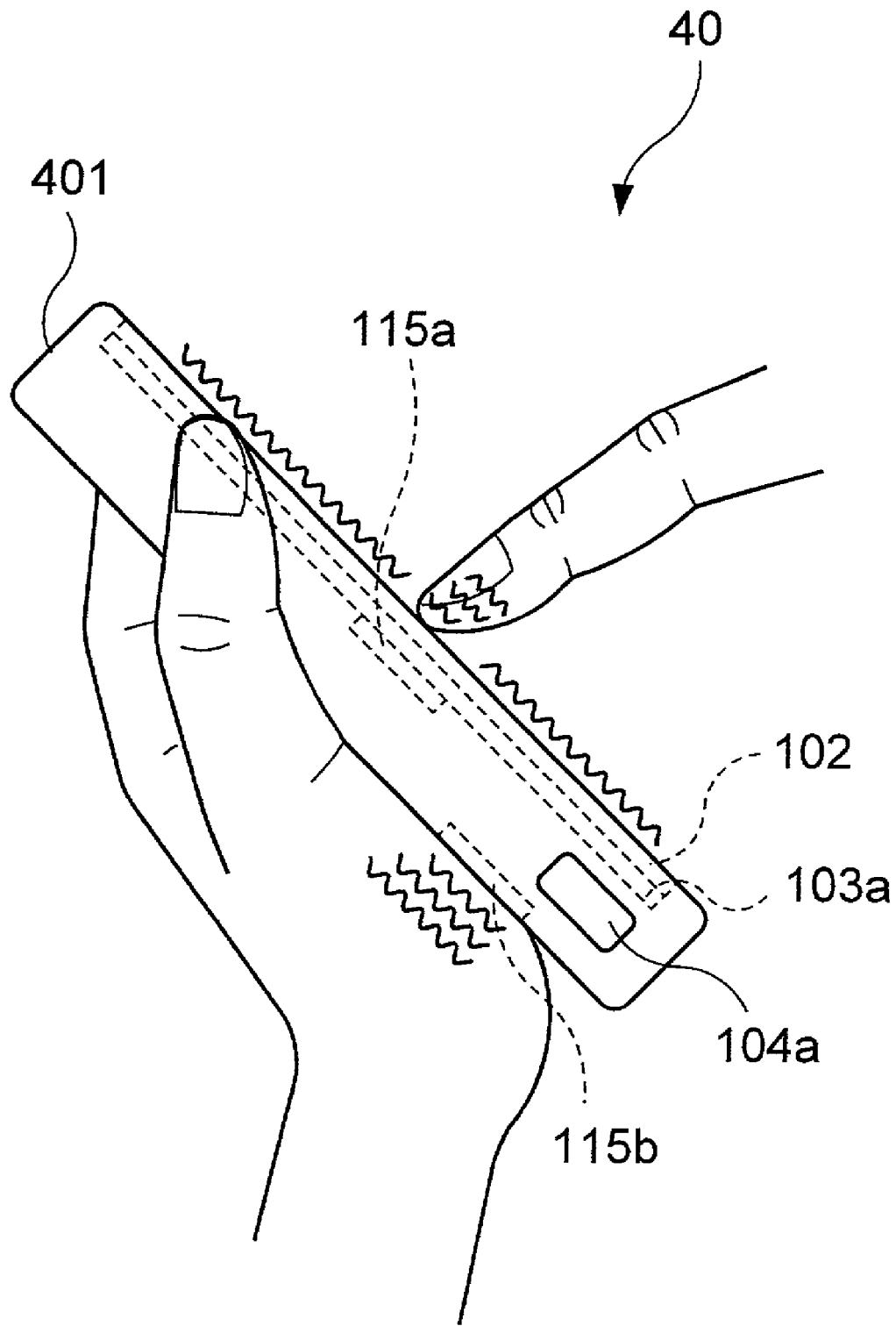
FIG. 16 is a view illustrating an internal structure of a PDA according to a fourth embodiment of the present invention.

FIG. 16 is a view illustrating an internal structure of a PDA 40 according to this embodiment. In the figure, the PDA 40 has a liquid crystal display panel 103*a* over which a touch panel 102 is laid. The display screen of the liquid crystal display panel 103*a* covers the opening of the main case 401. Further, the rear surface of the liquid crystal display panel 103*a* is provided with an oscillatory actuator 115*a*. This oscillatory actuator 115*a* causes the touch panel 102 to vibrate to transmit vibration to the fingertip of the user performing the operation input.

On the other hand, at the inside of the main case 401 at the back surface side of the PDA 40, that is, the side opposite to the surface where the display screen is provided, an oscillatory actuator 115*b* is provided. This oscillatory actuator 115*b* gives vibration to the palm of the hand of the user holding the PDA 40 through the main case 401. Note that the oscillatory actuators 115*a* and 115*b* are the same as the oscillatory actuator 115 explained in the first embodiment. Further, a push-button type operation key 104*a* for inputting an on/off operation of the main power is provided at the side surface of the main case 401.

In this way, the PDA 40 has two oscillatory actuators 115*a* and 115*b*. Further, while not shown in FIG. 16, the PDA 40 has a touch sensor and drives one of the oscillatory actuators to generate vibration in accordance with whether the PDA 40 is being held by the user. The reason for this control is to prevent, when the main case 401 of a PDA 40 placed on a desktop is vibrated, the PDA 40 from moving due to this vibration or striking the desk at the time of vibration and therefore causing an unpleasant buzzing sound.

Note that in the present embodiment, as an example of control, an explanation will be given of the case of driving only the oscillatory actuator 115*b* and imparting vibration to the palm of the hand of the user holding the PDA 40 when the PDA 40 is being held by the user, while driving only the oscillatory actuator 115*a* and transmitting vibration to the fingertip performing the touch operation when the PDA 40 is not being held by the user. When the PDA 40 is being held by the user, however, it is also possible to drive both the oscillatory actuators 115*a* and 115*b* to perform report by vibration.

Figure 17:
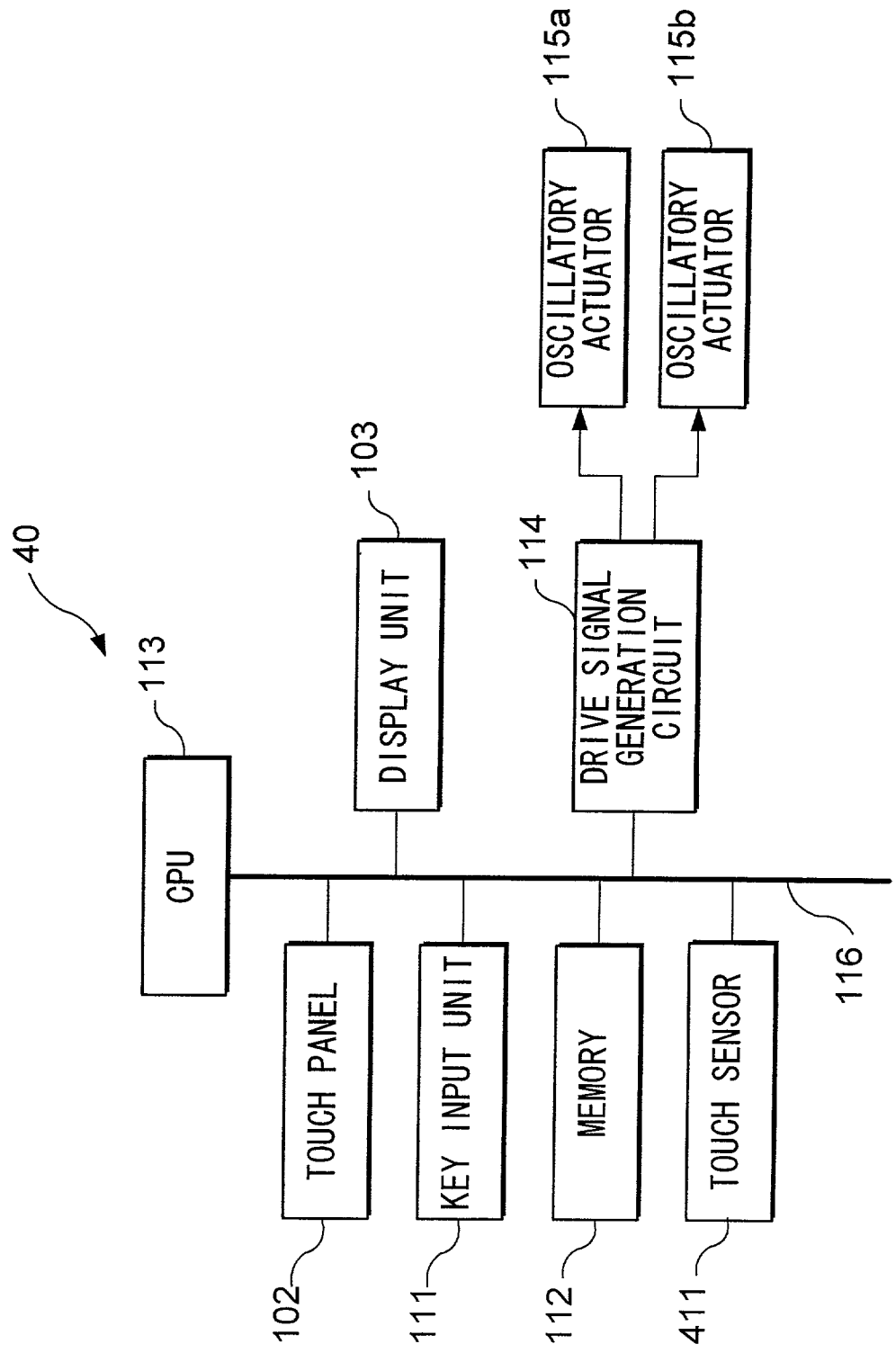
FIG. 17 is a block diagram illustrating the hardware configuration of a PDA according to this embodiment.

FIG. 17 is a block diagram illustrating the hardware configuration of the PDA 40 shown in FIG. 16. As shown in the figure, the PDA 40 has a touch panel 102, a display unit 103, a key input unit 111, a memory 112, a CPU 113, a drive signal generation circuit 114, oscillatory actuators 115*a* and 115*b*, and a touch sensor 411.

The touch sensor 411 is a sensor for detecting if the PDA 40 is being held by a user and supplies the results of detection to the CPU 113.

The memory 112 stores waveform data of the drive signals to be applied to the oscillatory actuators 115*a* and 115*b*. Here, the frequency of the drive signal applied to the oscillatory actuator 115*a* corresponds to the frequency for causing the liquid crystal display panel 103 provided with the touch panel 102 to resonate or the frequency for causing the oscillatory actuator 115*a* itself to resonate. Further, the frequency of the drive signal applied to the oscillatory actuator 115*b* corresponds to the frequency for causing the main case 401 of the PDA 40 to resonate or the frequency for causing the oscillatory actuator 115*b* itself to resonate.

The CPU 113 executes a vibration control processing 5 (see FIG. 18) and reports to the user by vibration that a touch operation on the touch panel 102 has been received. In the present embodiment, however, the CPU 113 drives only one of the two oscillatory actuators 115*a* and 115*b* to generate vibration in accordance with the results of detection of the touch sensor 411.

The drive signal generation circuit 114 generates drive signals for driving the oscillatory actuators 115*a* and 115*b* in accordance with waveform data supplied from the CPU 113. Further, the drive signal generation circuit 114 applies drive signals to the oscillatory actuators 115*a* and 115*b* in accordance with instructions from the CPU 113.

[D-2: Operation of Fourth Embodiment]

Figure 18:
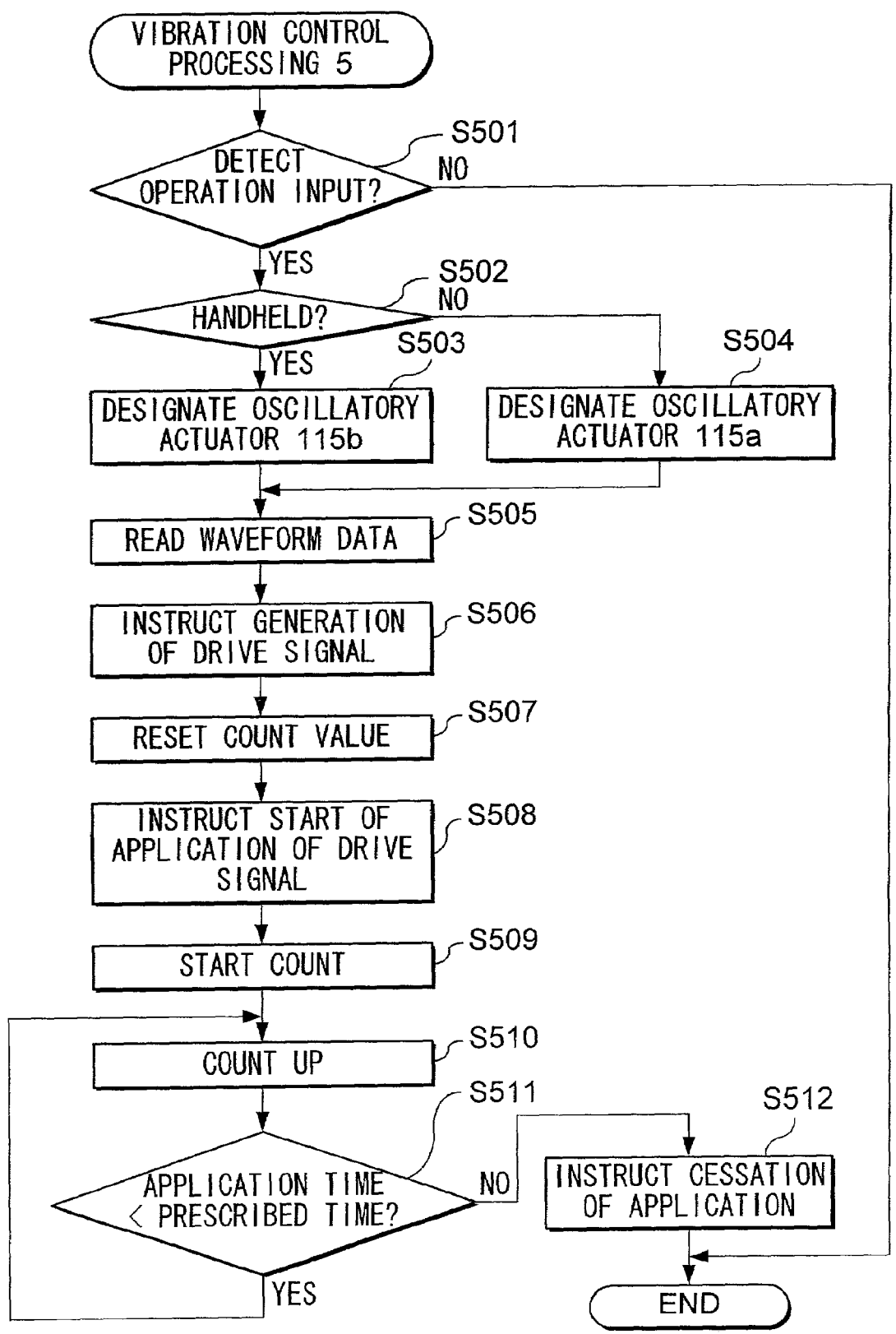
FIG. 18 is a flow chart for explaining the operation of a vibration control processing 5 executed by the CPU in a PDA according to this embodiment.

FIG. 18 is a flow chart for explaining the operation of the vibration control processing 5 executed by the CPU 113 in the PDA 40 according to this embodiment. The vibration control processing 5 is executed by the CPU 113 every predetermined period in the period where a touch operation on the touch panel 102 is permitted.

As shown in the figure, first, the CPU 113 determines whether a touch signal has been input from the touch panel 102 (step S501). When it is determined that a touch signal has not been input, the CPU 113 ends the vibration control processing 5. Note that even when the CPU 113 determines that a touch signal has been input from the touch panel 102, when it detects that a touched position of the touch panel 102 based on the signal is outside of the display areas of the touch buttons displayed on the display screen, the routine does not proceed to the processing of step S502 and the vibration control processing 5.

On the other hand, when it is determined that a touch signal has been input at step S501, the CPU 113 next determines whether the PDA 40 is being held by the user based on the results of detection of the touch sensor 411 (step S502). Further, when it is determined that the PDA 40 is being held by the user, the CPU 113 determines the oscillatory actuator 115b as the oscillatory actuator to be driven (step S503). That is, when the PDA 40 is being held by the user, the handheld portion of the main case 401 is made to vibrate to transmit vibration to the palm of the hand of the user holding the PDA 40.

On the other hand, when it is determined that at step S502 that the PDA 40 is not being held by the user, the CPU 113 determines the oscillatory actuator 115a as the oscillatory actuator to be driven (step S504). That is, when the PDA 40 is not being held by the user, the touch panel 102 is made to vibrate to transmit vibration to the fingertip of the user performing the touch operation.

Note that the processing from step S505 is similar to the processing in step S102 and the following steps of the vibration control processing 1 explained in the first embodiment (see FIG. 5), so a detailed explanation will be omitted; but in this embodiment the CPU 113 drives the oscillatory actuator determined by the processing of step S503 or S504 to give vibration to the touch panel 102 or the handheld portion of the main case 401.

As explained above, according to the present invention, the CPU 113 drives one of the oscillatory actuators to cause the generation of vibration in accordance with results of detection of the touch sensor 411. Therefore, in the PDA 40, the location of vibration can be switched to the touch panel 102 or the handheld portion of the main case 401 depending on whether the PDA 40 is being held by the user.

Note that in this embodiment, the oscillatory actuator used for a report by vibration may also be designated by the user. In this case, the CPU 113 gives a screen display for prompting the user to designate one or more oscillatory actuators for use when performing report by vibration. When the oscillatory actuator to be used is designated by operation input by the user, the CPU 113 stores that designation information in the memory 112. Further, after it is determined that a touch signal has been input from the touch panel 102 at step S501, the CPU 113 determines the oscillatory actuator to be driven in accordance with the designation information stored in the memory 112.

Figure 19:
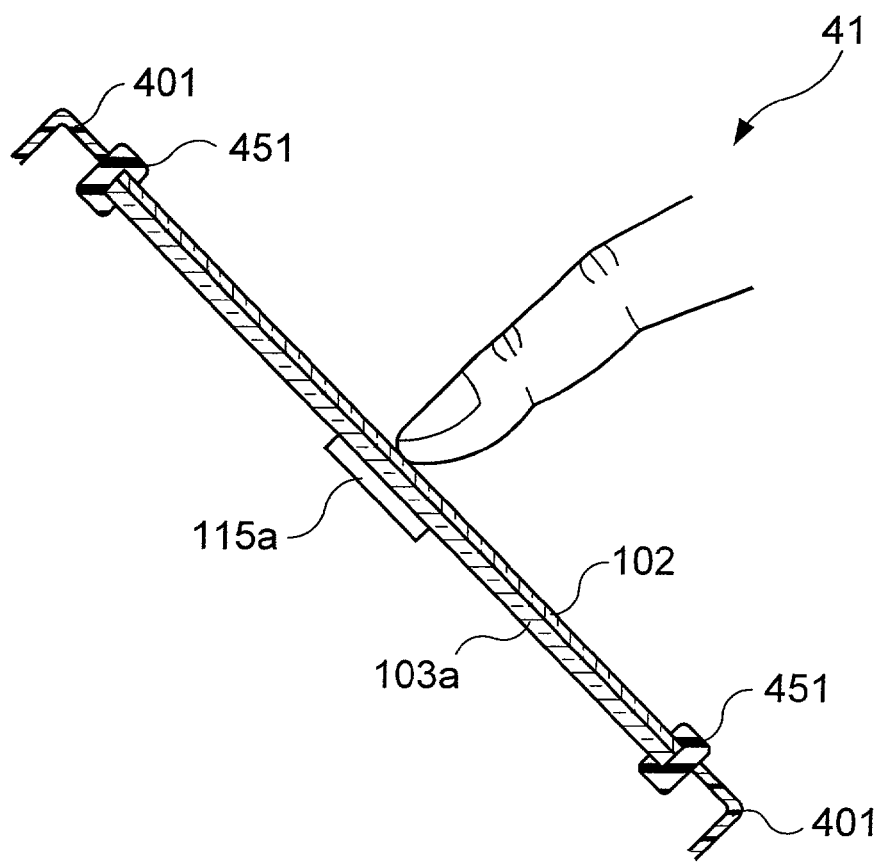
FIG. 19 is a view illustrating an internal structure of a PDA according to a first modification of this embodiment.
Figure 20:
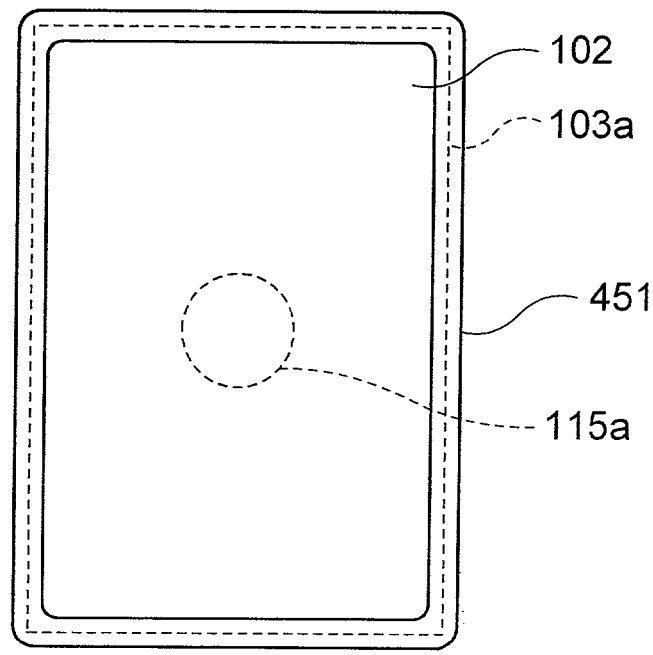
FIG. 20 is a view of another example of placement of an elastic member according to this modification.

Further, FIG. 19 is a section view illustrating an internal structure of the PDA 41 according to a modification of this embodiment. In this figure, a liquid crystal display panel 103a having the touch panel 102 placed over the display surface and having the oscillatory actuator 115a placed over its rear surface is attached to the main case 401 of the PDA 41 through an elastic member 451. This elastic member 451 is for example rubber, urethane, sponge, etc. and, as shown in FIG. 20, is attached to the periphery of the liquid crystal display panel 103a. This elastic member 451 is a member for causing the touch panel 102 and the liquid crystal display panel 103a to efficiently vibrate.

Figure 21:
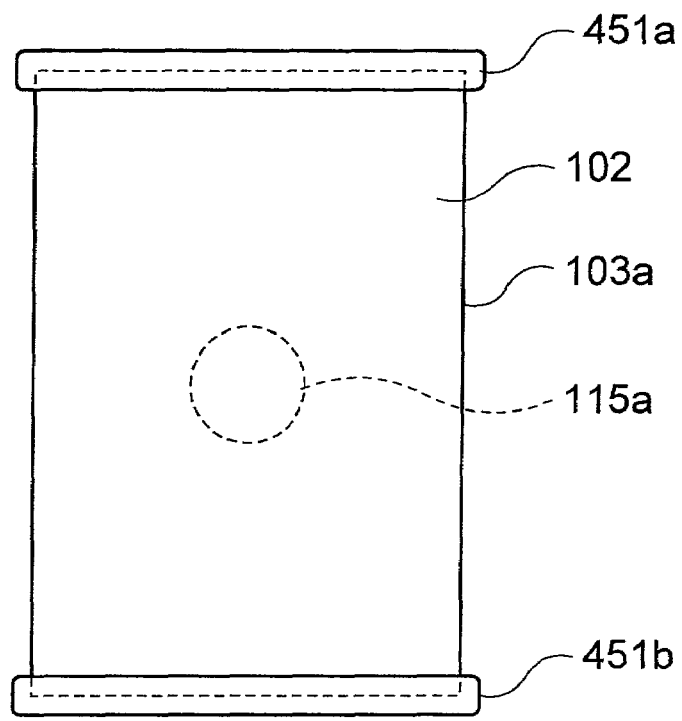
FIG. 21 is a view of another example of placement of an elastic member according to this modification.
Figure 22:
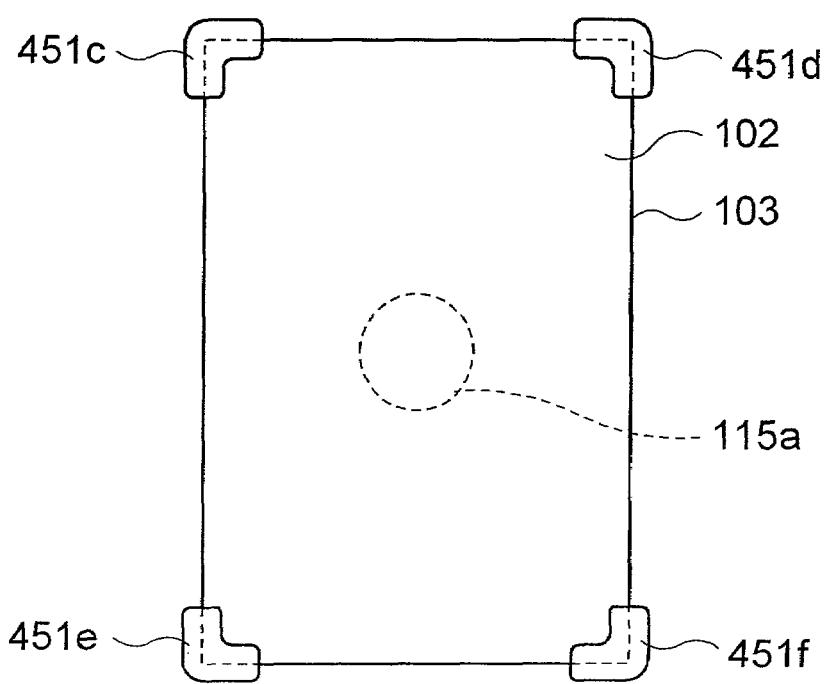
FIG. 22 is a view of another example of placement of an elastic member according to this modification.

Note that the elastic member 451, as shown in FIG. 21 and FIG. 22, may also be placed in a plurality of pieces at the periphery of the liquid crystal display panel 103a. Further, the elastic member 451 may also be configured using a spring and the like. The touch panel 102 and the liquid crystal display panel 103a are attached to the main case 401 through the elastic members 451, 451a to 451f shown in FIG. 20 to FIG. 22, thereby enabling the effective transmission of the vibration generated by the oscillatory actuators 115a and 115b to the touch panel 102 and the liquid crystal display panel 103a. In other words, it is possible to give a larger vibration to the user while keeping down the drive power of the oscillatory actuator 115a.

Figure 23:
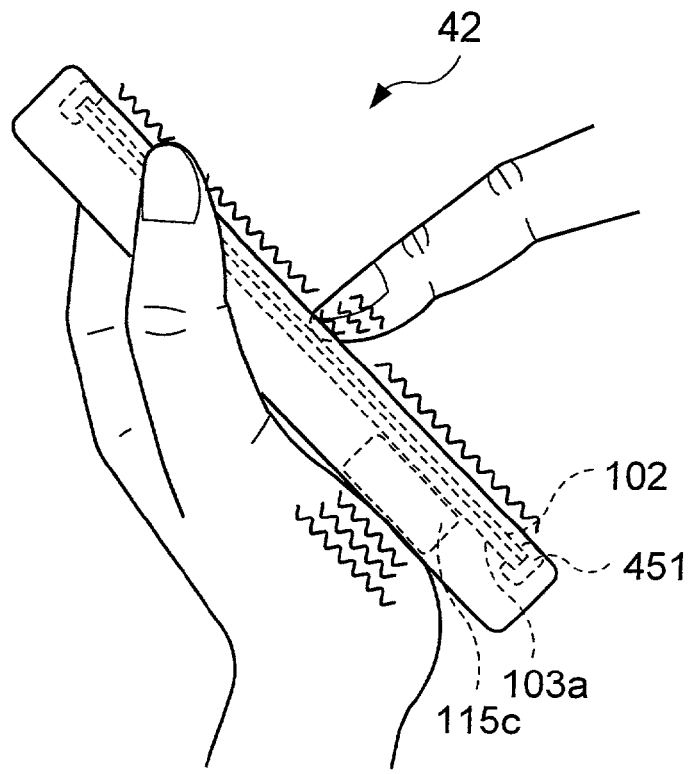
FIG. 23 is a view illustrating an internal structure of a PDA according to a second modification of this embodiment.

Further, as shown in FIG. 23, it is also possible to place the oscillatory actuator 115c in contact with both the rear surface of the liquid crystal display panel over which the touch panel 102 is laid and the inside of the main case 401 at the back surface side of the PDA 42. When configured in this way, it is possible to transmit the same vibration to the fingertip making the touch operation on the touch panel 102 and the hand holding the PDA 42.

Figure 24:
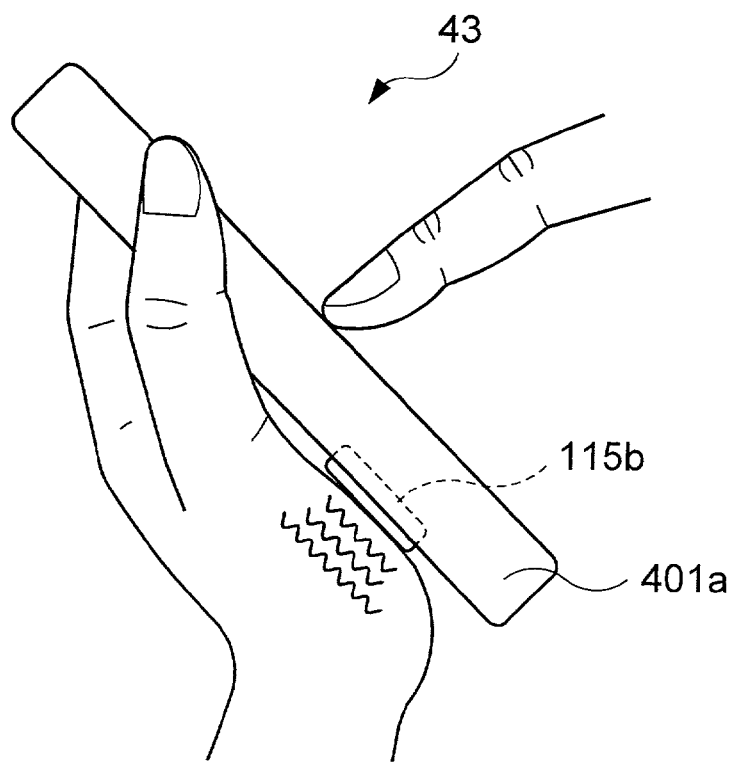
FIG. 24 is a view illustrating an internal structure of a PDA according to a third modification of this embodiment.

Further, as shown in FIG. 24, the oscillatory actuator 115b may be placed partially exposed from the opening provided in the main case 401a and to give vibration directly to the palm of the hand of the user holding the PDA 43. Even in the case of this configuration, it is possible to efficiently transmit the vibration generated by the oscillatory actuator 115 to the user. In this case, since the oscillatory actuator 115b can directly give vibration to the user, vibration can be closely controlled.

[E: Fifth Embodiment]

In this embodiment, description will be made on a place of installation of the vibration generator for causing the touch panel to vibrate.

Figure 25:
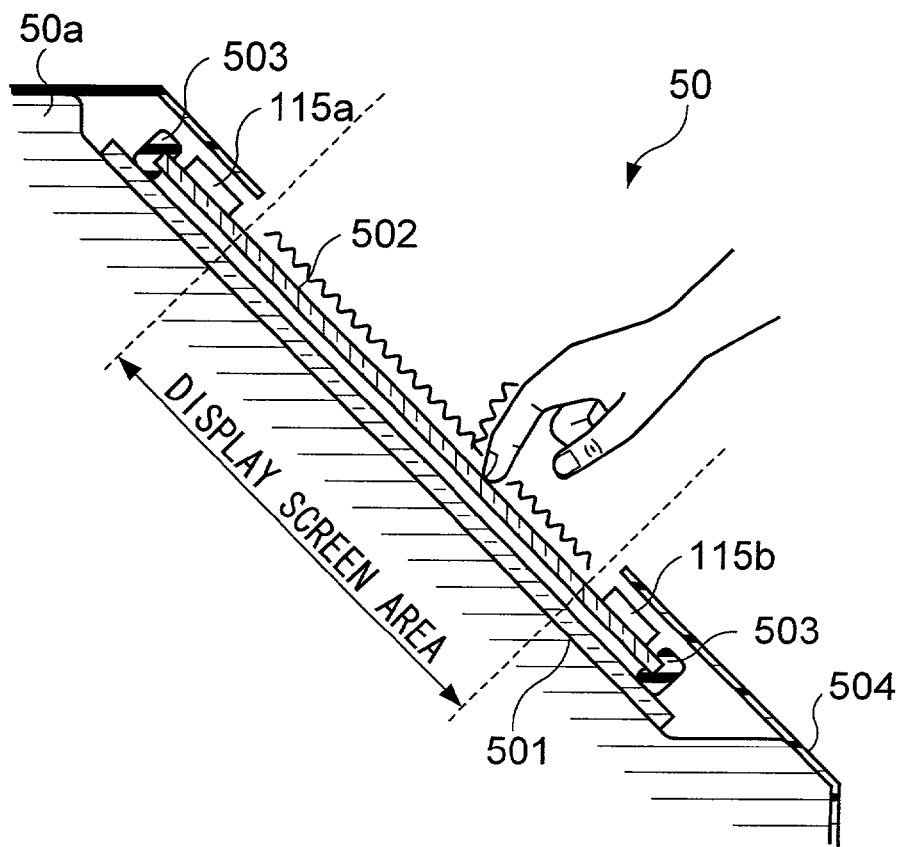
FIG. 25 is a sectional view for explaining an internal structure of an ATM according to a fifth embodiment of the present invention.

FIG. 25 is a sectional view for explaining the internal structure of an ATM 50 according to the present invention. In this figure, a liquid crystal display panel 501 is placed at an incline on the front surface of the main body 50a of the ATM 50. A touch panel 502 is attached to the display surface of the liquid crystal display panel 501 through a damper 503. This touch panel 502 is provided with two oscillatory actuators 115a and 115b above and below the touch surface. Further, a main cover 504 having an opening is provided further outside from the touch panel 502.

Here, the touch panel 502 is configured by a transparent, hard member such as a glass plate. Further, the damper 503 is a vibration absorbing member made of rubber, urethane, sponge, and the like, and attached to the periphery of the touch panel 502. The damper 503 absorbs the vibration component transferred to the liquid crystal display panel 501 out of the vibration generated by the oscillatory actuators 115a and 115b placed on the touch panel 502 and prevents the vibration from being transmitted to the liquid crystal display panel 501. Further, the damper 503 performs the role of causing the touch panel 502 placed on the liquid crystal display panel 501 to efficiently vibrate. Therefore, the damper 503 is preferably configured by an elastic body such as rubber.

The oscillatory actuators 115a and 115b are the same as the oscillatory actuator 115 explained in the first embodiment. Further, the damper 503 and the oscillatory actuators 115*a* and 115*b* are provided at the outside of the display screen area of the liquid crystal display panel 501.

As shown in the figure, the liquid crystal display panel 501 is fixed to the main body 50*a* of the ATM 50. As opposed to this, the touch panel 502 is attached to the liquid crystal display panel 501 through only the damper 503. A clearance is provided between the touch panel 502 and the main cover 504. Therefore, the touch panel 502 vibrates in a direction perpendicular to the front surface of the touch panel 502 due to the vibration generated by the oscillatory actuators 115*a* and 115*b*.

Note that for the control for causing generation of vibration from the oscillatory actuators 115*a* and 115*b* in response to a touch operation on the touch panel 502, control may be performed in the same way as the vibration control processing 1 explained in the first embodiment (see FIG. 5) except for that the oscillatory actuators 115*a* and 115*b* are plural; so an explanation thereof will be omitted. Further, in the present embodiment, the frequencies of the drive signals applied to the oscillatory actuators 115*a* and 115*b* are set to frequencies for causing the touch panel 502 to resonate or frequencies for causing the oscillatory actuators 115*a* and 115*b* themselves to resonate.

As explained above, according to this embodiment, the ATM 50 can make only the touch panel 502 vibrate by vibration generated from the oscillatory actuators 115*a* and 115*b*. The vibration to the liquid crystal display panel 501 is absorbed by the damper 503. Therefore, the content of the screen display of the liquid crystal display panel 501 does not flicker, so the displayed content is easy to view compared with a case causing the liquid crystal display panel and the touch panel to vibrate as in the first embodiment.

Figure 26:
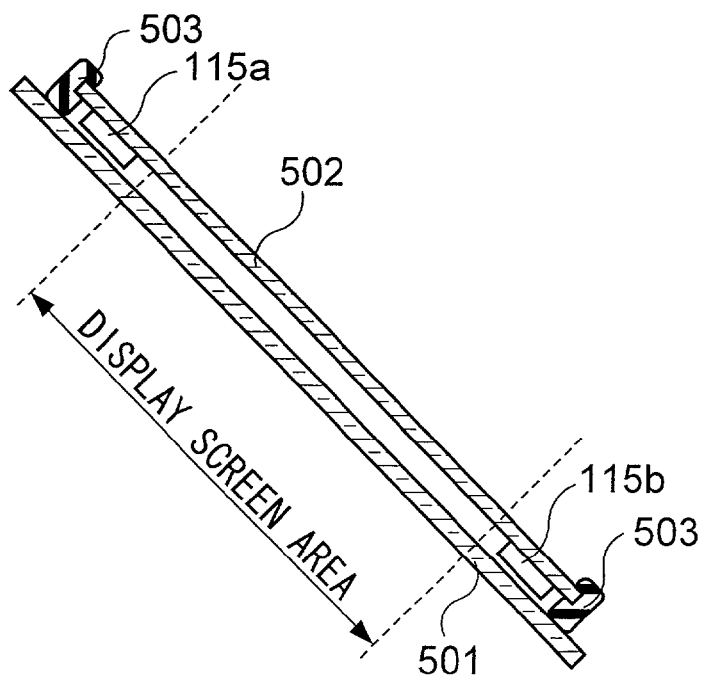
FIG. 26 is a sectional view of a modification of a position of placement of an oscillatory actuator according to this embodiment.
Figure 27:
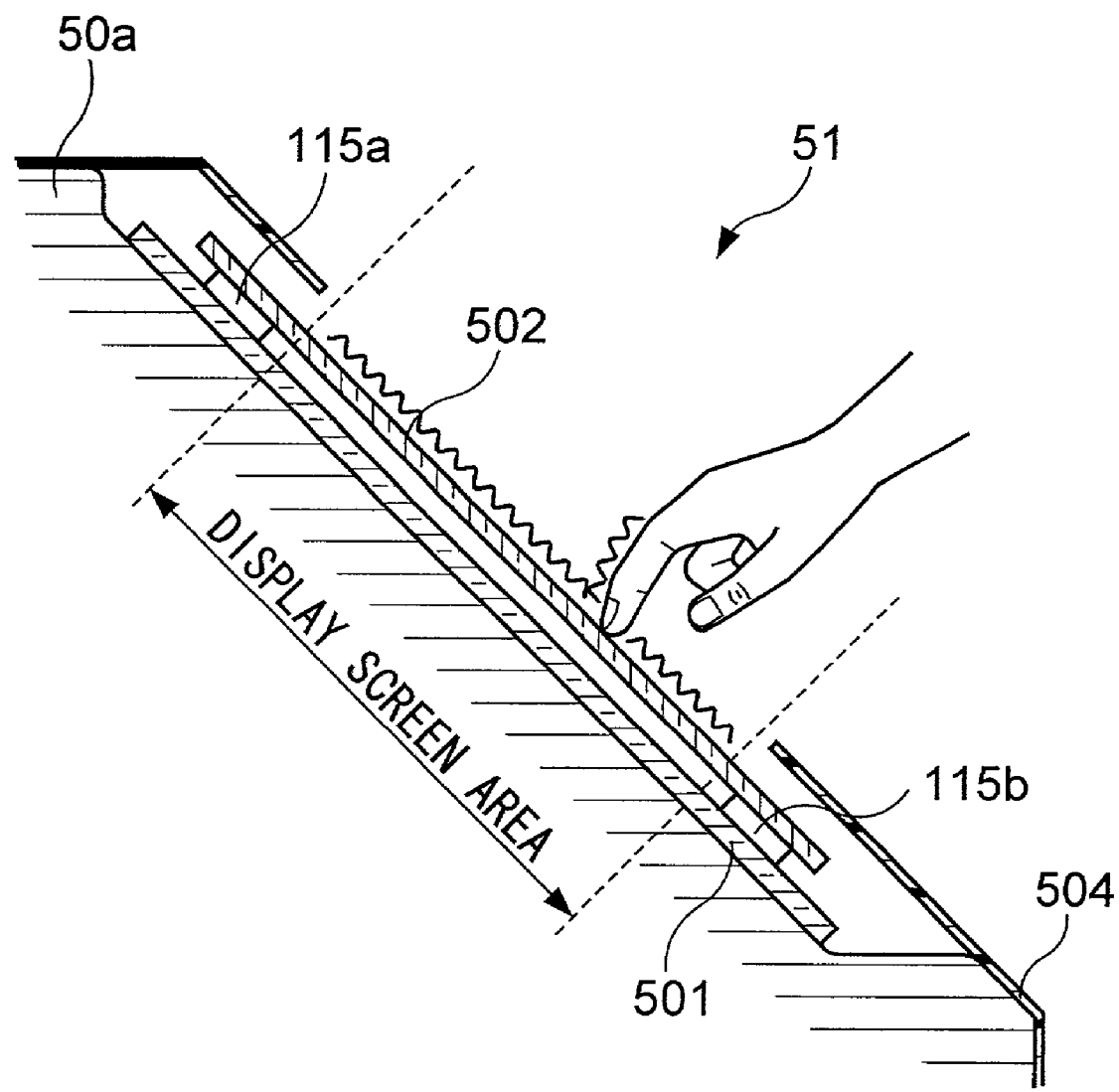
FIG. 27 is a sectional view for explaining an internal structure of an ATM according to a first modification of this embodiment.

Note that as shown in FIG. 26, it is also possible to place the oscillatory actuators 115*a* and 115*b* at the liquid crystal display panel 501 side of the touch panel 502. Further, FIG. 27 is a sectional view for explaining an internal structure of an ATM 51 according to a modification of this embodiment. In the figure, the touch panel 502 is attached through two oscillatory actuators 115*a* and 115*b* to the display surface of the liquid crystal display panel 501 placed at an incline on the front surface side of the main body 50*a* of the ATM 51.

Here, the liquid crystal display panel 501 is fixed to the main body 50*a* of the ATM 51. As opposed to this, the touch panel 502 is attached to the liquid crystal display panel 501 through only the oscillatory actuators 115*a* and 115*b*. A clearance is provided between the touch panel 502 and the main cover 504. Therefore, the touch panel 502 vibrates in a direction perpendicular to the front surface of the touch panel 502 by the vibration generated by the oscillatory actuators 115*a* and 115*b*. Further, since the liquid crystal display panel 501 is fixed to the main body 50*a*, it does not vibrate much at all even though it contacts the oscillatory actuators 115*a* and 115*b*. Therefore, the structure shown in FIG. 27 enables similar effects to be obtained as in the case of the structure shown in FIG. 25.

Figure 28:
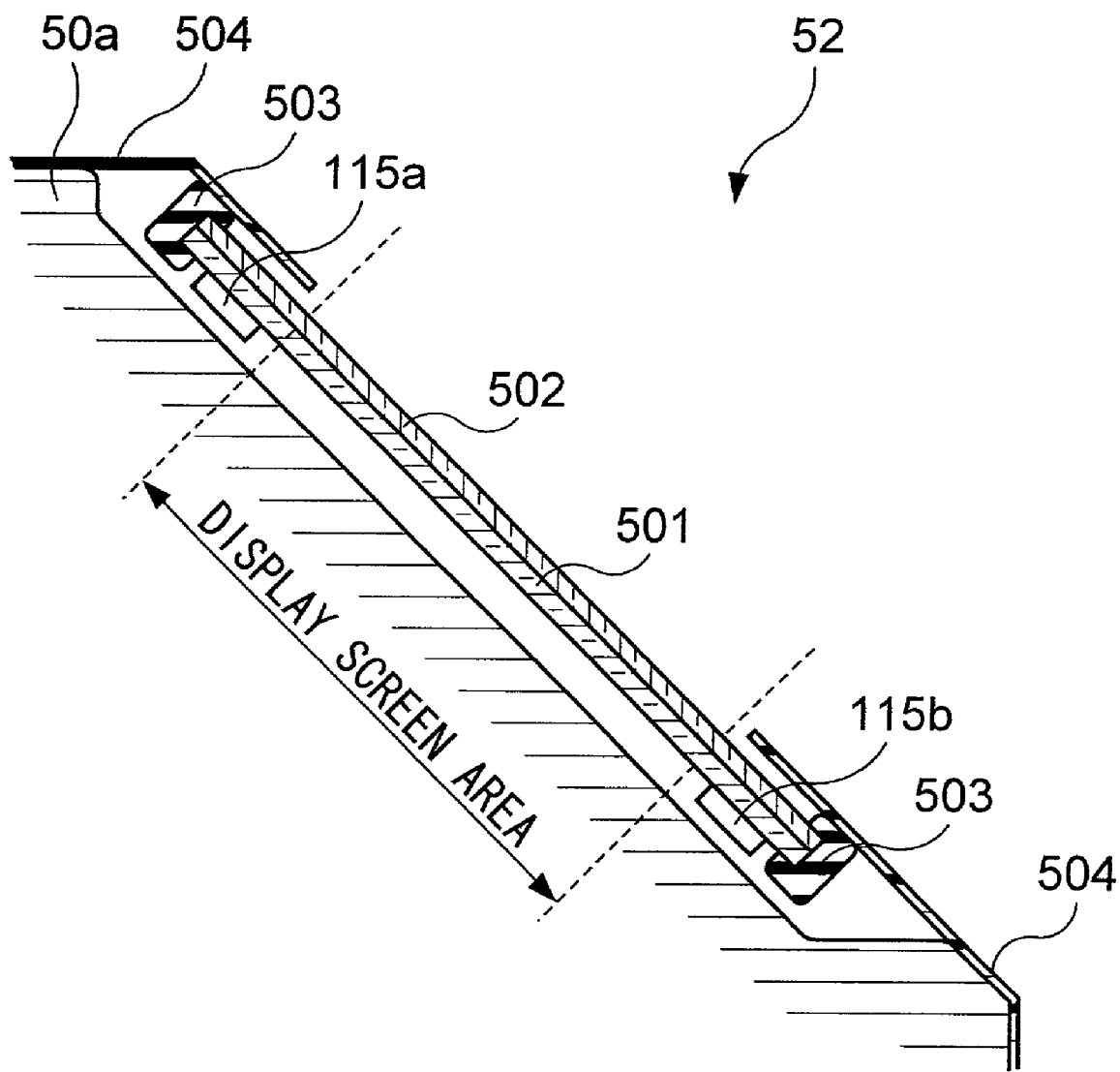
FIG. 28 is a sectional view for explaining an internal structure of an ATM according to a second modification of this embodiment.

Further, FIG. 28 to FIG. 31 are sectional views illustrating internal structures of ATMs 52, 53, 54, and 55 according to other modifications of this embodiment. First, as shown in FIG. 28, it is possible to attach a liquid crystal display panel 501 to the main cover 504 through a damper 503, the liquid crystal display panel having the touch panel 502 laid over its display surface and having oscillatory actuators 115*a* and 115*b* placed at its rear surface. In this case, a clearance is provided between the liquid crystal display panel 501 and main body 50*a* of the ATM 52. By adopting this configuration, it is possible to cause the touch panel 502 to vibrate in a direction perpendicular to its front surface by the vibration generated by the oscillatory actuators 115*a* and 115*b*. Note that the damper 503 in this modification performs the function of causing the touch panel 502 and liquid crystal display panel 501 to efficiently vibrate.

Figure 29:
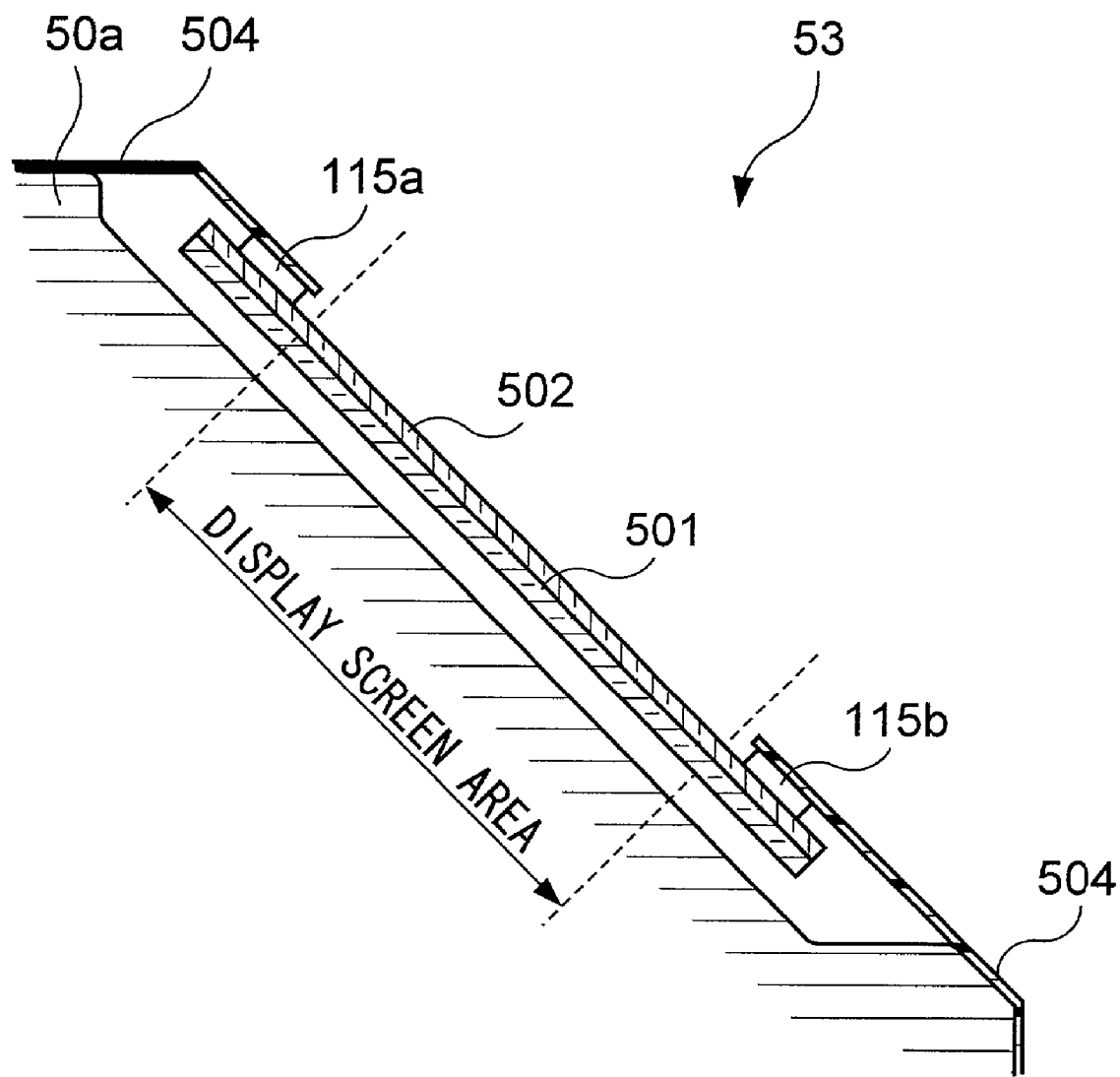
FIG. 29 is a sectional view for explaining an internal structure of an ATM according to a third modification of this embodiment.

Further, as shown in FIG. 29, it is also possible to attach the liquid crystal display panel 501 having the touch panel 502 laid on its display surface to the main cover 504 through the oscillatory actuators 115*a* and 115*b*. In this case as well, a clearance is provided between the liquid crystal display panel 501 and the main body 50*a* of the ATM 53. In this configuration as well, in the same way as in the case shown in FIG. 28, it is possible to cause the touch panel 502 to vibrate by the vibration generated by the oscillatory actuators 115*a* and 115*b*.

Figure 30:
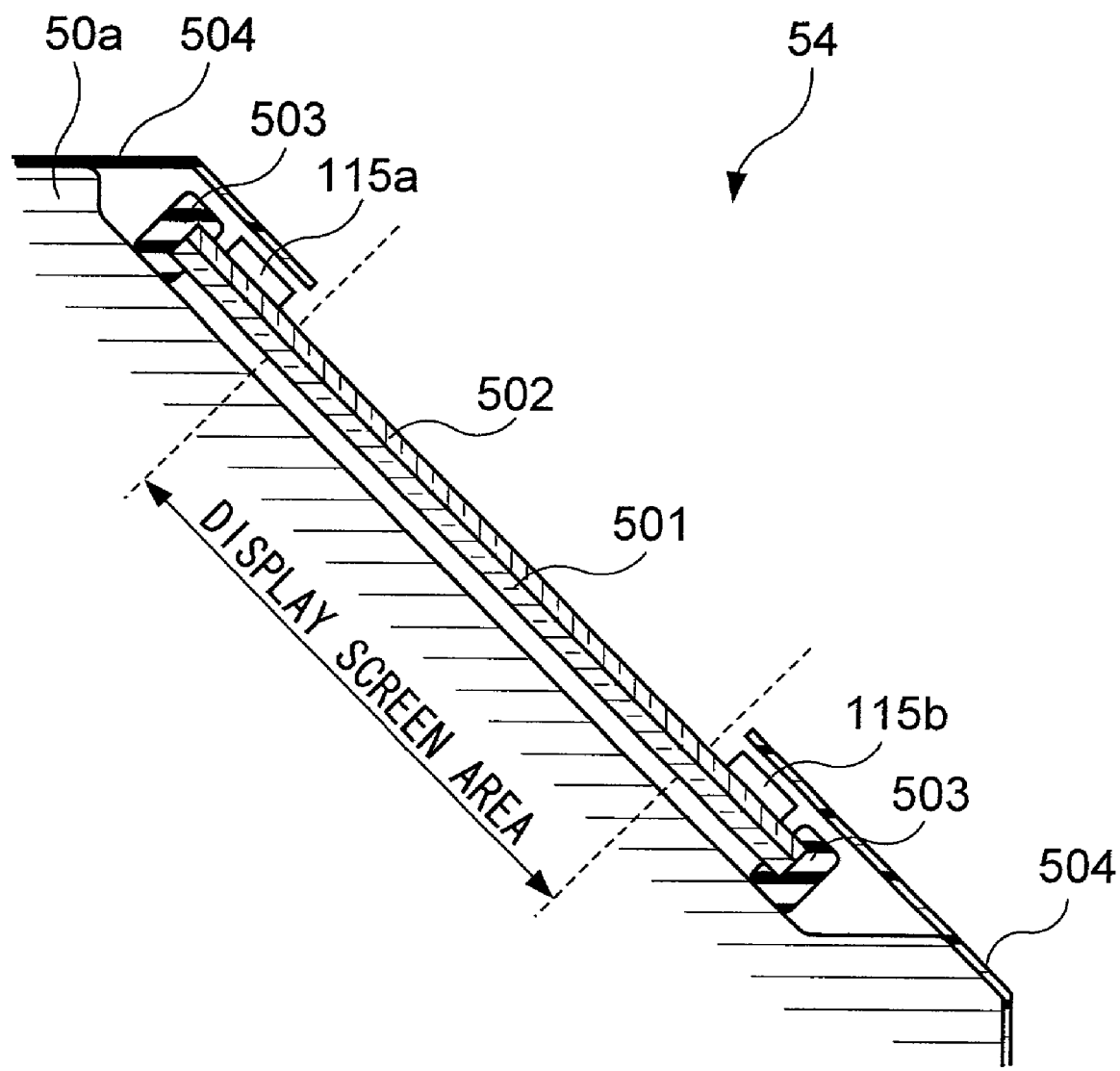
FIG. 30 is a sectional view for explaining an internal structure of an ATM according to a fourth modification of this embodiment.

Alternatively, as shown in FIG. 30, it is also possible to attach the liquid crystal display panel 501 to the main body 50*a* of the ATM 54 through the damper 503, the liquid crystal display panel 501 having the touch panel 502 laid on its display surface and having the oscillatory actuators 115*a* and 115*b* placed at its rear surface. In this case, a clearance is provided between the liquid crystal display panel 501 and the main cover 504. In this configuration as well, it is possible to cause the touch panel 502 to vibrate in a direction perpendicular to its front surface by vibration generated by the oscillatory actuators 115*a* and 115*b*.

Figure 31:
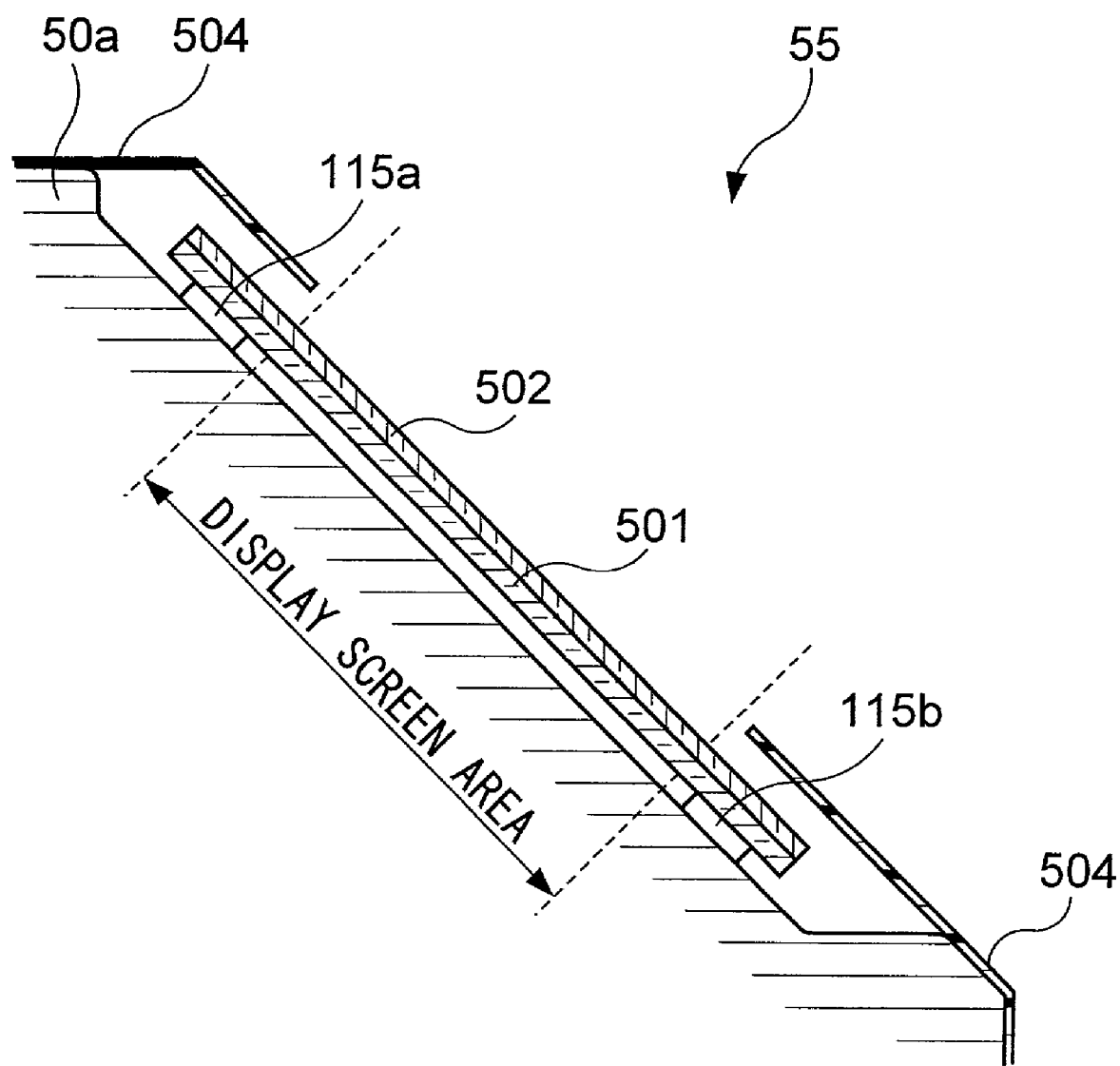
FIG. 31 is a sectional view for explaining an internal structure of an ATM according to a fifth modification of this embodiment.

Further, as shown in FIG. 31, it is also possible to attach the liquid crystal display panel 501 having the touch panel 502 laid on its display surface to the main body 50*a* of the ATM 55 through the oscillatory actuators 115*a* and 115*b*. In this case as well, a clearance is provided between the liquid crystal display panel 501 and the main cover 504. By this configuration as well, in the same way as the case shown in FIG. 30, it is possible to cause the touch panel 502 to vibrate by the vibration generated by the oscillatory actuators 115*a* and 115*b*.

All of the modifications shown in FIG. 28 to FIG. 31 cause the touch panel 502 to vibrate together with the liquid crystal display panel 501, but ATMs 52 to 55 can report to the fingertip of the user performing the touch operation by vibration that a touch operation to the touch panel 502 has been received.

Note that in this embodiment, the explanation was made of the case of employing a liquid crystal display as the display. The display, however, may also be a CRT, plasma display, or an EL (electronic luminescence) display, etc. Further, the number of the oscillatory actuators 115*a* and 115*b* may be any number. Further, the damper 503 may also be configured using a spring and the like.

[F: Sixth Embodiment]

In the present embodiment, description will be given on an electronic device reporting that an operation input has been received to the user by vibration of a mode that differs according to the type of the operation input. Note that in this embodiment, the explanation will be made based on the PDA 10 explained in the first embodiment. Therefore, the same reference numerals are used for portions common with the first embodiment. Further, explanations of portions common with the first embodiment will be omitted.

[F-1: First Example]

Figures 32, 33:
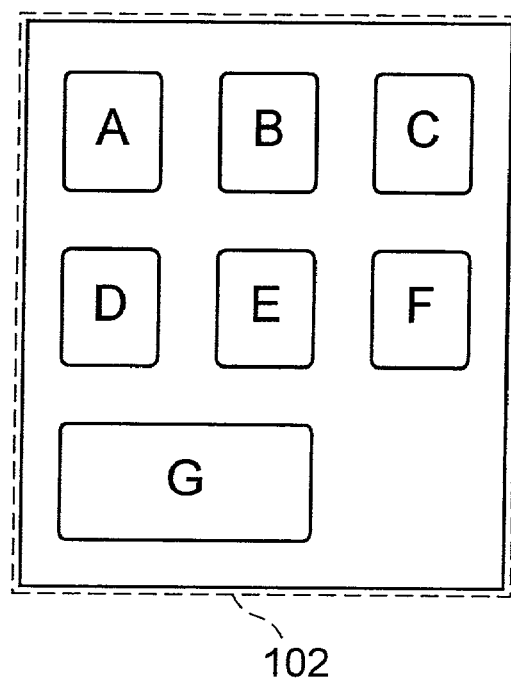
FIG. 32 is a view of an example of the screen display of a PDA according to a first example of a sixth embodiment of the present invention.
FIG. 33 is a view illustrating a waveform data table stored in a memory in a PDA according to the first example of this embodiment.
Figure 34:
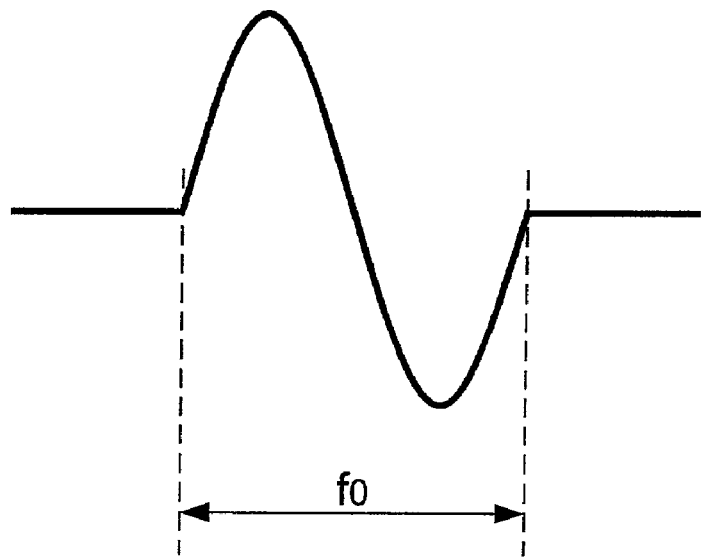
FIG. 34 is a view illustrating a waveform of a drive signal applied to an oscillatory actuator in a PDA according to the first example of this embodiment.
Figure 35:
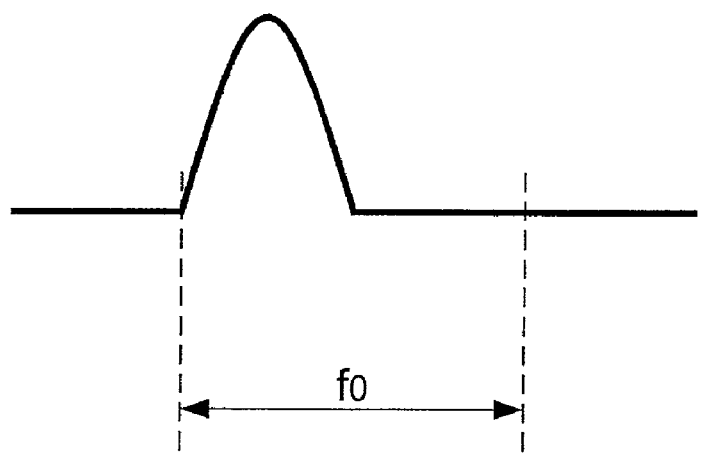
FIG. 35 is a view illustrating a waveform of a drive signal applied to an oscillatory actuator in a PDA according to the first example of this embodiment.
Figure 36:
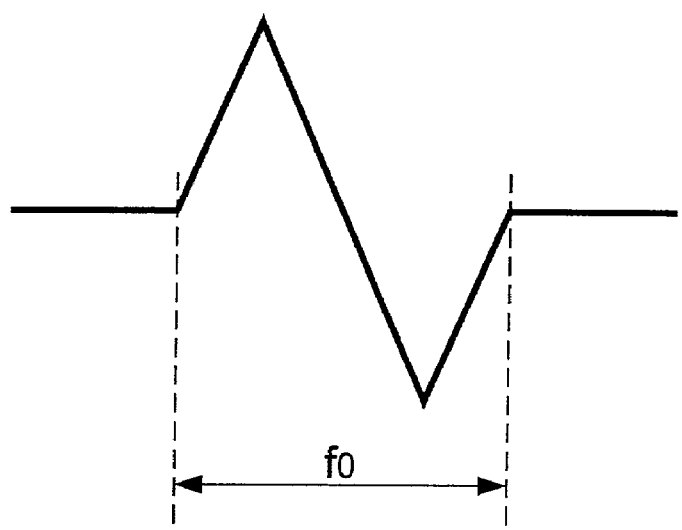
FIG. 36 is a view illustrating a waveform of a drive signal applied to an oscillatory actuator in a PDA according to the first example of this embodiment.
Figure 37:
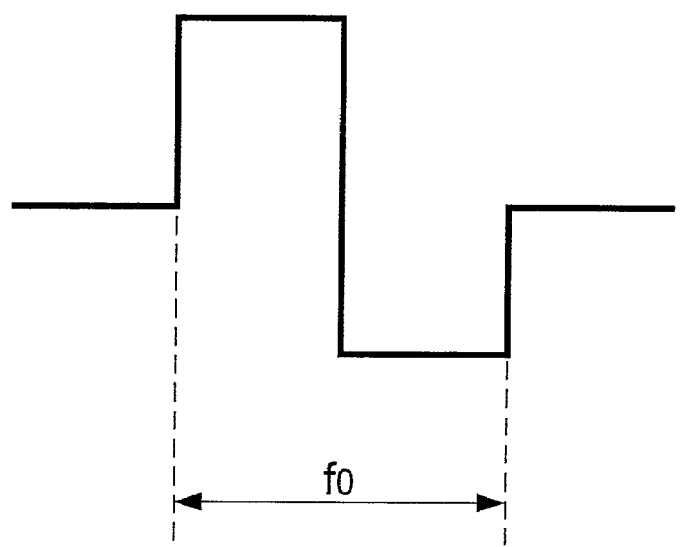
FIG. 37 is a view illustrating a waveform of a drive signal applied to an oscillatory actuator in a PDA according to the first example of this embodiment.

FIG. 32 is a view of an example of the screen display of the PDA 10 according to a first example of present embodiment. As shown in the figure, the display screen of the PDA 10 shows a plurality of touch buttons "A" to "G". The touch panel 102 overlaid on the display screen detects a touch operation when a user touches a displayed touch button by his or her fingertip. Note that the letters assigned to the touch buttons are only given for identifying the touch buttons.

Next, FIG. 33 is a view illustrating a waveform data table 112a stored in the memory 112 in the PDA 10. As shown in the figure, the waveform data table 112a stores, for each touch button displayed on the screen, area data showing the area occupied by a touch button on the touch panel 102 using XY coordinates as well as waveform data of the drive signal to be applied to the oscillatory actuator 115 when that touch button is pressed.

Here, the waveform of the drive signal linked with each touch button differs in amplitude or shape as illustrated in FIG. 34 to FIG. 37. In these figures, the frequency $f_0$ of the drive signal is a frequency causing any one of the main case 101 of the PDA 10, the liquid crystal display panel 103a provided with the touch panel 102, and the oscillatory actuator 115 to resonate. The above-mentioned waveform data table 112a stores the frequency data, amplitude data, and the like required for generating these drive signals as the waveform data.

When a user touches the touch panel 102 of the PDA 10 having this configuration with his or her fingertip, the touch panel 102 detects that touch operation and outputs a touch signal to the CPU 113. The CPU 113 finds the XY coordinate data of a touched position based on the touch signal, refers to the waveform data table 112a, and identifies the pressed touch button. Next, the CPU 113 reads from the waveform data table 112a the waveform data of the drive signal linked with the identified touch button.

Subsequently, the CPU 113 outputs the read waveform data to the drive signal generation circuit 114. At the same time, the CPU 113 instructs the generation of the drive signal to the drive signal generation circuit 114. The rest of the processing is similar to the processing in step S103 and the following steps of the vibration control processing 1 explained in the first embodiment (see FIG. 5), so an explanation thereof will be omitted.

As explained above, according to the first example of this embodiment, in the case of detecting a touch operation on the touch panel 102, the CPU 113 first detects a touched position and identifies the operated touch button. The CPU 113 then causes vibration to be generated from the oscillatory actuator 115 by a vibration mode linked with the type of the touch button. Therefore, the PDA 10 can change the mode of vibration reporting that a touch operation has been approved in accordance with the operated touch button.

Note that when a location on the touch panel 102 not corresponding to any touch button is pushed by the user, vibration showing that the touch operation was invalid may also be generated from the oscillatory actuator 115. Further, it is also possible to change the vibration mode such as changing the vibration time, the number of vibrations, or the like.

Further, the invention according to the first example of the present embodiment can also be applied to an electronic device having a plurality of operation keys instead of the touch panel 102. In this case, the memory stores the waveform data for each operation key. Further, in the case of detecting that an operation key has been operated, the operating unit of the electronic device reads out the waveform data for the operated key from the memory to drive the vibration generator. By adopting this configuration, it is possible to change the mode of vibration for reporting that a key operation has been received at the electronic device in accordance with the operated key.

[F-2: Second Example]

Figure 38:
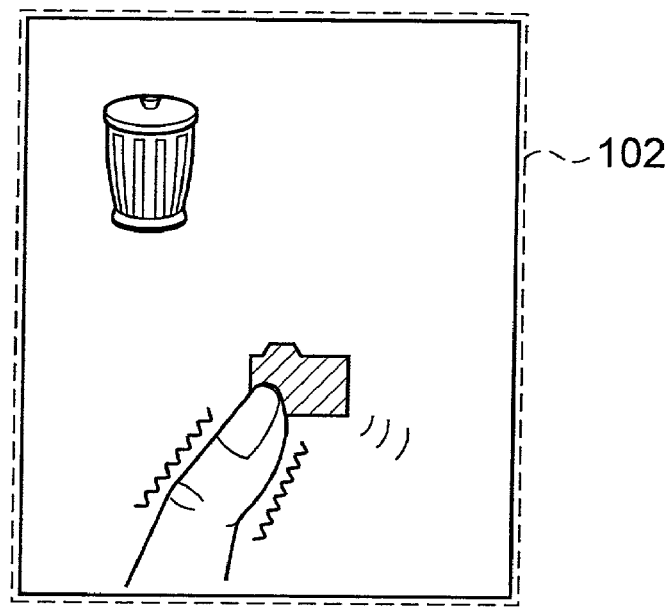
FIG. 38 is a view of an example of the screen display of a PDA according to a second example of this embodiment.
Figure 39:
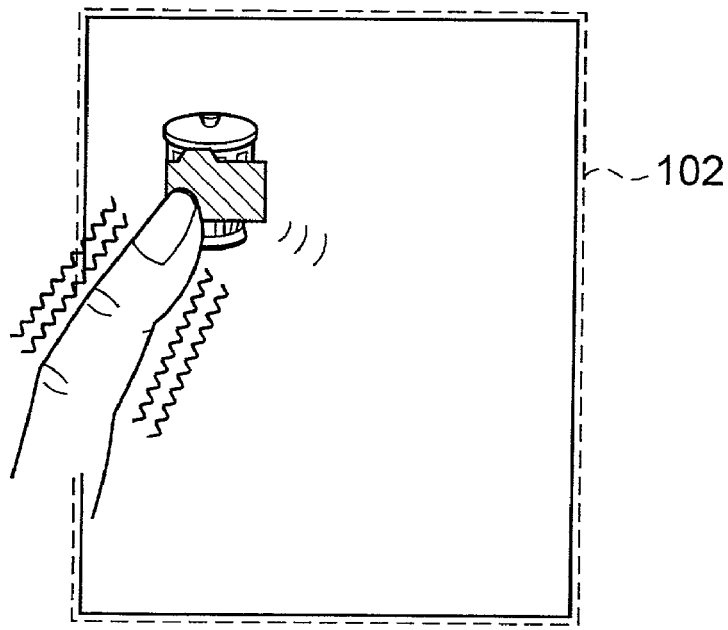
FIG. 39 is a view of an example of the screen display of a PDA according to the second example of this embodiment.

FIG. 38 and FIG. 39 are views illustrating the state where a user is dragging an icon displayed on the display screen of the PDA 10 by a touch operation on the touch panel 102 to transfer it to the "trash". Note that the "trash" spoken of here is an icon for instructing deletion of data.

First, when a user selects the icon desired to be dragged by the touch operation on the touch panel 102, the CPU 113 of the PDA 10 detects the touched position and identifies the touch operation as an instruction for the selection of the icon. The memory 112 of the PDA 10 stores the waveform data table 112b, as shown in FIG. 40, storing the waveform data of the drive signal to be applied to the oscillatory actuator 115 for each type of instruction designated by an operation input.

The CPU 113 reads the waveform data linked with "SELECT ICON" from the waveform data table 112b and drives the oscillatory actuator 115. As a result, the fingertip of the user performing the touch operation or the hand of the user holding the PDA 10 is given vibration indicating that the icon is selected.

Further, as shown in FIG. 38, when the user moves his or her fingertip while in contact with the touch panel 102 to drag the selected icon, the CPU 113 identifies the touch operation as an instruction for the dragging of the icon. Therefore, the CPU 113 reads the waveform data linked with "DRAG" from the waveform data table 112b and drives the oscillatory actuator 115. Due to this, vibration showing that a drag operation is under way is transmitted to the user. For example, when a drag operation is under way, it is preferable to continuously give a weak vibration.

Further, as shown in FIG. 39, when the dragged icon is superposed over the trash, the CPU 113 identifies the touch operation as instruction for the placement of the icon in the trash. Therefore, while the CPU 113 stores the icon in the trash, it reads the waveform data linked with "DELETE DATA" from the waveform data table 112b and drives the oscillatory actuator 115. As a result, the user performing the touch operation is given vibration indicating deletion of the icon.

As explained above, according to the second example of this embodiment, in the case of detecting a touch operation on the touch panel 102, the CPU 113 first identifies the type of the instruction designated by the touch operation. Further, the CPU 113 causes the oscillatory actuator 115 to generate vibration by a mode of vibration linked with the type of the identified instruction. Thus, the PDA 10 can change the mode of vibration for reporting that the touch operation has been received in accordance with the type of instruction designated by the touch operation.

[F-3: Third Example]

Figures 41, 42:
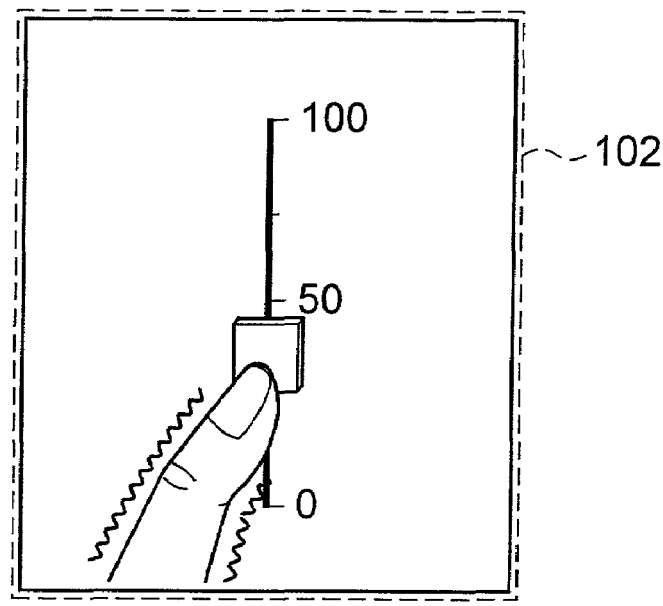
FIG. 41 is a view of an example of the screen display of a PDA according to a third example of this embodiment.
FIG. 42 is a view illustrating a waveform data table stored in a memory in a PDA according to the third example of this embodiment.

FIG. 41 is a view of an example of the screen display of a PDA 10 according to a third example of this embodiment. As shown in the figure, the display screen of the PDA 10 displays a "scale" and "knob" for adjusting the value of a parameter such as the level of sound of the PDA 10 or the brightness of the screen. The user can drag and change the position of the "knob" displayed on the screen by a touch operation on the touch panel 102.

First, when the user clicks on the "knob" by a touch operation on the touch panel 102, the CPU 113 of the PDA 10 recognizes that the "knob" has been clicked. Further, the CPU 113 gives the user vibration showing that the "knob" has been clicked.

Next, when the user moves his or her fingertip while in contact with the touch panel 102 and drags the "knob" along the "scale", the CPU 113 recognizes that the "knob" is being dragged. Here, the memory 112 of the PDA 10 according to the third example of this embodiment stores the waveform data table 112c shown in FIG. 42. This waveform data table 112c divides the range of values which the parameter can take into several sections and stores waveform data of the drive signal to be applied to the oscillatory actuator 115 for each section.

The CPU 113 obtains the value of the parameter in accordance with the position of the dragged "knob", reads the waveform data linked with the current value of the parameter from the waveform data table 112c, and drives the oscillatory actuator 115. Therefore, while the "knob" is being dragged, the fingertip of the user performing the touch operation or the hand of the user holding the PDA 10 is given vibration in accordance with the value of the parameter.

Figure 43:
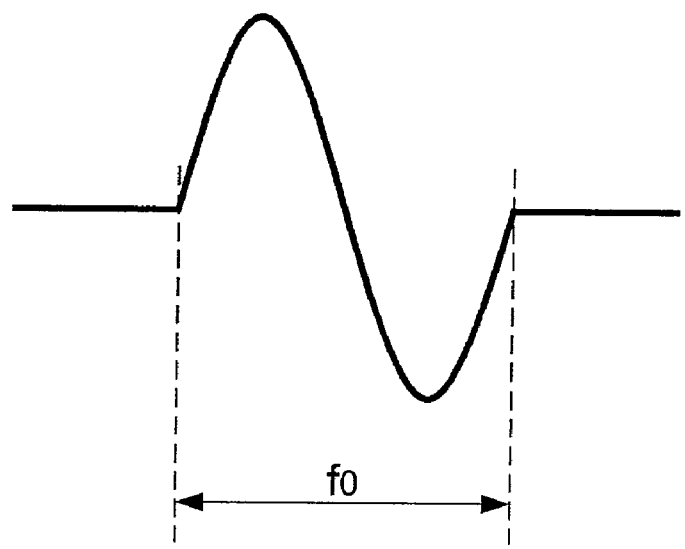
FIG. 43 is a view illustrating a waveform of a drive signal applied to an oscillatory actuator in a PDA according to the third example of this embodiment.
Figure 44:
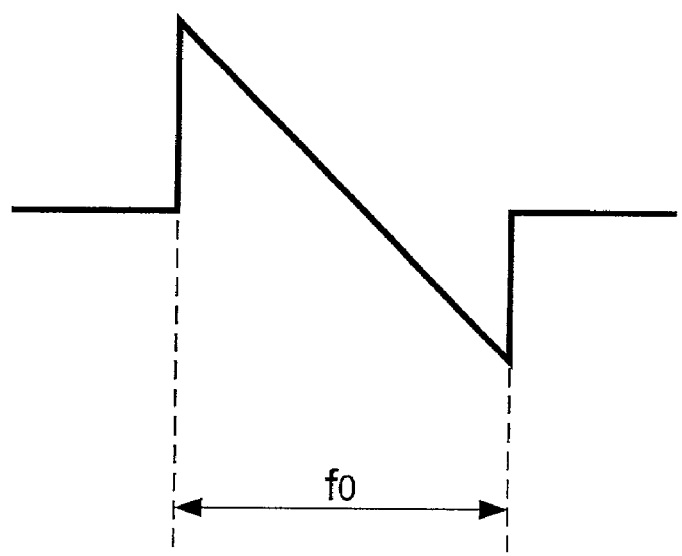
FIG. 44 is a view illustrating a waveform of a drive signal applied to an oscillatory actuator in a PDA according to the third example of this embodiment.
Figures 45, 46:
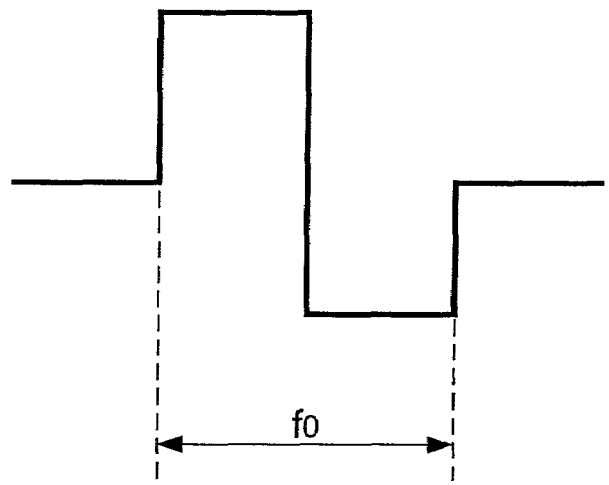
FIG. 45 is a view illustrating a waveform of a drive signal applied to an oscillatory actuator in a PDA according to the third example of this embodiment.
FIG. 46 is a view illustrating a waveform data table stored in a memory in a PDA according to a seventh embodiment of the present invention.

Note that as explained below, it is also possible to perform processing for synthesizing a waveform of a drive signal. For example, when the value of the parameter may be a numeric value in the range from "0" to "100", as shown in FIG. 43 to FIG. 45, the waveform data sets of the drive signals for the case where the value of the parameter is "0" (FIG. 43), for the case where the value of the parameter is "50" (FIG. 44), and the case where the value of the parameter is "100" (FIG. 45) are stored in the memory 112. When the current value of the parameter is "40", the CPU 113 synthesizes two waveforms in the ratio of the waveform of the value of a parameter "0" to the waveform of the value of a parameter "50" as 1 to 4. Further, the CPU 113 applies the synthesized waveform to the oscillatory actuator 115 as the drive signal.

Further, it can also change only the amplitude of the drive signal in proportion to the value of the parameter and change the magnitude of the vibration.

As explained above, according to the third example of the present embodiment, in the case of detecting a touch operation for changing the value of the parameter on the touch panel 102, the CPU 113 causes the oscillatory actuator 115 to generate vibration in the mode of vibration linked with the value of the parameter changed by the touch operation. Thus, the PDA 10 can change the mode of vibration for reporting that a touch operation has been received according to the value of the parameter changed by this touch operation.

Figure 78:
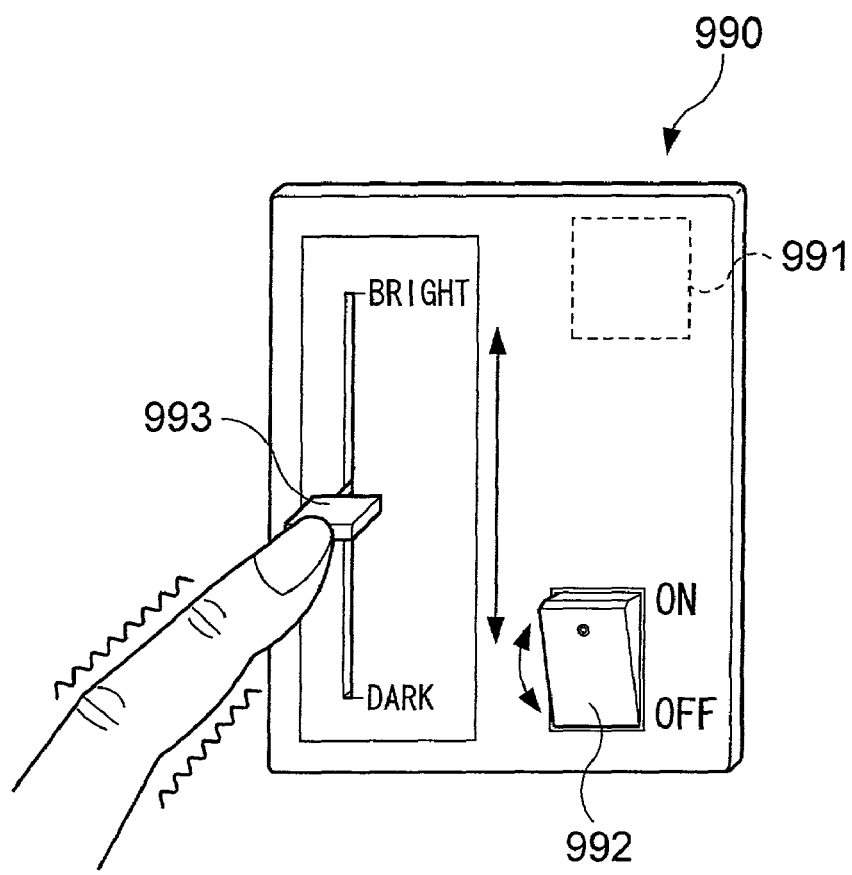
FIG. 78 is a view illustrating an operation panel according to a third modification of the present invention.
Figure 79:
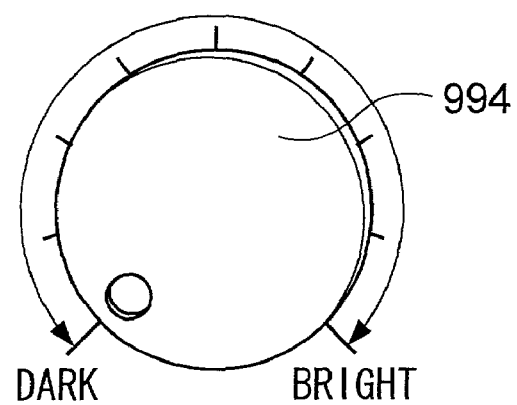
FIG. 79 is a view illustrating a dial type switch according to this modification.

Note that the aspect of the invention according to the third example of the present embodiment can also be applied to an electronic device having an operating member for changing seamlessly a variable value of the parameter (for example a slider switch 993 illustrated in FIG. 78, a dial type switch 994 illustrated in FIG. 79, etc.). In this case, in the case of detecting that the operating member has been operated, the operating unit of the electronic device causes the vibration generator to generate vibration in a mode of vibration linked with the value of the parameter changed by the operation of the operating member. As a result, the mode of vibration for reporting that operation of the operating member has been received by the electronic device can be changed in accordance with the value of the parameter changed by operation of the operating member.

[G: Seventh Embodiment]

In this embodiment, explanation will be given on an electronic device for reporting to the user that a touch operation has been received by vibration of a mode that differs in accordance with the level of pressure of the touch operation on the touch panel. Note that in this embodiment, the explanation will be given based on the PDA 10 explained in the first embodiment. Therefore, the same reference numerals will be used for portions common with the first embodiment. Further, explanations of portion common with the first embodiment will be omitted.

In this embodiment, the touch panel of the PDA 10 can detect two operating states, that is, the state where the fingertip of the user is in contact with the touch panel (hereinafter, in this embodiment, called a "touch operation") and the state where the fingertip is pressing the touch panel by a force of more than a predetermined level of pressure (hereinafter, in this embodiment, called a "pressing operation"). The type of touch signal output from the touch panel to the CPU 113 differs from the case of a touch operation to the case of a pressing operation.

Further, the memory 112 of the PDA 10 according to the present embodiment stores the waveform data table 112d shown in FIG. 46. The waveform data table 112d corresponds to the example of the screen display of the touch buttons shown in FIG. 32. The waveform data table 112d stores for each touch button the area data for the touch button and the waveform data to be applied to the oscillatory actuator 115 for each of the cases when the touch button is subjected to a touch operation and when it is subjected to a pressing operation.

In a PDA 10 having this configuration, when a touch operation is performed on the touch panel, the touch panel outputs to the CPU 113 a touch signal showing that a touch operation has been performed. The CPU 113 finds the coordinate data of the touched position based on the touch signal and identifies the touch button operated referring to the waveform data table 112d. Next, the CPU 113 reads the waveform data for the touch operation linked with the identified touch button from the waveform data table 112d. The CPU 113 then drives the oscillatory actuator 115 using the drive signal generated by the read waveform data. The same is true for the case when a pressing operation is performed on the touch panel. The CPU 113 reads the waveform data for the pressing operation linked with the operated touch button from the waveform data table 112d and drives the oscillatory actuator 115.

By adopting this configuration, when for example the user moves his or her fingertip in a state contacting but not pressing against the touch panel to find the position of a touch button, the PDA 10 transmits to the user vibration for the touch operation linked with the type of touch button contacted by the fingertip. That is, in the state where the user is searching the position of a touch button, for example, a weak vibration that differs for each type of touch button is transmitted to the user. On the other hand, when the user finds the desired touch button and presses against the touch button, the PDA 10 transmits to the user vibration for the pressing operation linked with the type of the touch button. That is, when the user presses against a touch button, vibration showing that the operation has been received is given to the user.

Such control for the report by vibration is particularly effective when the visual confirmation of operation input is difficult. For example, it is effective when applied to a car navigation system. Further, even in a general electronic device, it is effective when performing operation input by touch at night in a state where there is no light.

As explained above, according to the present invention, in the case of detecting operation input to the touch panel, the CPU 113 causes the oscillatory actuator 115 to generate vibration by a mode of vibration differs for the case of a touch operation to the case of a pressing operation. Therefore, the PDA 10 can change the mode of vibration for reporting that an operation input has been received in accordance with the method of operation input to the touch panel.

Note that it is also possible to use a combination of a touch panel for receiving as operation input the state of the fingertip of the user in contact with the touch panel and a touch panel for receiving as operation input pressure of more than a predetermined level of pressure by the fingertip of the user. Further, the number of such combined touch panels is not limited to two.

[H: Eighth Embodiment]

In the present embodiment, description will be given on an electronic device having an audio report mode for reporting that an operation input has been received by sound as well as a vibration report mode for reporting that an operation input has been received by vibration; the electronic device switches the report mode in accordance with the level of sound of its surroundings. Note that in this embodiment, the same reference numerals will be used for portions common with the first embodiment. Further, an explanation of portions common with the first embodiment will be omitted.

[H-1: Configuration of Eighth Embodiment]

Figure 47:
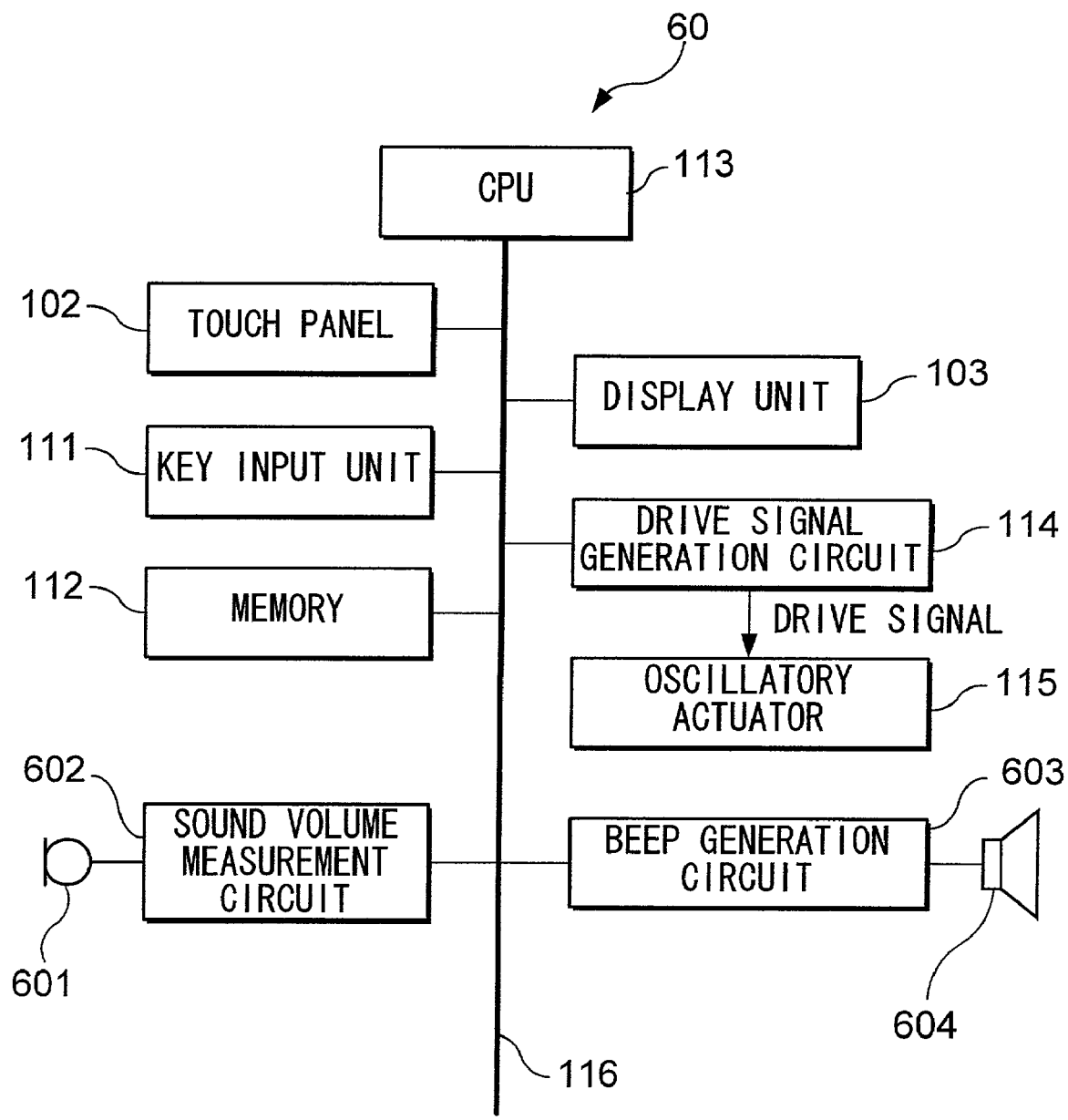
FIG. 47 is a block diagram illustrating the hardware configuration of a PDA according to an eighth embodiment of the present invention.

FIG. 47 is a block diagram illustrating the hardware configuration of a PDA 60. As shown in the figure, the PDA 60 has a touch panel 102, a display unit 103, a key input unit 111, a memory 112, a CPU 113, a drive signal generation circuit 114, an oscillatory actuator 115, a microphone 601, a sound volume measurement circuit 602, a beep generation circuit 603, and a speaker 604.

The sound volume measurement circuit 602 measures the level of sound based on the analog signal waveform of the surrounding sound of the PDA 60 obtained from the microphone 601 and outputs the result of measurement to the CPU 113. The beep generation circuit 603 generates a drive signal to be applied to the speaker 604 in accordance with an instruction from the CPU 113. The drive signal is applied to the speaker 604 and a beep is generated.

The PDA 60 has an audio report mode which reports that an operation input has been received by a beeping sound and a vibration report mode which reports that an operation input has been received by vibration. The CPU 113 executes a report control processing 1 (see FIG. 48) and reports to the user by a beeping sound or vibration that a touch operation to the touch panel 102 has been received. At this time, the CPU 113 switches the report mode to the audio report mode or the vibration report mode in accordance with the results of measurement by the sound volume measurement circuit 602. The switching control of the report mode is performed because at a noise of more than a certain level such as in the street, a report by a beeping sound is little effective. When the CPU 113 determines that the surrounding volume of the PDA 60 is more than a preset level of sound, it selects at least the vibration report mode.

[H-2: Operation of Eighth Embodiment]

Figure 48:
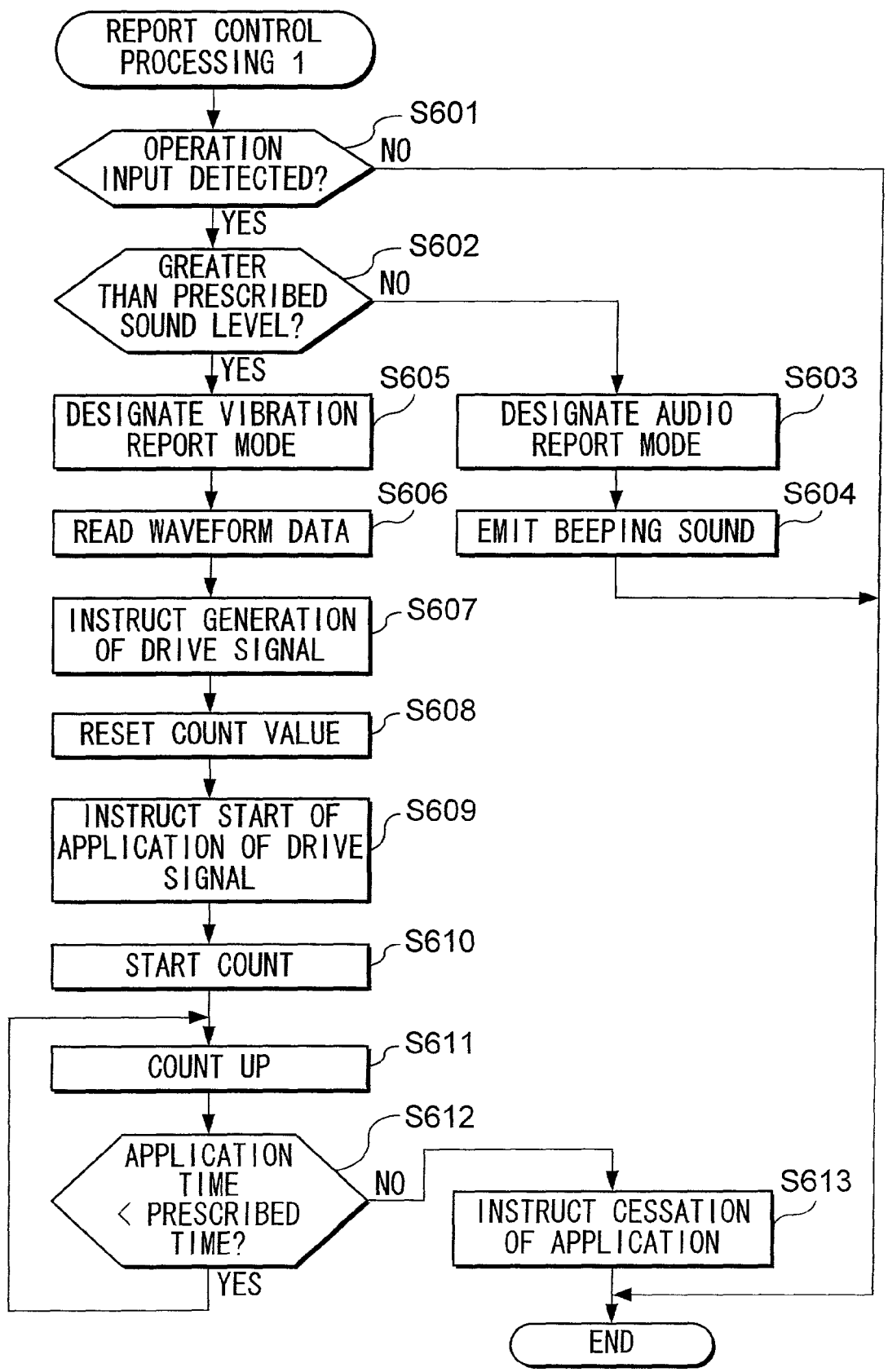
FIG. 48 is a flow chart for explaining the operation of a report control processing 1 executed by the CPU in a PDA according to this embodiment.

FIG. 48 is a flow chart for explaining the operation of the report control processing 1 executed by the CPU 113 in a PDA 60 according to this embodiment. This report control processing 1 is executed by the CPU 113 at every predetermined period in a period in which a touch operation on the touch panel 102 is permitted.

As shown in the figure, first, the CPU 113 determines whether a touch signal has been input from the touch panel 102 (step S601). The CPU 113 ends the report control processing 1 when it is determined that a touch signal has not been input. On the other hand, when it is determined that an operation input has been input, the CPU 113 then determines whether the sound volume of the surroundings of the PDA 60 is higher than a preset level of sound based on the results measured by the sound volume measurement circuit 602 (step S602). When the sound volume of the surroundings of the PDA 60 is not more than a preset sound level, it determines the audio report mode as the report mode (step S603). Further, the CPU 113 drives the beep generation circuit 603 to produce the beeping sound from the speaker 605 (step S604) and reports that a touch operation has been received by a beeping sound to the user.

On the other hand, when judging in step S602 that the sound volume in the surroundings of the PDA 60 is more than the preset level of sound, the CPU 113 determines the vibration report mode as the report mode (step S605). Further, the CPU 113 drives the oscillatory actuator 115 through the drive signal generation circuit 114 to report that the touch operation has been received to the user by vibration. Note that the processing in step S606 and the following steps is similar to the processing in step S102 and the following steps of the vibration control processing 1 explained in the first embodiment (see FIG. 5), so an explanation thereof will be omitted.

As explained above, according to the present embodiment, the CPU 113 switches the report mode for reporting that a touch operation has been received to the audio report mode or the vibration report mode based on the measurement results obtained from the sound volume measurement circuit 602. Therefore, at the PDA 60 it can be automatically selected whether to report by vibration or whether to report by a beeping sound in accordance with the sound volume (noise level) of the surroundings.

Note that in the present embodiment, the report mode may also be so configured as to be designated by the user. In this case, the CPU 113 displays a screen for prompting the user to designate the report mode to be used. The CPU 113 stores designation information in the memory 112 when one or more of the audio report mode or vibration report mode is selected by operation input from the user. Further, when the CPU 113 determines that a touch signal has been input from the touch panel 102 at step S601, it sets the report mode to at least one of the audio report mode or vibration report mode in accordance with the designation information stored in the memory 112.

Figure 49:
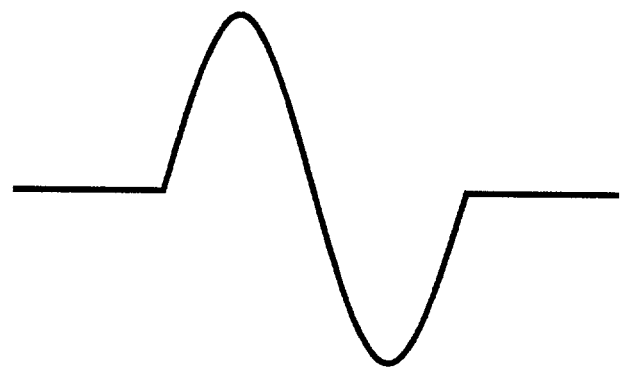
FIG. 49 is a view illustrating a waveform of a drive signal for vibration applied to an oscillatory actuator in a PDA according to this embodiment.
Figure 50:
FIG. 50 is a view illustrating a waveform of a drive signal for a beeping sound applied to an oscillatory actuator in a PDA according to this embodiment.

Further, as explained in the first embodiment, by applying an audible band audio signal to the coil 121 of the oscillatory actuator 115, it is possible to use the oscillatory actuator 115 as a speaker 604 (sound source). Here, the waveform of the drive signal for causing the generation of vibration from the oscillatory actuator 115 is as shown for example in FIG. 49. Note that in the figure, the frequency $f_0$ of the drive signal is the frequency for causing resonance of any one of the main case 101 of the PDA 10, the liquid crystal display panel 103a provided with the touch panel 102, and the oscillatory actuator 115 itself. Further, the waveform of the drive signal for causing the oscillatory actuator 115 to generate sound is as shown in FIG. 50.

Figure 51:
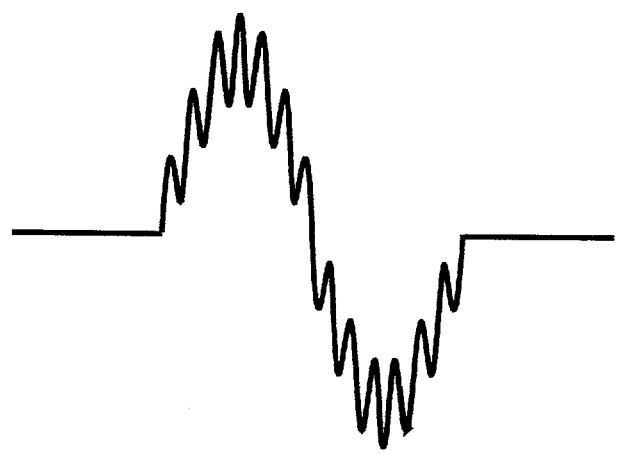
FIG. 51 is a view illustrating a waveform of a drive signal applied to an oscillatory actuator when simultaneously report by vibration and a beeping sound in a PDA according to this embodiment.

Further, FIG. 51 is an example of the waveform of the drive signal for causing the oscillatory actuator 115 to generate vibration and sound simultaneously. The waveform shown in the figure is a combination of the waveform for generating vibration shown in FIG. 49 and the waveform for generating sound shown in FIG. 50. The processing for synthesizing the waveform for generating vibration and the waveform for generating sound is executed by the drive signal generation circuit 114. By driving the oscillatory actuator 115 using the drive signal shown in FIG. 49 to FIG. 51, it is possible to realize the generation of vibration and sound by using the oscillatory actuator 115 only.

Note that in the case of imparting the oscillatory actuator 115 the function of a sound source in this way, it is suitable to use for example the liquid crystal display panel 103a or the main case 101 as a sound amplification mechanism, through which vibration generated from the oscillatory actuator 115 is transmitted in accordance with application of an audio signal and the magnitude of the sound generated from the oscillatory actuator 115 is amplified. Further, it is also possible to provide for example a paper cone or horn or other sound amplification mechanism at the inside or outside of the oscillatory actuator 115. Further, the sound generated from the oscillatory actuator 115 is not limited to a buzzer sound or other reporting sound and of course includes music, the human voice, and other reproduced sound.

[I: Ninth Embodiment]

In this embodiment, description will be made on an electronic device that switches between the audio report mode and vibration report mode explained in the eighth embodiment in accordance with a beacon received from a wireless base station. Note that in this embodiment, the same reference numerals will be used for portions common with the eighth embodiment. Further, explanations of portions common with the eighth embodiment will be omitted.

[I-1: Configuration of Ninth Embodiment]

Figure 52:
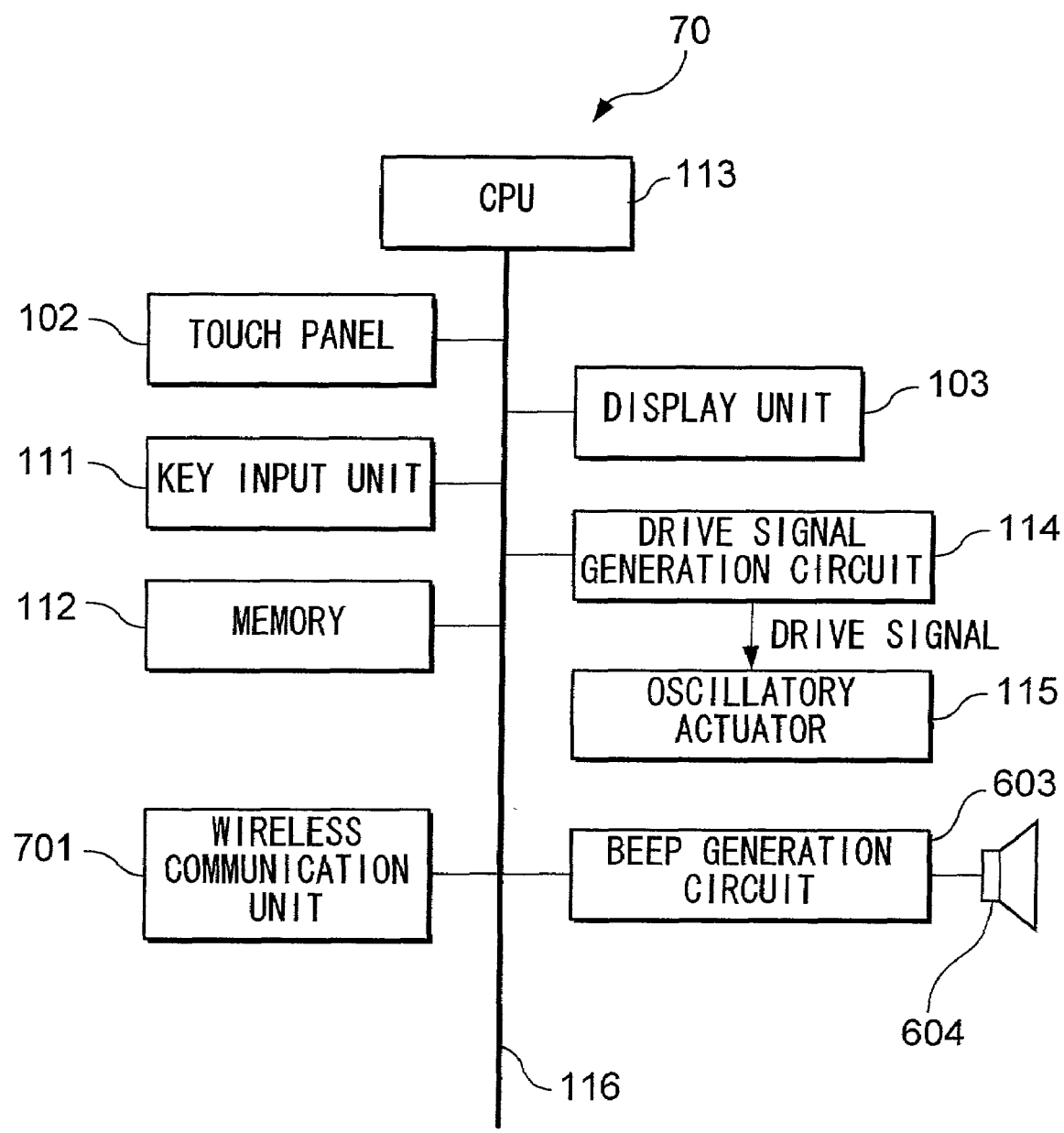
FIG. 52 is a block diagram illustrating a hardware configuration of a PDA according to a ninth embodiment of the present invention.

FIG. 52 is a block diagram illustrating the hardware configuration of the PDA 70. As shown in the figure, the PDA 70 has a touch panel 102, a display unit 103, a key input unit 111, a memory 112, a CPU 113, a drive signal generation circuit 114, an oscillatory actuator 115, a beep generation circuit 603, a speaker 604, and a wireless communication unit 701.

This PDA 70 is a mobile station served by a wireless LAN having a plurality of base stations. The PDA 70 engages in wireless communication with a base station covering the wireless area in which the device 70 itself is located and receives a packet communications service provided by the wireless LAN. Further, the PDA 70 has an audio report mode for reporting that an operation input has been received by sound and a vibration report mode for reporting that an operation input has been received by vibration.

The wireless communications unit 701 controls the wireless communication performed with the base station. This wireless communications unit 701 superposes packet communications data and others on a carrier to generate a radio signal under the control of the CPU 113 and transmits the radio signal to the base station. Further, the wireless communication unit 701 receives the radio signal transmitted from the base station and demodulates this to obtain data addressed to the device 70 itself. Further, the wireless communications unit 701 receives a beacon transmitted periodically from the base station.

Here, the "beacon" is a radio signal transmitted periodically by the base station within its own radio area and is transmitted at a rate of, for example, several times a second. The beacon includes control bit data designating at least one of the audio report mode or vibration report mode for the report mode of the PDA 70. The control bit data is set, for example, to "0" when designating only the audio report mode for the report mode of the PDA 70, "1" when designating only the vibration report mode for the report mode, "2" when designating joint use of the audio report mode and vibration report mode for the report mode, and "3" when designating not to use either report mode.

For example, the base station installed in public facilities such as a station and a movie theater transmits a beacon including the control bit data "1" within its own radio area. As a result, the report mode of a PDA 70 which has received this beacon is set to the vibration report mode. Note that in a base station installed in a movie theater, it is also possible to designate the vibration report mode for the report mode of the PDA 70 only while the movie is being shown and to designate joint use of the audio report mode and vibration report mode other than when the movie is being shown.

When receiving a beacon from the base station covering the radio area in which the device 70 is located, the CPU 113 of the device 70 stores the control bit data included in the beacon in the memory 112. Further, in the case of detecting a touch operation on the touch panel 102, the CPU 113 determines the report mode in accordance with the control bit data stored in the memory 112 and reports to the user that a touch operation has been received by the determined report mode. In this way, the PDA 70 of the present embodiment is forcibly designated as to the report mode by the beacon received from the base station.

[I-2: Operation of Ninth Embodiment]

Figures 53, 54:
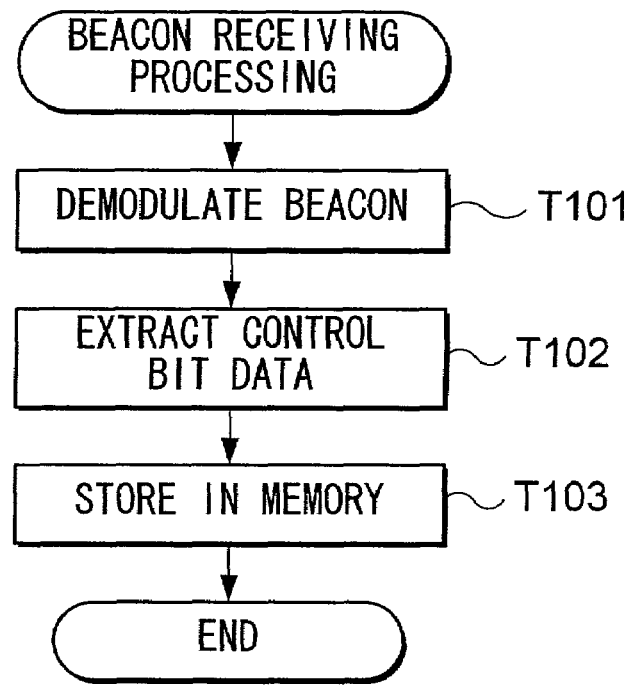
FIG. 53 is a flow chart for explaining the operation of a beacon receiving processing executed by the CPU in a PDA according to this embodiment.
FIG. 54 is a view illustrating a report mode decision table stored in a memory in a PDA according to a 10th embodiment of the present invention.

FIG. 53 is a flow chart for explaining the operation of a beacon receiving processing executed by the CPU 113 in the PDA 70 according to the present embodiment. This beacon receiving processing is executed by the CPU 113 when the PDA 70 receives a beacon transmitted from the base station. Note that for example when the radio area of a certain base station partially overlaps the radio area of another base station, and if the PDA 70 located in the overlapping areas receives beacons from both base stations, the CPU 113 selects the beacon with the stronger wave strength from the received beacons and executes beacon receiving processing for the selected beacon.

As shown in the figure, first, the CPU 113 demodulates the beacon received by the wireless communications unit 701 (step T101). Next, the CPU 113 extracts the control bit data included in the demodulated beacon (step T102). Further, the CPU 113 stores the extracted control bit data in the memory 112 (step T103) and ends the beacon receiving processing. Note that at step T103, the CPU 113 may also be so configured as to compare the currently extracted control bit data and the control bit data already stored in the memory 112 and, when the two control bit data do not match, to overwrite the memory 112 with the currently extracted bit data.

Further, the CPU 113 executes report control processing for reporting that a touch operation on the touch panel 102 has been received to the user by vibration or a beeping sound. The report control processing in this embodiment is substantially the same as the report control processing 1 explained in the eighth embodiment (see FIG. 48), so illustration and detailed explanations will be omitted. The main points however are as follows.

That is, when a touch signal is input from the touch panel 102, the CPU 113 determines the report mode in accordance with the control bit data stored in the memory 112. For example, when the control bit data stored in the memory 112 is "0", it determines the audio report mode for the report mode. Further, the CPU 113 drives the beep generation circuit 603 to cause the speaker 604 to emit a beeping sound to report that a touch operation has been received to the user by the reporting sound.

On the other hand, when the control bit data stored in the memory 112 is "1", the CPU 113 determines the vibration report mode for the report mode. Further, the CPU 113 drives the oscillatory actuator 115 through the drive signal generation circuit 114 to report that a touch operation has been received to the user by vibration.

As explained above, according to the present embodiment, the CPU 113 determines the report mode for reporting that a touch operation has been received in accordance with a beacon received from a base station. Therefore, it is possible for a base station side to designate the report mode for a PDA 70 located in its radio area. Accordingly, the report mode of a PDA 70 located in public facilities such as a movie theater and a station can be automatically switched from the audio report mode to the vibration report mode without the user changing the settings.

Note that as explained in the eighth embodiment, it is also possible to use an oscillatory actuator provided with the function of a speaker 604. Further, the aspect of the invention according to the present embodiment can of course also be applied to a mobile phone serviced by a PDC (personal digital cellular) type mobile packet communication network or a PHS (personal handyphone system (registered trademark)) terminal.

[J: 10th Embodiment]

In this embodiment, description will be given on an electronic device having the function of acquiring the current location of the device and switching between the audio report mode and vibration report mode based on its current location. Note that the PDA according to the present embodiment has a hardware configuration identical to the PDA explained in the ninth embodiment (see FIG. 52), so the same reference numerals will be used. Further, explanations of portions common with the ninth embodiment will be omitted.

In the PDA 70 according to this embodiment, the wireless communications unit 701 receives a beacon transmitted periodically from a base station. This beacon includes a base station ID for identifying the base station transmitting the beacon. The PDA 70 utilizes the base station ID contained in the beacon as location information showing the current location of the device 70.

The memory 112 stores a report mode decision table 112e shown in FIG. 54. The report mode decision table 112e stores a base station ID showing the area in which the report mode of the PDA 70 is to be made the vibration report mode. The base station IDs stored in this report mode decision table 112e is those of base stations established in for example a public facility where use of an audio report mode would be nuisance to others. This report mode decision table 112e is transmitted to the PDA 70 from the service control station of the wireless LAN through a base station.

In the PDA 70 having the configuration explained above, when receiving a beacon from the base station covering the radio area in which the device 70 is located, the CPU 113 executes beacon receiving processing. In this beacon receiving processing, the CPU 113 extracts the base station ID included in the beacon demodulated by the wireless communication unit 701 and stores the base station ID as location information of the device 70 in the memory 112.

Further, the CPU 113 executes report control processing for reporting that a touch operation to the touch panel 102 has been received to the user by vibration or a beeping sound. In this report control processing, in the case of detecting a touch operation on the touch panel 102, the CPU 113 compares the base station ID showing the current location of the device 70 stored in the memory 112 and each of the base station IDs stored in the report mode decision table 112e.

Further, when the base station ID showing the current location of the device 70 is not stored in the report mode decision table 112e, the CPU 113 reports that a touch operation has been received to the user in accordance with the report mode set by the user in advance (for example, the audio report mode). Further, when the base station ID showing the current location of the device 70 is stored in the report mode decision table 112e, the CPU 113 determines the vibration report mode for the report mode and reports that a touch operation has been received to the user by vibration. Note that the control of the beep generation circuit 603 and speaker 604 at the time of the audio report mode and the control of the drive signal generation circuit 114 and the oscillatory actuator 115 at the time of the vibration report mode were already explained in the eighth embodiment, so will not be explained here.

As explained above, according to the present embodiment, the CPU 113 determines the report mode for reporting that a touch operation has been received in accordance with location information showing the current location of the PDA 70. Therefore, it is possible to change the report mode of a PDA 70 located in public facilities such as a movie theater and a station automatically from the audio report mode to the vibration report mode even without the user changing settings.

Note that in the present embodiment, the explanation was given of the case of using the base station ID included in the beacon received from a base station as the location information. It is however also possible to add a GPS (global positioning system) function to the PDA 70 and determine the report mode using the location information showing the longitude and latitude of the current location of the device 70 acquired from the GPS function. Further, when the wireless LAN provides a location measuring service for mobile stations, the PDA 70 may receive from a base station location information (longitude and latitude information) showing the current location of the device 70 and use this location information to determine the report mode. In these cases, however, the area data stored in the report mode decision table 112e has to be made area data based on the longitude and latitude information rather than the base station IDs.

Further, the report mode decision table 112e can be customized by the user. For example, by executing registration processing at a location where a vibration report mode is desired, the user can additionally register, in the report mode decision table 112e, a base station ID showing the current location of the device 70 stored in the memory 112.

Further, as explained in the eighth embodiment, it is also possible to use an oscillatory actuator provided with the function of a speaker 604. Further, the aspect of the invention according to this embodiment can of course also be applied to a mobile phone serviced by a PDC type mobile packet communication network or a PHS terminal.

[K: Eleventh Embodiment]

In this embodiment, description will be given on an electronic device having a plurality of vibration generators and controlling the signal waveforms of the drive signals applied to each of the vibration generators based on a touched position on the touch panel. Note that in this embodiment, the same reference numerals will be used for portions common with the fifth embodiment. Further, explanations of portions common with the fifth embodiment will be omitted.

[K-1: Configuration of Eleventh Embodiment]

Figure 55:
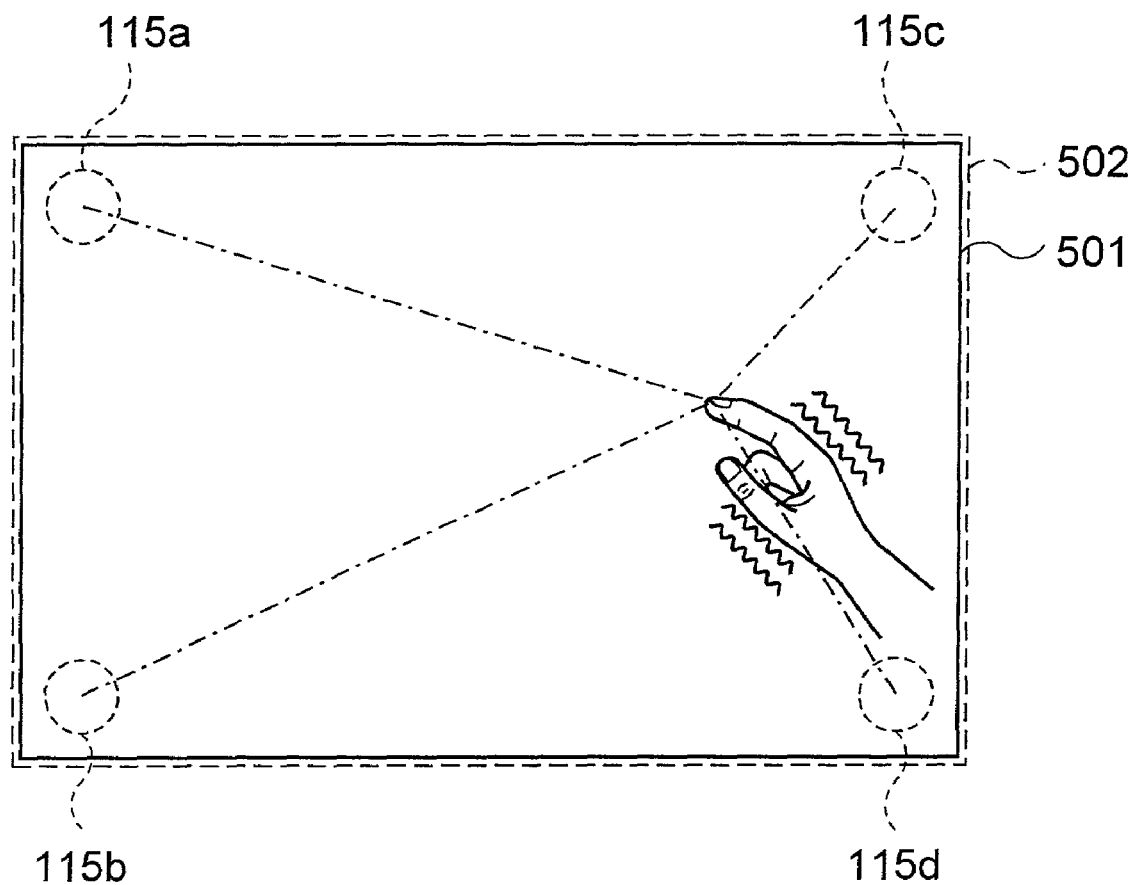
FIG. 55 is a view for explaining an ATM according to an 11th embodiment of the present invention.

FIG. 55 is a view for explaining an ATM according to this embodiment. As shown in the figure, the back surface of the liquid crystal display panel 501 over which the touch panel 502 is laid is provided at its four corners with a total of four oscillatory actuators 115a, 115b, 115c, and 115d. The plurality of oscillatory actuators 115a to 115d are provided in this way because in an electronic device having a large sized display screen such as an ATM or a personal computer it is difficult to give sufficient vibration by a single vibration generator to the fingertip of a user performing a touch operation.

In this embodiment, description will be given of the control for efficiently driving the oscillatory actuators 115a to 115d to give a larger vibration to the fingertip of the user while keeping down the power consumption required for the vibration report when performing reporting operation by vibration using these plurality of oscillatory actuators 115a to 115d.

Figure 56:
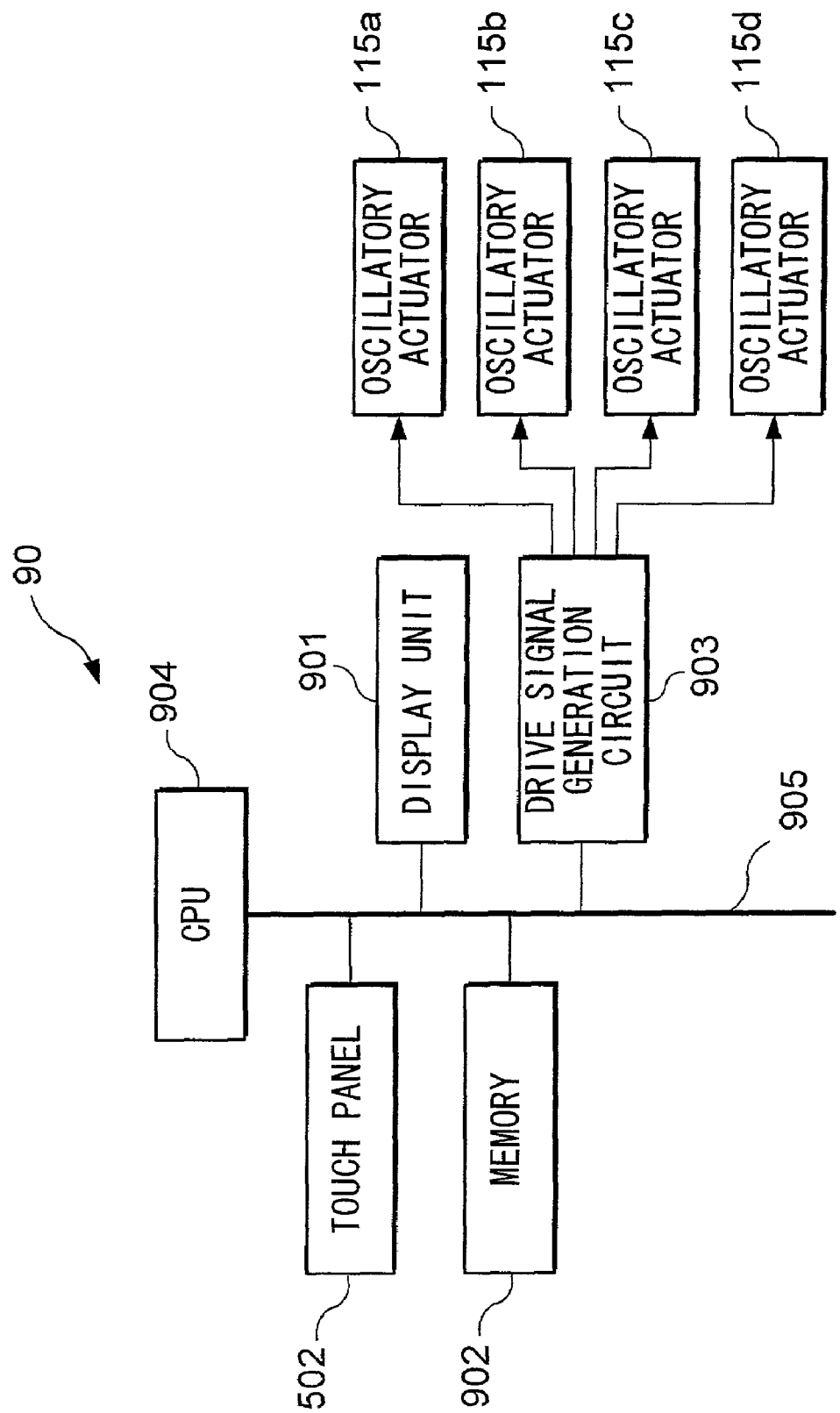
FIG. 56 is a block diagram illustrating the hardware configuration of an ATM according to this embodiment.

FIG. 56 is a block diagram illustrating the hardware configuration of the ATM 90 according to this embodiment. As shown in this figure, the ATM 90 has a touch panel 502, a display unit 901, a memory 902, a drive signal generation circuit 903, oscillatory actuators 115a to 115d, and a CPU 904.

The touch panel 502 outputs to the CPU 904a touch signal showing a touched position on the touch panel 502 in response to a touch operation. Further, the display unit 901 has a liquid crystal display panel 501 and a drive circuit for controlling the display of the liquid crystal display panel 501. The memory 902 stores programs and data etc. for controlling the ATM 90. Further, the memory 902 stores waveform data of drive signals to be applied to the oscillatory actuators 115a to 115d. Note that in the present embodiment, the shapes of the waveforms of the drive signals to be applied to the oscillatory actuators 115a to 115d are the same. Further, the frequencies of the drive signals are made to match with the frequency causing the liquid crystal display panel 501 provided with the touch panel 502 to resonate or the frequency causing the oscillatory actuators 115a to 115d themselves to resonate.

The drive signal generation circuit 903 generates drive signals for driving each of the oscillatory actuators 115a to 115d in accordance with waveform data and phase data supplied from the CPU 904. Further, the drive signal generation circuit 903 applies drive signals to the oscillatory actuators 115a to 115d in accordance with instructions from the CPU 904. The oscillatory actuators 115a to 115d are the same as the oscillatory actuator 115 explained in the first embodiment.

The CPU 904 controls the parts of the device interconnected through a bus 905 by executing a program stored in the memory 902. The CPU 904 executes the vibration control processing 6 (see FIG. 57 and FIG. 58). In the case of detecting a touch operation on the touch panel 502, it drives each of the oscillatory actuators 115a to 115d through the drive signal generation circuit 903 to cause the touch panel 502 and the liquid crystal display panel 501 to vibrate.

[K-2: Operation of Eleventh Embodiment]

Figure 57:
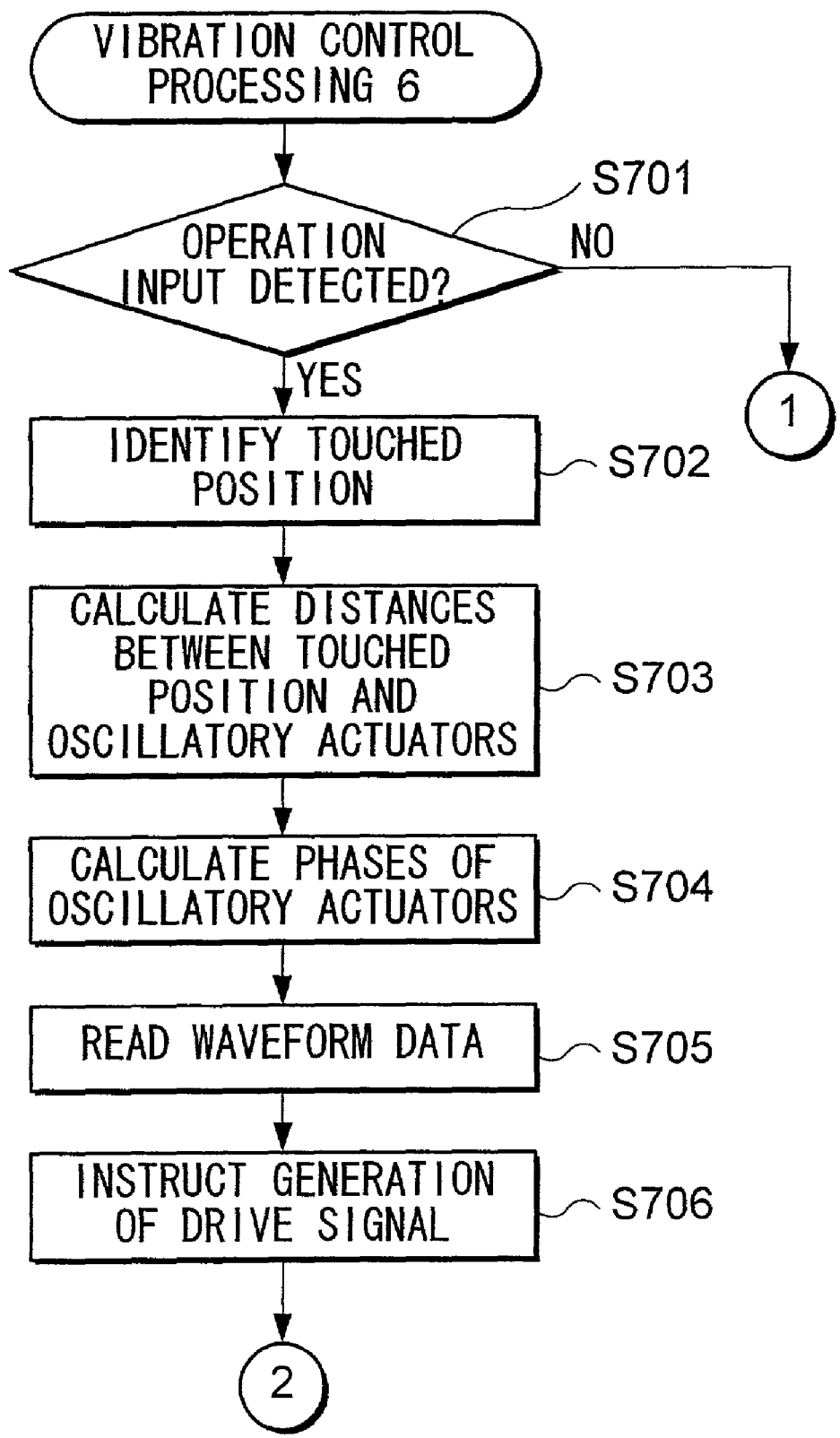
FIG. 57 is part of a flow chart for explaining the operation of a vibration control processing 6 executed by the CPU in an ATM according to this embodiment.
Figure 58:
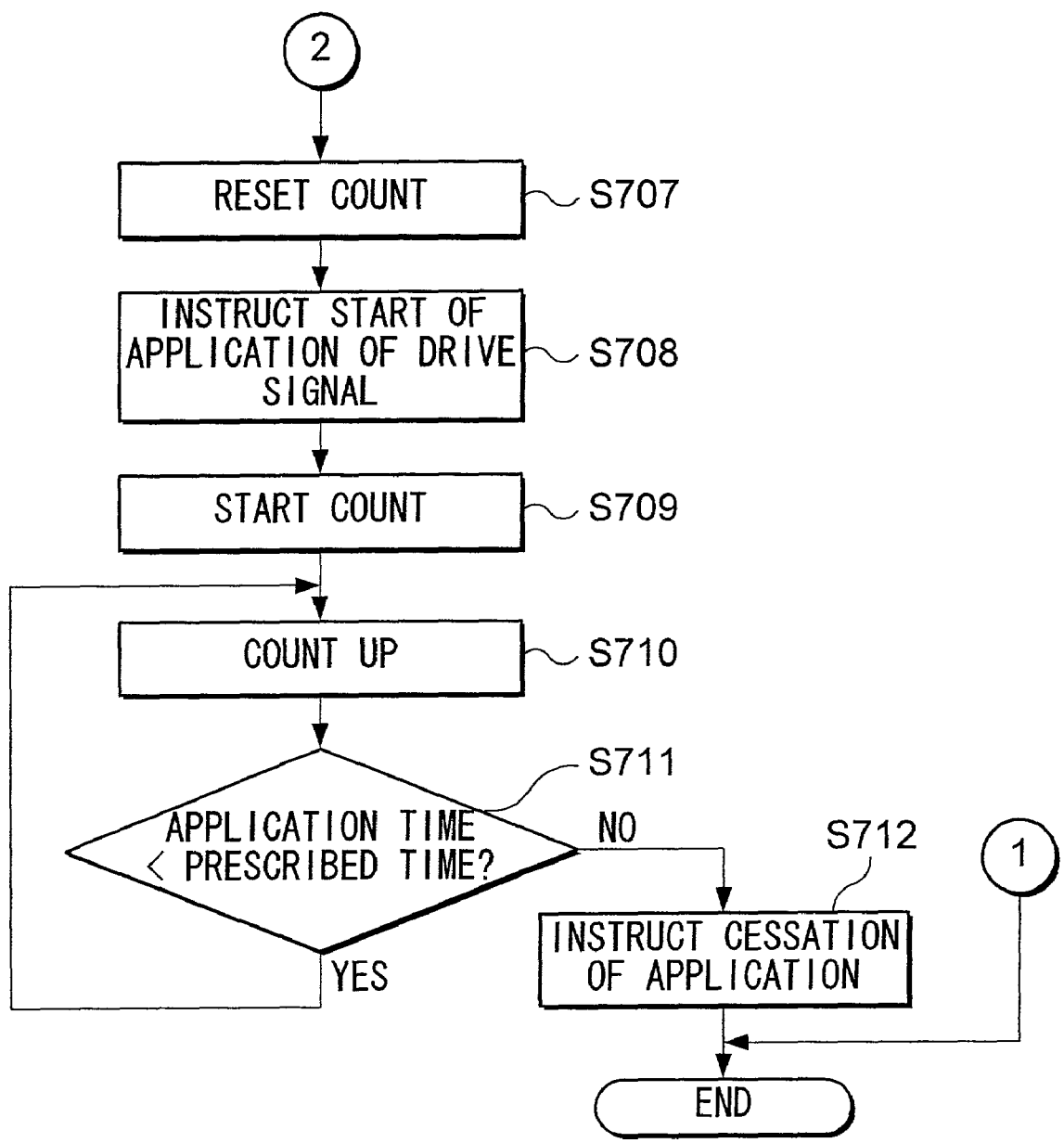
FIG. 58 is part of a flow chart for explaining the operation of a vibration control processing 6 executed by the CPU in an ATM according to this embodiment.

FIG. 57 and FIG. 58 show a flow chart for explaining the operation of the vibration control processing 6 executed by the CPU 904 in the ATM 90 according to this embodiment. This vibration control processing 6 is executed by the CPU 904 at every predetermined period in a period in which a touch operation on the touch panel 502 is permitted.

As shown in FIG. 57, first, the CPU 904 determines whether a touch signal has been input from the touch panel 502 (step S701). When it is determined that a touch signal has not been input, the CPU 904 ends the vibration control processing 6. Further, when it is determined that a touch signal has been input, the CPU 904 identifies a touched position (XY coordinates) on the touch panel 502 based on the touch signal (step S702). Note that when it is determined that a touched position on the touch panel 502 falls outside of the display areas of the touch buttons displayed on the display screen, the CPU 904 need not execute the processing of step S703 and may end the vibration control processing 6.

Next, the CPU 904, as shown in FIG. 55, finds the positional relationship between a touched position and each of the oscillatory actuators 115a to 115d such as calculating the straight line distance between the touched position and each of the oscillatory actuators 115a to 115d (step S703). Further, the CPU 904 performs vibration analysis using as parameters the positional relationship between the touched position and each of the oscillatory actuators 115a to 115d, the material of the liquid crystal display panel 501 where the oscillatory actuators 115a to 115d are placed, the elasticity of the damper 503, and others. Note that it is also possible to store in advance the data of the results of vibration analysis for different touched positions on the touch panel 502 in the memory 902 and utilize them. By adopting such a configuration, there is no need to perform the vibration analysis for each touched position in real time. Further, the CPU 904 calculates the phase of a drive signal to be applied to each of the oscillatory actuators 115a to 115d so that the amplitude of the vibration at each touched position becomes the greatest due to mutual interference of oscillatory waves generated from each of the oscillatory actuators 115a to 115d (step S704).

Next, the CPU 904 reads the waveform data of the same drive signal to be applied to the oscillatory actuators 115 from the memory 902 (step S705). Next, the CPU 904 outputs to the drive signal generation circuit 903 the waveform data read from the memory 904 and the phase data for each of the oscillatory actuators 115a to 115d calculated at step S704. At the same time, the CPU 904 instructs the drive signal generation circuit 903 to generate a drive signal (step S706). The drive signal generation circuit 903 uses the waveform data and the phase data supplied from the CPU 904 and generates a drive signal to be applied to each of the oscillatory actuators 115a to 115d. The processing in step S707 and the following steps is similar to the processing in step S104 and the following steps of the vibration control processing 1 explained in the first embodiment (see FIG. 5) except for the fact that there are a plurality of oscillatory actuators 115a to 115d driven, so an explanation will be omitted. As a result of the vibration control processing 6, oscillatory waves having phases calculated at step S704 are given to the touch panel 502 from each of the oscillatory actuators 115a to 115d.

As explained above, according to the present embodiment, the CPU 904 adjusts the phases of the drive signals applied to each of the oscillatory actuators 115a to 115d so that the amplitude of the vibration occurring at a touched position on the touch panel 502 becomes the greatest due to mutual interference of oscillatory waves generated from each of the oscillatory actuators 115a to 115d. Therefore, the ATM 90 can efficiently drive the oscillatory actuators 115a to 115d and give a greater vibration to the fingertip of the user while keeping down the power consumption required for the vibration report.

Note that in this embodiment, the explanation was given of the case of adjusting the phases of the drive signals applied to each of the oscillatory actuators 115a to 115d. It is however also possible to adjust something other than the phases, for example, the amplitudes of the drive signals. Further, the number of the oscillatory actuators provided is not limited to four. Further, the oscillatory actuators may be provided for example at the touch panel 502 or may be provided as shown in FIG. 27 sandwiched between the liquid crystal display panel 501 and the touch panel 502.

Further, it is also possible to divide the front surface of the touch panel 502 into units of about the area touched when a fingertip touches the touch panel 502, calculate in advance for each section the phase data of a drive signal to be applied to each of the oscillatory actuators 115a to 115d when a divided section is touched, and store a data table storing the results of calculation in the memory 902. When adopting this configuration, it is not necessary to perform real time computing of the phases of the drive signals to be applied to the oscillatory actuators 115a to 115d based on a touched position. Therefore, it is possible to improve the response speed of a vibration report for a touch operation.

Figure 59:
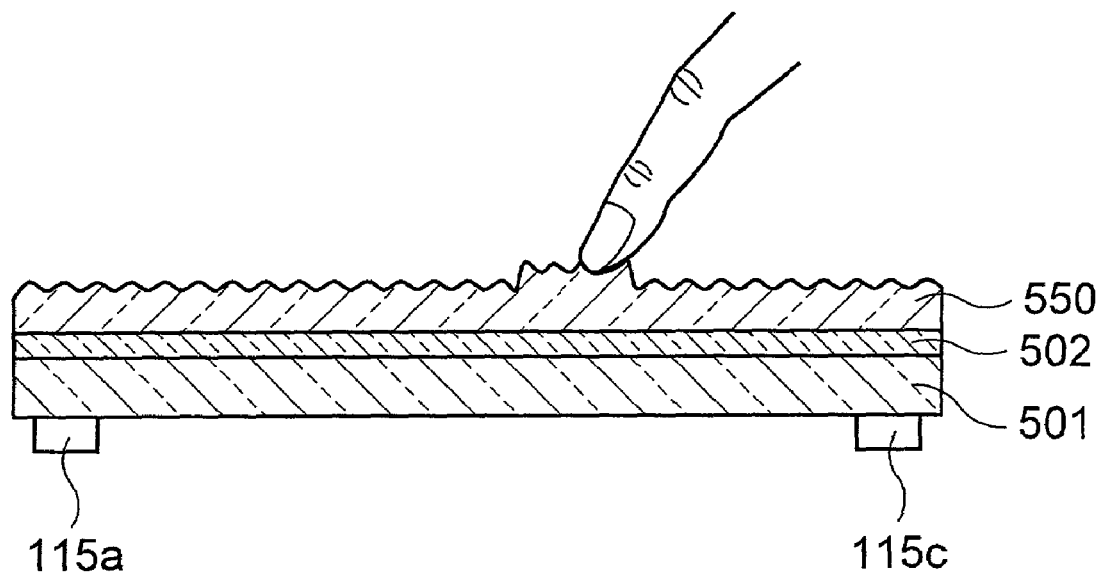
FIG. 59 is a sectional view for explaining a touch panel of an ATM according to a modification of this embodiment.
Figure 60:
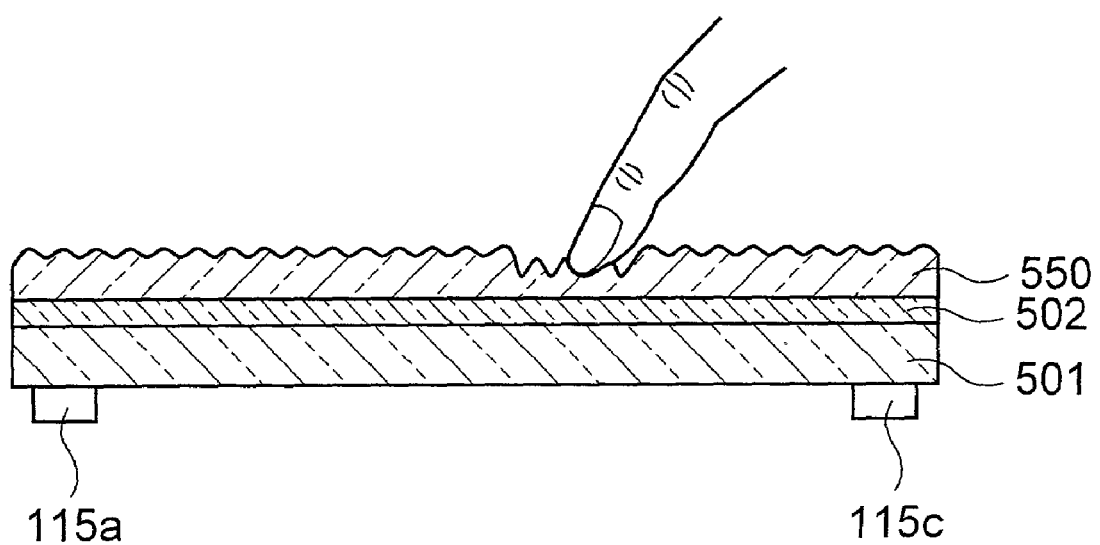
FIG. 60 is a sectional view for explaining a touch panel of an ATM according to a modification of this embodiment.

Further, FIG. 59 and FIG. 60 are sectional views for explaining an ATM according to a modification of this embodiment. The front surface of the touch panel 502 of the ATM according to this modification has overlaid on it a deformation layer 550 comprised of a high viscosity liquid substance or gel or a fine particulate substance covered by a deformable protective film. Note that the liquid substance, gel, particulate substance, and protective film of this deformation layer 550 are transparent.

In such an ATM, when driving the oscillatory actuators 115a to 115d, a wave occurs on the surface of the deformation layer 550 due to the vibration generated by the oscillatory actuators 115a to 115d. The CPU of the ATM adjusts the phases of a drive signal to be applied to each of the oscillatory actuators 115a to 115d so that the height of the surface of the deformation layer 550 at a touched position becomes higher than at the time not touched due to mutual interference of the waves generated for each oscillatory actuator 115a to 115d. Due to this, as shown in FIG. 59, it is possible to cause the portion of a touched position in the surface of the deformation layer 550 to rise up.

Alternatively and conversely, the CPU of the ATM adjusts the phases of the drive signals applied to the oscillatory actuators 115a to 115d so that the height of the front surface of the deformation layer 550 at a touched position becomes lower than at the time not touched due to mutual interference of the waves generated for each oscillatory actuator 115a to 115d. Due to this, as shown in FIG. 60, it is possible to cause the portion of a touched position in the front surface of the deformation layer 550 to sink.

In this way, according to this modification, it is possible to report to the user that a touch operation has been received by changing the thickness of the deformation layer 550. Further, it is possible to give a user performing a touch operation a pressing feeling of a touch button displayed on the screen by controlling the oscillatory actuators 115a to 115e so as to make the front surface portion of a touched position in the deformation layer 550 sink.

Note that in this modification, not only the phases but also the amplitudes of the vibration caused at the oscillatory actuators 115a to 115d and the shapes of waveforms and directions of the vibration are important factors in controlling the driving of the oscillatory actuators 115a to 115d. It can be derived from this that it is preferable to divide the surface of the touch panel 502 into units of about the area touched when touching the touch panel 502 by the fingertip, calculate in advance for each section the waveform data of a drive signal to be applied to each of the oscillatory actuators 115a to 115d when a divided section is touched, and store in a memory a data table storing the results of calculation.

[L: Twelfth Embodiment]

In this embodiment, description will be given on an electronic device having a plurality of vibration generators in the same way as the eleventh embodiment and switching a vibration generator to be driven based on a touched position on the touch panel. Note that in this embodiment, the same reference numerals will be used for portions common with the eleventh embodiment. Further, explanations of portions common with the eleventh embodiment will be omitted.

[L-1: Configuration of Twelfth Embodiment]

Figures 61, 62:
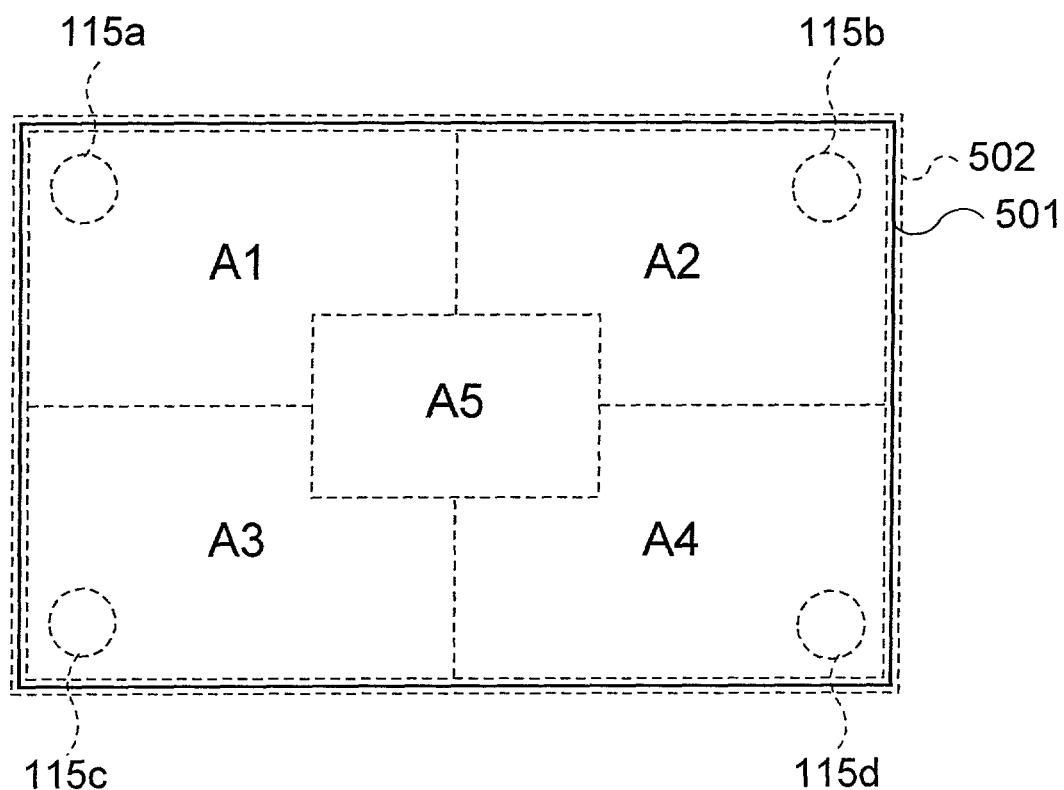
FIG. 61 is a view for explaining an ATM according to a 12th embodiment of the present invention.
FIG. 62 is a view illustrating a driving object decision table stored in a memory in an ATM according to this embodiment.

FIG. 61 is a view for explaining an ATM according to this embodiment.

As shown in the figure, the back surface of the liquid crystal display panel 501 over which the touch panel 502 is laid is provided at its four corners with a total of four oscillatory actuators 115a to 115d. Further, as shown in the figure, the touchable area on the touch panel 502 is divided into a plurality of areas A1 to A5. In the present embodiment, when performing a reporting operation by vibration, an oscillatory actuator(s) to be driven is selected from among the oscillatory actuators 115a to 115d in accordance with which area of the areas A1 to A5 a touched position on the touch panel 502 is contained.

The hardware configuration of the ATM according to the present embodiment is similar to that shown in FIG. 56 for the eleventh embodiment. The memory 902, however, stores a driving object decision table 902a shown in FIG. 62. As shown in the figure, the driving object decision table 902a stores, for each of divided areas A1 to A5 on the touch panel 502, area data showing the divided area concerned using XY coordinates and identification information of an oscillatory actuator to be driven when that divided area is touched. Note that in the figure, reference numerals assigned to the oscillatory actuators 115a to 115d are used as the identification information of the oscillatory actuators.

According to the driving object decision table 902a, only the oscillatory actuator 115a is driven when the area A1 is touched on the touch panel 502 shown in FIG. 61. Further, all of the oscillatory actuators 115a to 115d are driven when the area A5 is touched on the touch panel 502.

In the case of detecting a touch operation on the touch panel 502, the CPU 904 detects the touched position and refers to the driving object decision table 902a to determine an oscillatory actuator(s) to be driven. Further, the CPU 904 drives the determined oscillatory actuator through the drive signal generation circuit 903 to cause the touch panel 502 and the liquid crystal display panel 501 to vibrate.

[L-2: Operation of Twelfth Embodiment]

Figure 63:
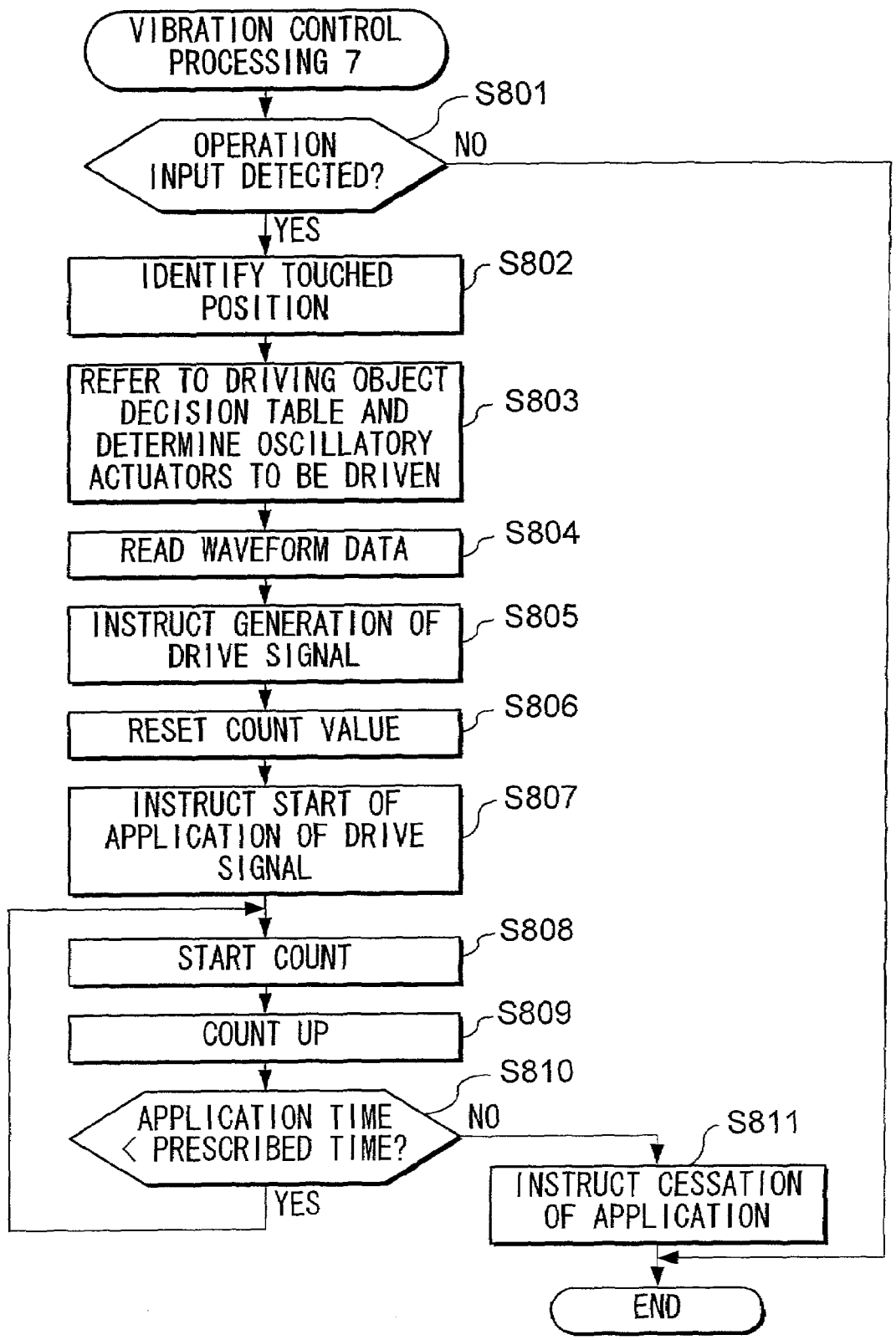
FIG. 63 is a flow chart for explaining the operation of a vibration control processing 7 executed by the CPU in an ATM according to this embodiment.

FIG. 63 is a flow chart for explaining the operation of the vibration control processing 7 executed by the CPU 904 in an ATM according to this embodiment. The vibration control processing 7 is executed by the CPU 904 at every predetermined period in a period in which a touch operation on the touch panel 502 is permitted.

As shown in the figure, first, the CPU 904 determines whether a touch signal has been input from the touch panel 502 (step S801). When it is determined that a touch signal has not been input, the CPU 904 ends the vibration control processing 7. Further, when it is determined that a touch signal has been input, the CPU 904 identifies the touched position (XY coordinates) on the touch panel 502 based on the touch signal (step S802).

Next, the CPU 904 identifies the divided area in which the touched position is contained by referring to the driving object decision table 902a shown in FIG. 62 and determines an oscillatory actuator(s) to be driven (step S803). Next, the CPU 904 reads the waveform data of the drive signal for driving the determined oscillatory actuator(s) from the memory 902 (step S804). Further, the CPU 904 outputs the waveform data read from the memory 902 and the identification information of the oscillatory actuators determined at step S803 to the drive signal generation circuit 903. At the same time as this, the CPU 904 instructs the drive signal generation circuit 903 to generate a drive signal (step S805). Note that the processing in step S806 and the following steps are similar to the processing in step S104 and the following steps of the first vibration control processing explained in the first embodiment (see FIG. 5) except that only the designated oscillatory actuators among the plurality of oscillatory actuators 115a to 115d are driven, so explanations will be omitted.

As explained above, according to the present embodiment, the CPU 904 switches the oscillatory actuator(s) to be driven in accordance with a touched position on the touch panel 502. Therefore, the ATM can efficiently drive the oscillatory actuators 115a to 115d in accordance with the touched position on the touch panel 502.

Note that in this embodiment, the area on the touch panel 502 was divided into a plurality of areas in advance and identification information of the oscillatory actuators to be driven when a divided area was touched is stored in the memory 902 for each divided area. It is however also possible, in the case of detecting a touch operation on the touch panel 502, to detect the touched position, calculate the distances between the touched position and the oscillatory actuators 115a to 115d, and drive the closest oscillatory actuator.

[M: Thirteenth Embodiment]

In this embodiment, a vibration generator suitable for use in the first to twelfth embodiments will be explained. Note that the oscillatory actuator in this embodiment is a movable permanent magnet type linear oscillatory actuator which uses a permanent magnet as the movable weight and causes the movable weight to linearly reciprocate by electromagnetic force so as to generate vibration.

[M-1: First Example]

Figure 64:
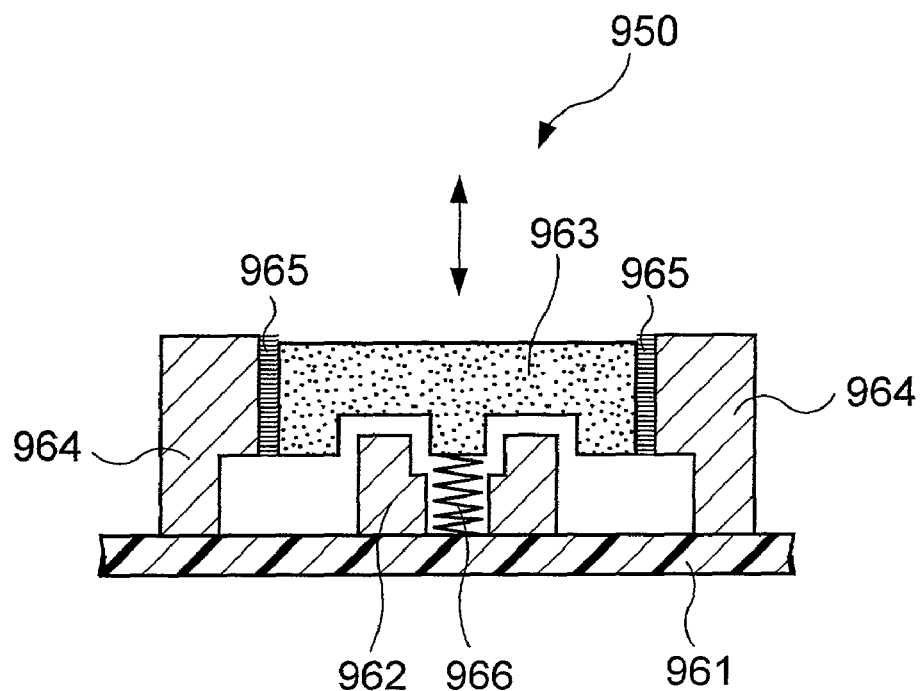
FIG. 64 is a sectional view illustrating an internal structure of an oscillatory actuator according to a first example of a 13th embodiment of the present invention.

FIG. 64 is a sectional view illustrating an internal structure of an oscillatory actuator 950 according to a first example of this embodiment. In the figure, the oscillatory actuator 950 has inside a case 961 a coil 962, a movable weight 963 (weight), a brake member 964, and a spring 966. Note that in the figure, the vibratory member to which the oscillatory actuator 950 gives vibration is provided at a position facing the coil 962 across the case 961. Further, the case 961 is sealed and functions as a magnetic shield. To give the function of a magnetic shield to the case 961, it is sufficient to form the case 961 by a conductive material and ground it or make it the same potential or form the case 961 by a magnetic material having a large permeability.

The coil 962 is a coil having a substantially cylindrical shape as shown in the figure and is fixed to the case 961. When driving the oscillatory actuator 950, an alternating current (drive signal) is applied to the coil 962.

The movable weight 963 is positioned above the coil 962, and is a substantially columnar weight formed of a permanent magnet. At the bottom surface of this movable weight 963 is formed an annular depression in which the top end of the coil 962 fits. The movable weight 963 is supported by the spring 966 in a state where it can linearly reciprocate in the vertical direction in the figure in the space formed inside the case 961. The spring 966, as shown in the figure, has one end connected to the case 961 in contact with the vibratory member (base member) and has the other end connected to the movable weight 963. Note that instead of the spring 966, it is also possible to use a support member comprised using an elastic body such as a rubber band.

When a drive signal is applied to the coil 962, this movable weight 963 linearly reciprocates in the vertical direction in the figure due to the magnetic force generated from the coil 962. Vibrational acceleration occurs at the portion of the case 961 to which the spring 966 is connected by a counter force of the reciprocation of the movable weight 963. Note that along with the reciprocation of the movable weight 963, the portion of the case 961 to which the spring 966 is connected is subject to a vibration component transmitted from the movable weight 963 through the spring 966 in addition to the counter force of the reciprocation; but the principle of generation of vibration in the oscillatory actuator 950 is based on the use of the oscillatory vibration occurring by a counter force of the reciprocation of the movable weight 963.

The brake member 964 has a brush 965 in constant contact with the side surface of the movable weight 963. This brush 965 is so designed as to give a suitable contact resistance to the side surface of the movable weight 963. Here, the contact resistance given by the brush 965 to the movable weight 963 does not inhibit reciprocation much at all when a drive signal is applied to the coil 962 and the movable weight 963 reciprocates. On the other hand, when application of a drive signal to the coil 962 is stopped, the reciprocation of the movable weight 963 quickly stops due to the above contact resistance.

That is, the brake member 964 acts as a brake for causing the reciprocation of the movable weight 963 to quickly stop when application of a drive signal to the coil 962 is stopped. Note that instead of the brush 965, it is also possible to use a member formed by sponge, urethane, felt, rubber, and the like.

Figure 65:
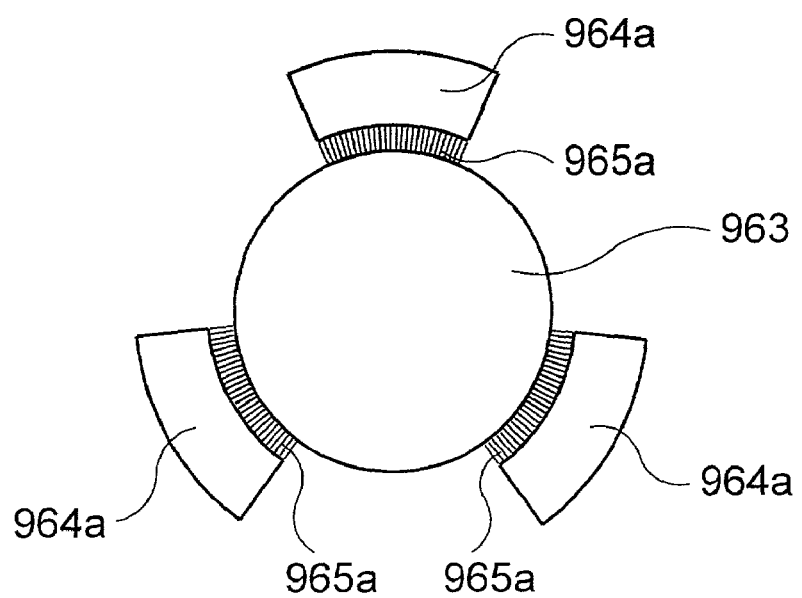
FIG. 65 is a plan view illustrating an example of placement of a brake member in an oscillatory actuator according to the first example of this embodiment.
Figure 66:
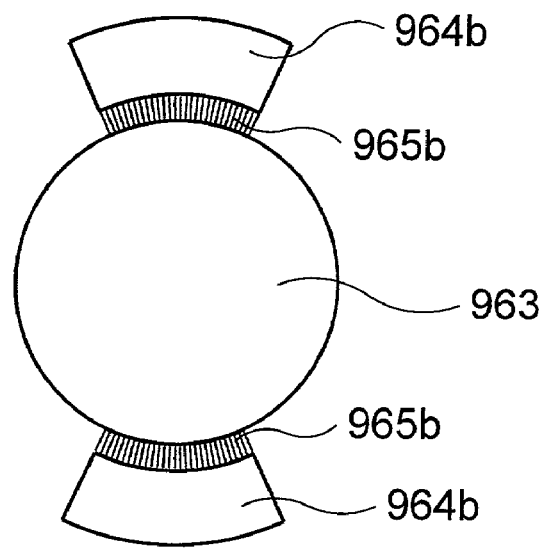
FIG. 66 is a plan view illustrating another example of placement of a brake member in an oscillatory actuator according to the first example of this embodiment.
Figure 67:
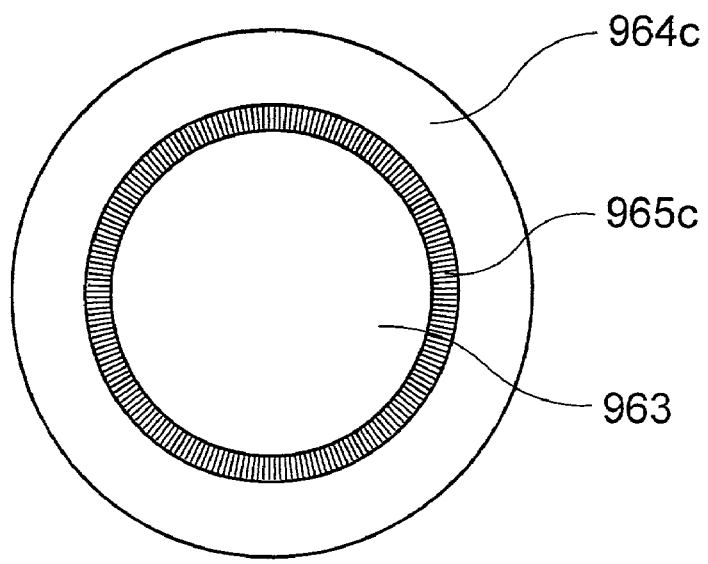
FIG. 67 is a plan view illustrating another example of placement of a brake member in an oscillatory actuator according to the first example of this embodiment.

FIG. 65 to FIG. 67 are plan views illustrating examples of placement of the brake member 964 and show the case of viewing the inside of the oscillatory actuator 950 from above the sectional view shown in FIG. 64. FIG. 65 shows an example of placement of three brake members 964a around the movable weight 963 at 120 degree intervals. Further, FIG. 66 shows an example of placement of two brake members 964b facing each other across the movable weight 963. Further, FIG. 67 shows an example of placement of a single cylindrical brake member 964c so as to surround the movable weight 963.

Here, when for example providing the brake member 964a at just one location around the movable weight 963, the movable weight 963 is subjected to contact resistance from only one direction of contact with the brush 965a of the brake member 964a. Therefore, the posture of the movable weight 963 collapses at the time of reciprocation, and the vibration generated from the oscillatory actuator 950 fluctuates in direction. Further, even when stopping application of the drive signal, since a contact resistance from the brush 965a is applied to the movable weight 963 from one direction, the posture of the movable weight 963 collapses and the reciprocation cannot be stopped quickly. Further, a large deviation in the direction of vibration occurs even when stopping application of the drive signal.

To prevent this from happening, as shown in FIG. 65 to FIG. 67, it becomes necessary to place brake members 964a to 964c so as to give proportional contact resistance of the brushes 965a to 965c to the movable weight 963 from around the weight. Further, to keep down wear of the brushes 965a to 965c due to aging or deformation of the brake members 964a to 964c, it is effective to make the contact area of the movable weight 963 and the brushes 965a to 965c as large as possible to an extent not obstructing reciprocation of the movable weight 963.

Figure 68:
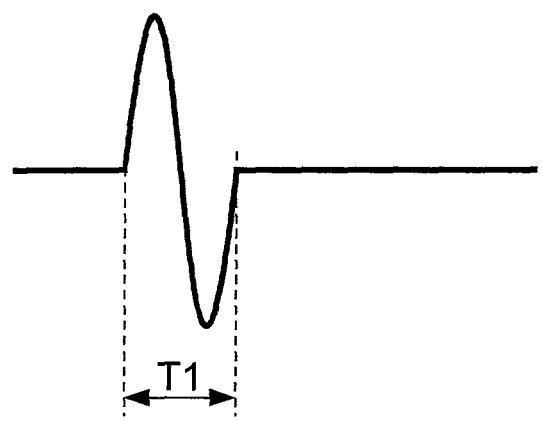
FIG. 68 is a view illustrating a waveform of a drive signal applied to a coil of an oscillatory actuator according to the first example of this embodiment.
Figure 69:
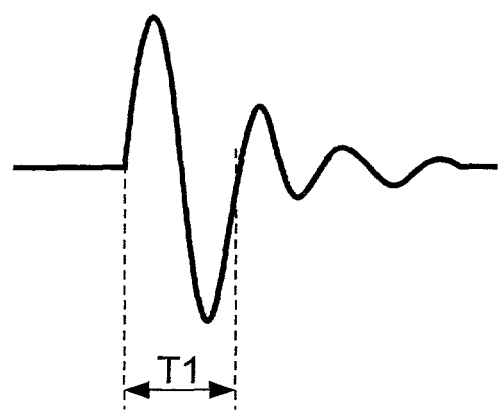
FIG. 69 is a view for explaining reciprocation of a movable weight of an oscillatory actuator without a brake mechanism.

With an oscillatory actuator without a brake mechanism for the movable weight 963, when application of a drive voltage of the period T1 shown in FIG. 68 is stopped, as shown in FIG. 69, the reciprocation of the movable weight 963 does not immediately stop and unnecessary vibration lingers. Therefore, such an oscillatory actuator cannot give the user a "click" or other feeling of operation, where a clear distinction must be exhibited in the strength of vibration in a short time, by vibrational stimulus. Further, at the time same, it is not possible to clearly modulate between vibration and non-vibration.

Figure 70:
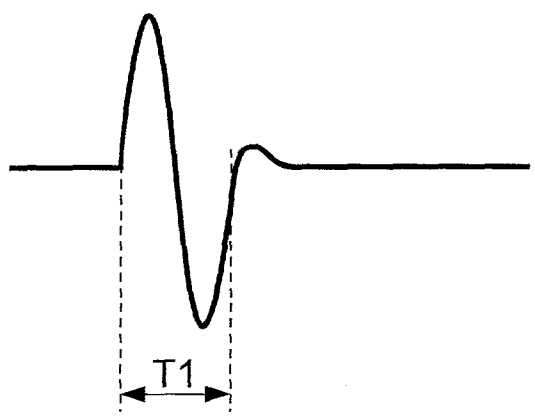
FIG. 70 is a view for explaining reciprocation of a movable weight of an oscillatory actuator according to the first example of this embodiment.

As opposed to this, according to the first example of the present embodiment, when application of the drive signal shown in FIG. 68 to the oscillatory actuator 950 is stopped, as shown in FIG. 70, the reciprocation of the movable weight 963 is quickly made stopped by the contact resistance of the brake member 964. Therefore, unnecessary vibration does not linger and a "click" feeling of operation can be given to the user by vibrational stimulus. Further, vibration and non-vibration can be clearly modulated.

[M-2: Second Example]

Figure 71:
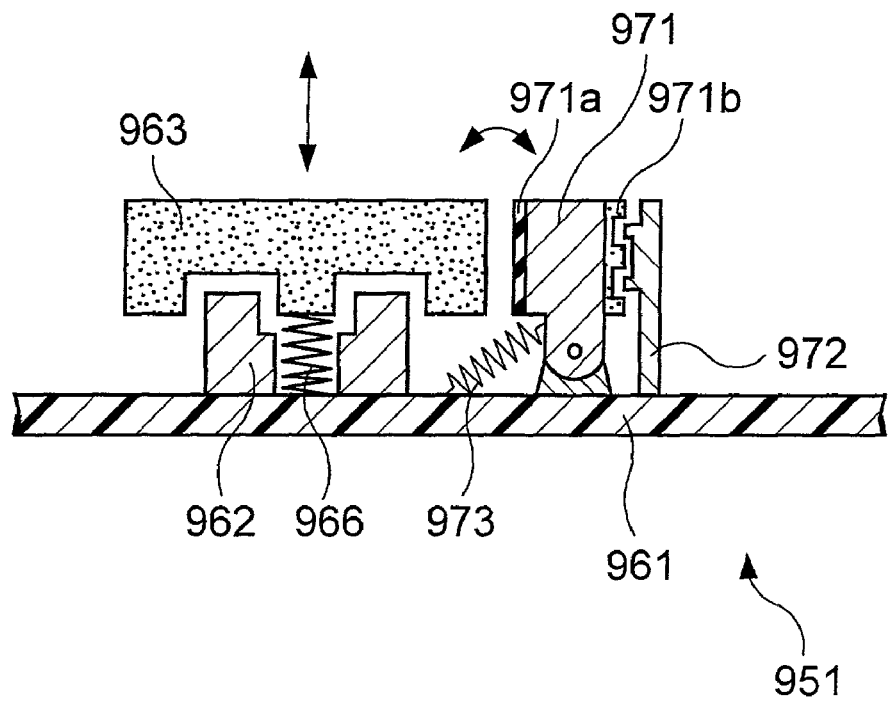
FIG. 71 is a sectional view illustrating the internal structure of an oscillatory actuator according to a second example of this embodiment.

FIG. 71 is a sectional view illustrating the internal structure of an oscillatory actuator 951 according to a second example of this embodiment. In this figure, the oscillatory actuator 951 has inside a case 961 a coil 962, a movable weight 963, a spring 966, a brake member 971, and a brake coil 972. Note that in the figure, the vibratory member is provided at a position facing the coil 962 across the case 961. Further, the case 961, coil 962, and movable weight 963 are the same as in the first example of the present embodiment, so explanations will be omitted.

The brake member 971 has a brake surface 971a covered on its front surface with rubber and a magnet 971b. Further, the brake member 971 has attached to it a spring 973 for pulling the brake surface 971 toward the side surface of the movable weight 963. In the brake member 971, in the period when a drive signal is not applied to the brake coil 972, the brake surface 971a is pushed against the side surface of the movable weight 963 by the force of the spring 973. On the other hand, in the period when a drive signal is applied to the brake coil 972, in the brake member 971, the magnet 971b is pulled toward the brake coil 972, so the brake surface 971a moves away from the side surface of the movable weight 963. Note that instead of rubber, it is also possible to attach sponge, urethane, felt, a brush, etc. to the front surface of the brake surface 971a.

Figure 72:
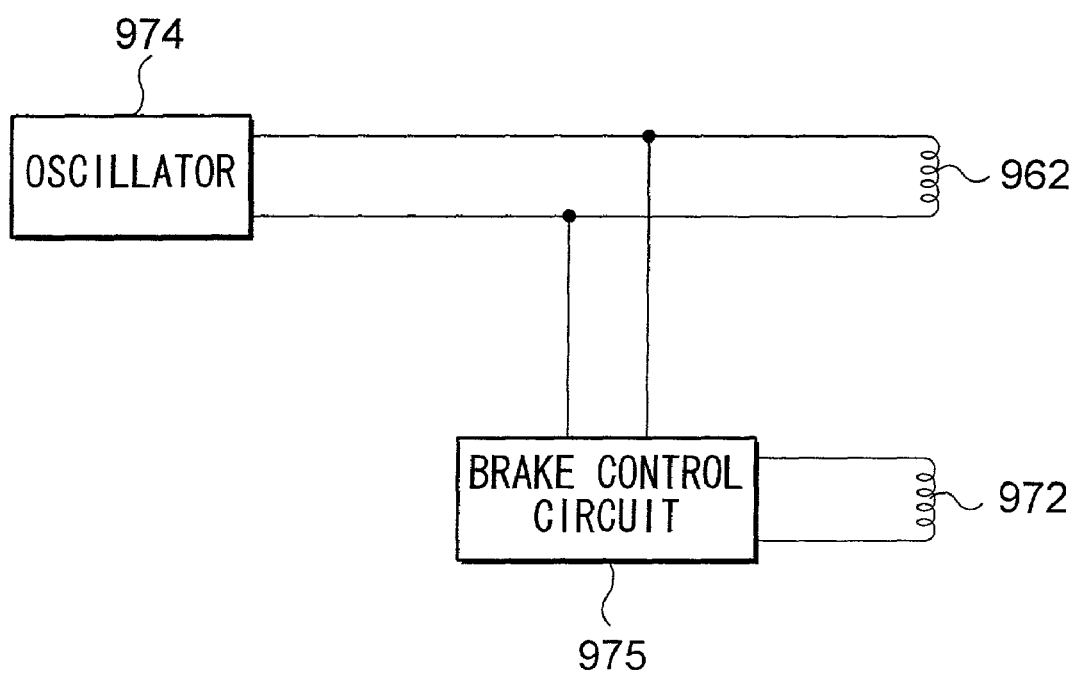
FIG. 72 is a view illustrating a circuit configuration for applying a drive signal to a coil and a brake coil of an oscillatory actuator according to the second example of this embodiment.
Figure 73:
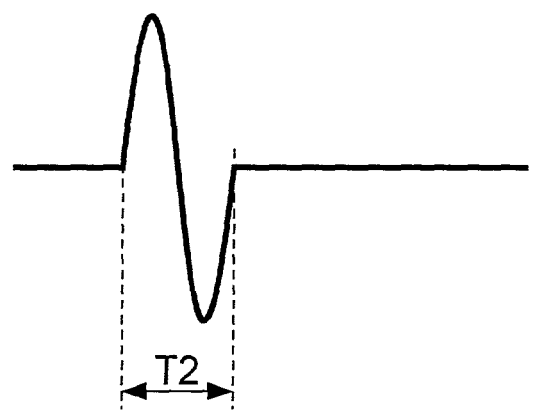
FIG. 73 is a view illustrating a waveform of a drive signal applied to a coil of an oscillatory actuator according to the second example of this embodiment.
Figure 74:
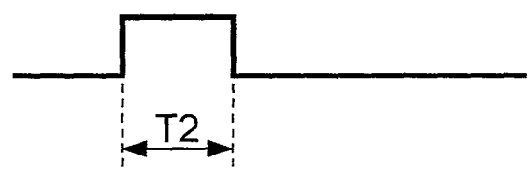
FIG. 74 is a view illustrating a waveform of a drive signal applied to a brake coil of an oscillatory actuator according to the second example of this embodiment.

FIG. 72 is a view illustrating a circuit configuration for applying a drive signal to the coil 962 and the brake coil 972. In the figure, the oscillator 974 generates a drive signal for driving the coil 962. An example of the waveform of the drive signal generated by this oscillator 974 is shown in FIG. 73. The movable weight 963 reciprocates by the application of the alternating current waveform shown in the figure to the coil 962. Further, the brake control circuit 975 generates a drive signal to be applied to the brake coil 972. This brake control circuit 975 monitors the drive signal generated from the oscillator 974 and outputs a drive signal of a square wave to the brake coil 972 for exactly the period T2 during which the drive signal is generated by the oscillator 974.

Therefore, in the period when the oscillator 974 applies a drive signal to the coil 962, a drive signal is applied from the brake control circuit 975 to the brake coil 972, so the brake surface 971a of the brake member 971 moves away from the side surface of the movable weight 963. Further, during this period, since the drive signal is supplied from the oscillator 974 to the coil 962, the movable weight 963 reciprocates. As opposed to this, when application of the drive signal from the oscillator 974 to the coil 962 is stopped, application of the drive signal from the brake control circuit 975 to the brake coil 974 is also stopped. Therefore, the brake surface 971a of the brake member 971 is pushed against the side surface of the movable weight 963 and the reciprocation of the movable weight 963 is made to quickly stop. Therefore, similar effects as the first example of the present embodiment are exhibited.

[M-3: Third Example]

Figure 75:
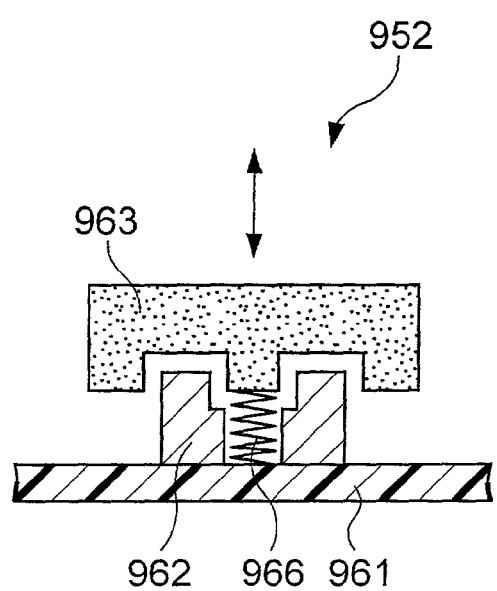
FIG. 75 is a sectional view illustrating the internal structure of an oscillatory actuator according to a third example of this embodiment.

FIG. 75 is a sectional view illustrating the internal structure of an oscillatory actuator 975 according to a third example of this embodiment. In the figure, the oscillatory actuator 952 has inside a case 961 a coil 962, a movable weight 963, and a spring 966. These coil 962, movable weight 963, and spring 966 are the same as in the first example of the present embodiment. Further, in the figure, the vibratory member is provided in contact with the case 961 at a position facing the coil 962 across the case 961.

Figure 76:
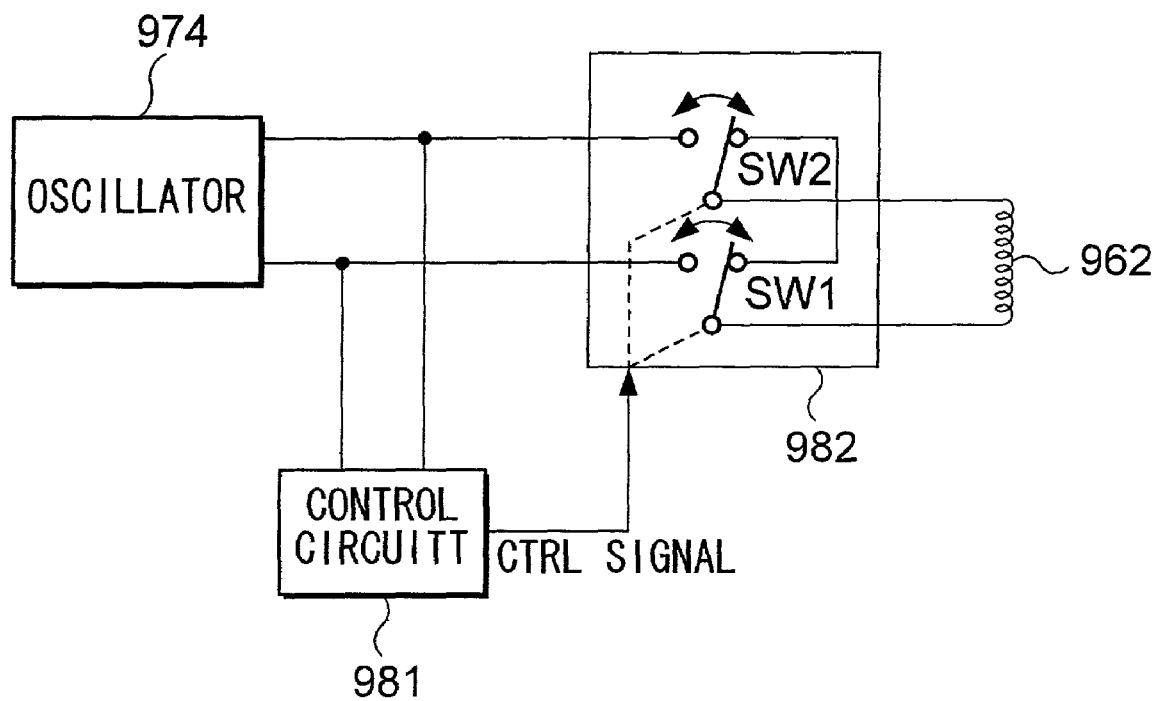
FIG. 76 is a view illustrating the circuit configuration for applying a drive signal to a coil of an oscillatory actuator according to the third example of this embodiment.
Figure 77:
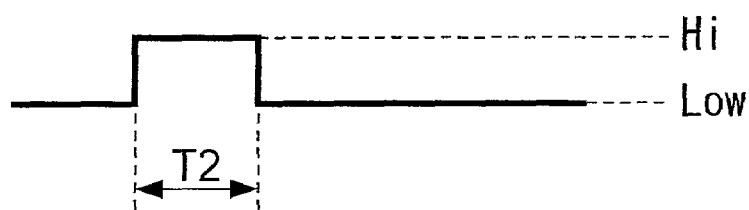
FIG. 77 is a view illustrating a waveform of a CTRL signal supplied to a switch circuit according to the third example of this embodiment.

Next, FIG. 76 is a view illustrating the circuit configuration for applying a drive signal to the coil 962. The oscillator 974 shown in the figure is the same as in the second example of the present embodiment, so an explanation will be omitted. The control circuit 981 controls the switching of the switches SW1 and SW2 at two locations in the switch circuit 982. The control circuit 981 monitors the drive signal generated from the oscillator 974 (see FIG. 73) and, as shown in FIG. 77, outputs a CTRL signal that becomes the "Hi" level for exactly the period T2 during which the drive signal is generated from the oscillator 974. The switches SW1 and SW2 of the switch circuit 982 connect the oscillator 974 and the coil 962 when the CTRL signal supplied from the control circuit 981 is the "Hi" level. Therefore, while the CTRL signal is the "Hi" level, the drive signal is applied from the oscillator 974 to the coil 962 and the movable weight 963 reciprocates.

As opposed to this, when the CTRL signal supplied from the control circuit 981 becomes the "Low" level, that is, when application of the drive signal from the oscillator 974 to the coil 962 is stopped, the switches SW1 and SW2 of the switch circuit 982 switch the connection points as shown in FIG. 76 and short-circuit the coil 962. Therefore, due to the electromagnetic braking action, the reciprocation of the movable weight 963 can be quickly made stopped when stopping application of the drive signal. Accordingly, similar effects to the first example of the above embodiment are exhibited.

If using the oscillatory actuators 950 to 952 shown in the first example to the third example of the present embodiment explained above as vibration generators of the electronic devices in the first to twelfth embodiments, it is possible to more suitably control the vibration given to the user.

The reason is that, first, these oscillatory actuators 950 to 952 are provided with brake mechanisms. Therefore, it is possible to clearly give the user a "click" or other operation feeling where the strength of the vibration has to be clearly differentiated in a short time.

Second, these oscillatory actuators 950 to 952 are linear oscillatory actuators, so the directional accuracy of the vibration generated is high. Further, third, these oscillatory actuators 950 to 952 house the coil 962 and the movable weight 963 inside the case 961 sealed as a magnetic shield, so there is no effect of magnetic force from the surrounding electronic components etc. Accordingly, there is no deviation in direction of vibration generated by the oscillatory actuators 950 to 952 and no distortion of the shape of amplification of the vibration. Due to the above second and third advantages, the vibration generated by the oscillatory actuators 950 to 952 can be more finely controlled. Accordingly, it is possible to give the user a pressing feeling or a "click" feeling when the touch panel is touched or when a thin operation key is pressed. Further, the oscillatory actuators 950 to 952 never cause surrounding electronic components etc. to malfunction due to their magnetic force.

Fourth, these oscillatory actuators 950 to 952 are integrally packaged. Therefore, compared with when dividing the members of the oscillatory actuator, first of all there is almost never a problem in the mounting accuracy of the permanent magnet and the coil. Further, there is resistance to deterioration of the accuracy of mounting of the permanent magnet and coil due to aging. Accordingly, it is possible to cause the oscillatory actuators 950 to 952 to generate vibration by a stable accuracy. Further, assembly into an electronic device is easy. Further, even when the electronic device body or housing or other support member for supporting the vibratory member where the oscillatory actuators 950 to 952 are placed (for example, the touch panel or the liquid crystal display panel) is not firmly fixed or when the mass of the support member is not sufficiently large compared with the vibratory member, the oscillatory actuators 950 to 952 can give a sufficiently large vibration to the vibratory member. This is suitable for use for a light weight electronic device or portable electronic device.

Fifth, in the oscillatory actuators 950 to 952, since an audible band audio signal is applied to the coil 962, it is also possible to utilize the oscillatory actuators 950 to 952 as sound sources. If it is possible to make dual use of vibration generators and sound sources in this way, it is possible to greatly reduce the installation space of components in a small sized electronic device.

Note that the oscillatory actuators 950 to 952 shown in the first example to third example of the present embodiment are sealed by the case 115a having an anti-magnetic effect, but they may also not be sealed by the case 961. Further, the spring 966 supporting the movable weight 963 may be directly connected to the vibratory member and not to the case 961.

[N: Modifications]

Above, embodiments of the present invention were explained, but the embodiments are in the end only illustrations. Various modifications are possible within a range not out of the gist of the present invention. The following may be considered as embodiments.

[Modification 1]

In the first embodiment, the memory 112 stores a plurality of types of waveform data. The CPU 113 may read the waveform data designated by the operation input from the user in advance and drive the oscillatory actuator 115. According to this configuration, it is possible to give a greater variation to the mode of vibration used at the time of a report. For example, the vibration time, the magnitude of vibration, and the period of the strength of the vibration may be freely changed.

Further, the memory 112 stores sample data of the drive signal waveform. The drive signal generation circuit 114 converts the sample data from a digital to analog (D/A) format to generate the drive signal.

[Modification 2]

In the above first to third embodiments, a user can designate whether to enable or disable the vibration report mode. In this case, the CPU 113 displays a screen for prompting the user to designate whether to enable or disable the report function by operation input from the user. When enablement or disablement is designated by the operation input from the user, the CPU 113 sets the value of the vibration flag in the memory 112 "0" (disable) or "1" (enable) in accordance with the designated content. Further, the CPU 113, in the case of detecting operation input from the touch panel 102 or the operation keys 104a to 104c, determines whether to report by vibration or not in accordance with the value of the vibration flag.

[Modification 3]

For example, the present invention can also be applied to an operation panel 990 installed at a location separate from the body of a lighting facility and for inputting an operation instruction to the body of the facility. The operation panel 990 shown in the figure is installed for example on the wall of a room. The rear surface of the operation panel 990 is provided with a vibration generator 991 such as an oscillatory actuator 115. Further, while not shown, the control device for controlling the main body of the lighting facility controls the report by vibration including driving the vibration generator 991.

Figure 80:
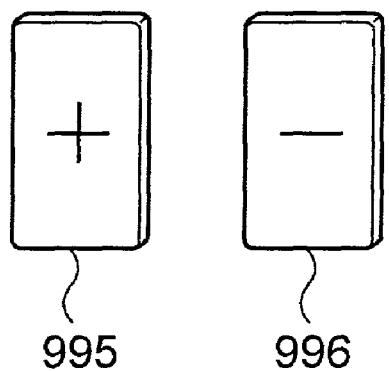
FIG. 80 is a view illustrating a "+" key and a "−" key according to this modification.
Figure 81:
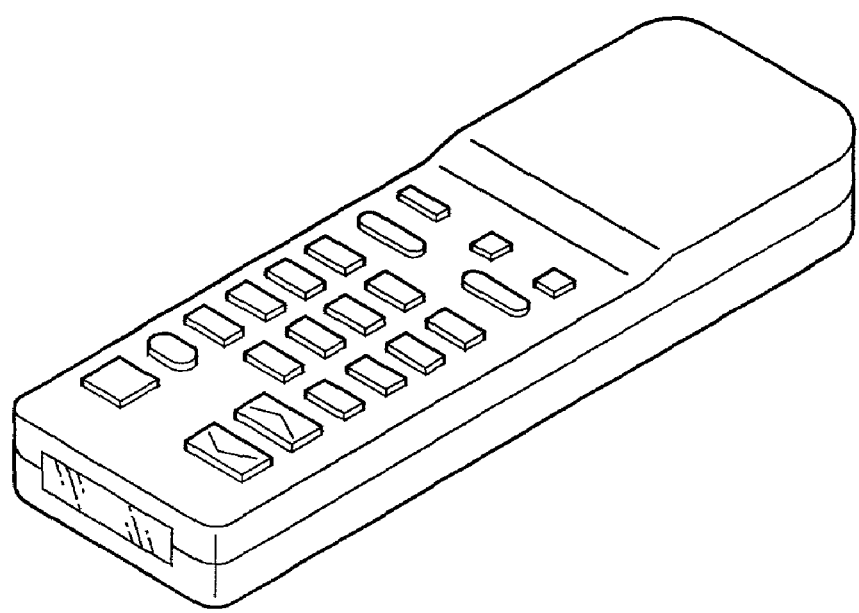
FIG. 81 is a perspective view illustrating the appearance of a remote controller of an electronic device according to this modification.

When the user switches an on/off key 992 of the operation panel 990 by his or her fingertip, the control device drives the vibration generator 991 and transmits vibration to the fingertip of the user touching the on/off key 992. Further, in the lighting facility, the amount of the lighting can be continuously changed from bright to dark. If the user operates a slider switch 993 for instructing the amount of the lighting to the control device by his or her fingertip, vibration of a magnitude in accordance with the amount of lighting changed by this operation is transmitted to the fingertip of the user operating the slider switch 993. Note that instead of the slider switch 993, it is also possible to use a dial type switch 994 shown in FIG. 79 or a plus key 995 and a minus key 996 shown in FIG. 80 having the same function as the slider switch 993.

Further, as shown in FIG. 91, it is of course possible to apply the present invention to an electronic device not having a touch panel or display unit such as a remote controller of a television or video. In the case of such an electronic device, it is sufficient to report to the user that input has been received from an operation key by causing the operation key or housing to vibrate.

[Modification 4]

In the first to 12th embodiments, the direction of vibration generated from the vibration generator such as an oscillatory actuator or vibrator is not limited to a direction perpendicular to the front surface of the touch panel or the direction of pressing the operation keys. Further, the frequency of the drive signal applied to the oscillatory actuator is not limited to the frequency for causing resonance in the housing or touch panel of the electronic device or the liquid crystal display panel provided with the touch panel or the oscillatory actuator itself. Similarly, the drive voltage applied to the vibrator also is not limited to a drive voltage for making the frequency of the DC motor correspond to the natural frequency of the housing or touch panel of the electronic device or the liquid crystal display panel provided with the touch panel or the vibrator itself.

[Modification 5]

In the first to twelfth embodiments, the vibrator generator is not limited to a linear oscillatory actuator or a vibrator having an eccentric weight. For example, it is also possible to use a vibration generator using a piezoelectric element.

Further, in the embodiments other than the second embodiment, the explanation was made of a linear oscillatory actuator using a permanent magnet as a movable weight. Here, the movable weight requires a mechanism for obtaining a suitable mass necessary for causing the generation of vibration and excitation for the movable weight to reciprocate. In the above embodiments, a permanent magnet was used as the mechanism for obtaining the suitable mass and excitation. The movable weight however may be comprised by assembling a permanent magnet into part of the member of the weight. Further, a permanent magnet may be fixed in the case of the linear oscillatory actuator and a coil used as the movable weight. Further, a coil may be fixed in the case and another coil used as the movable weight. Naturally, in this case, when the coil used as the movable weight does not have a sufficient mass, it is sufficient to use the coil as part of the weight having a suitable mass. Further, the linear oscillatory actuator may also be movable iron core type linear oscillatory actuator.

Figure 82:
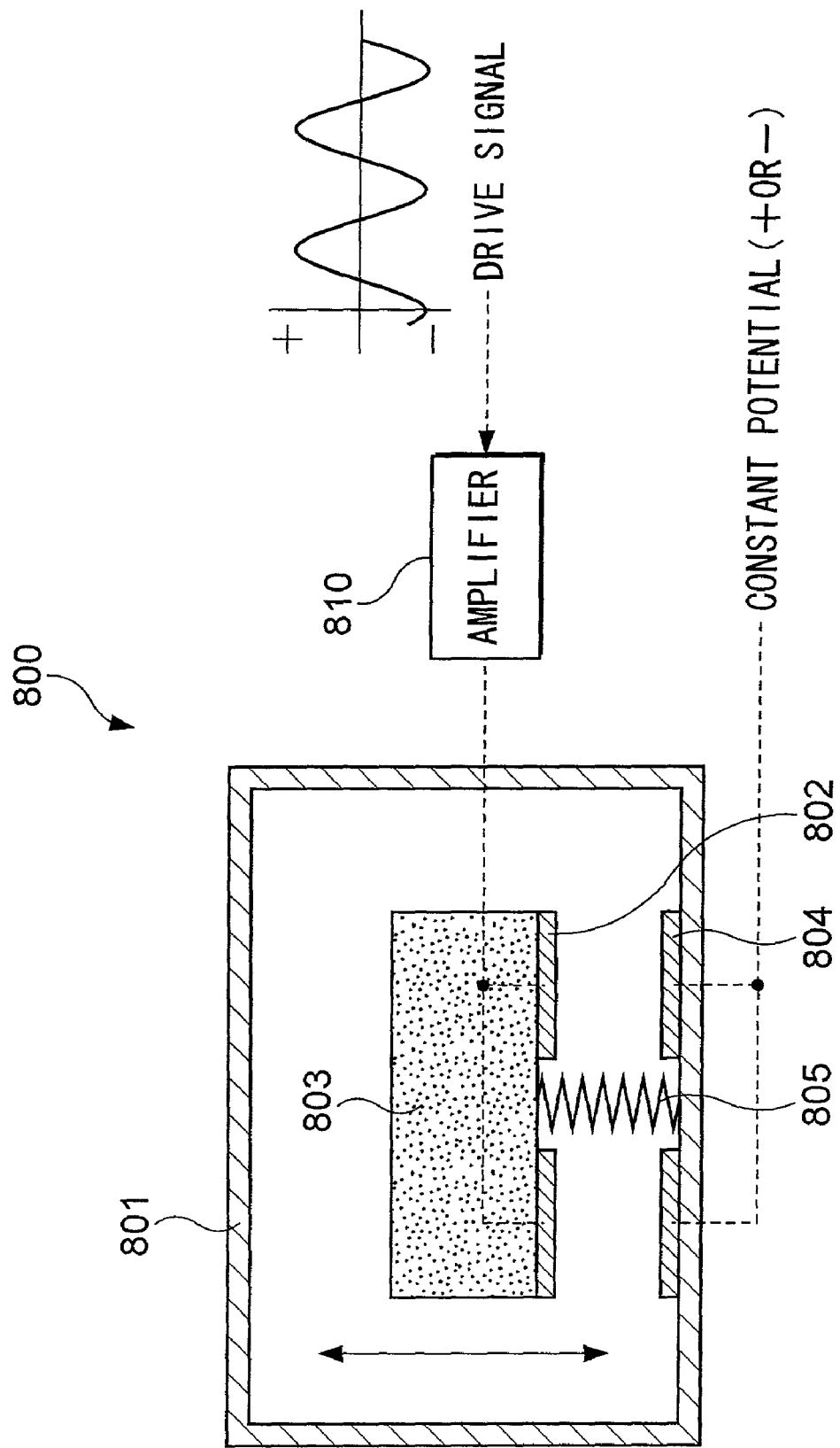
FIG. 82 is a view illustrating an electrostatic type oscillatory actuator according to a fifth modification of the present invention.

Further, the oscillatory actuator may also be a so-called electrostatic type oscillatory actuator using electrostatic force. FIG. 82 is a view for explaining an electrostatic type oscillatory actuator according to a first example of this modification. In the figure, an oscillatory actuator 800 has a movable weight (weight) 803 provided with an electrode 802 inside the case 801, an electrode 804 provided at the inside wall of the case 801, and a spring 805. Note that in the figure, the vibratory member is provided at a position facing the electrode 804 across the case 801.

The movable weight 803 is a columnar weight provided with an annular electrode 802 at its bottom surface. This movable weight 803 is supported by the spring 805 in a state able to linearly reciprocate in the vertical direction in the figure in the space formed inside the case 801. This spring 805, as shown in the figure, has one end connected to the case 801 contacting the vibratory (base member) and has the other end connected to the movable weight 803. Note that the movable weight 803 other than the electrode 802 should be a weight having a suitable mass. Further, the annular electrode 804 is provided at the surface of the inside wall of the case 801 facing the electrode 802.

This electrode 804 is supplied with a plus or minus constant potential from the outside of the oscillatory actuator 800 at all times when the oscillatory actuator 800 is being driven. On the other hand, the electrode 802 of the movable weight 802 is supplied with an AC voltage (drive signal) alternating between a plus and minus state from the outside of the oscillatory actuator 800 through an amplifier 810.

Here, when the potentials of the electrode 802 and electrode 803 become the same, that is, become plus and plus or minus and minus, the charges of the same signs repel each other. Due to this property of electrostatic force, the movable weight 803 moves in the up direction in the figure. On the other hand, when the potentials of the electrode 802 and the electrode 803 become different, that is, plus and minus, the charges of the different sign attract each other. Due to this property of electrostatic force, the movable weight 803 moves in the down direction in the figure.

The oscillatory actuator 800 according to this modification linearly reciprocates in the vertical direction in the figure in this way. Further, by a counter force of the reciprocation of the movable weight 803, a vibrational acceleration occurs at the portion of the case 801 to which the spring 805 is connected and the vibration is transmitted to the vibratory member. Note that along with reciprocation of the movable weight 803, a vibration component transmitted from the movable weight 803 through the spring 805 is applied to the portion of the case 801 to which the spring 805 is connected in addition to the counter force of the reciprocation. The principle of generation of vibration in this oscillatory actuator 800, however, is based on the use of the vibrational acceleration occurring by a counter force to the reciprocation of the movable weight 803 in the same way as in the oscillatory actuator 115 explained in the first embodiment.

Figure 83:
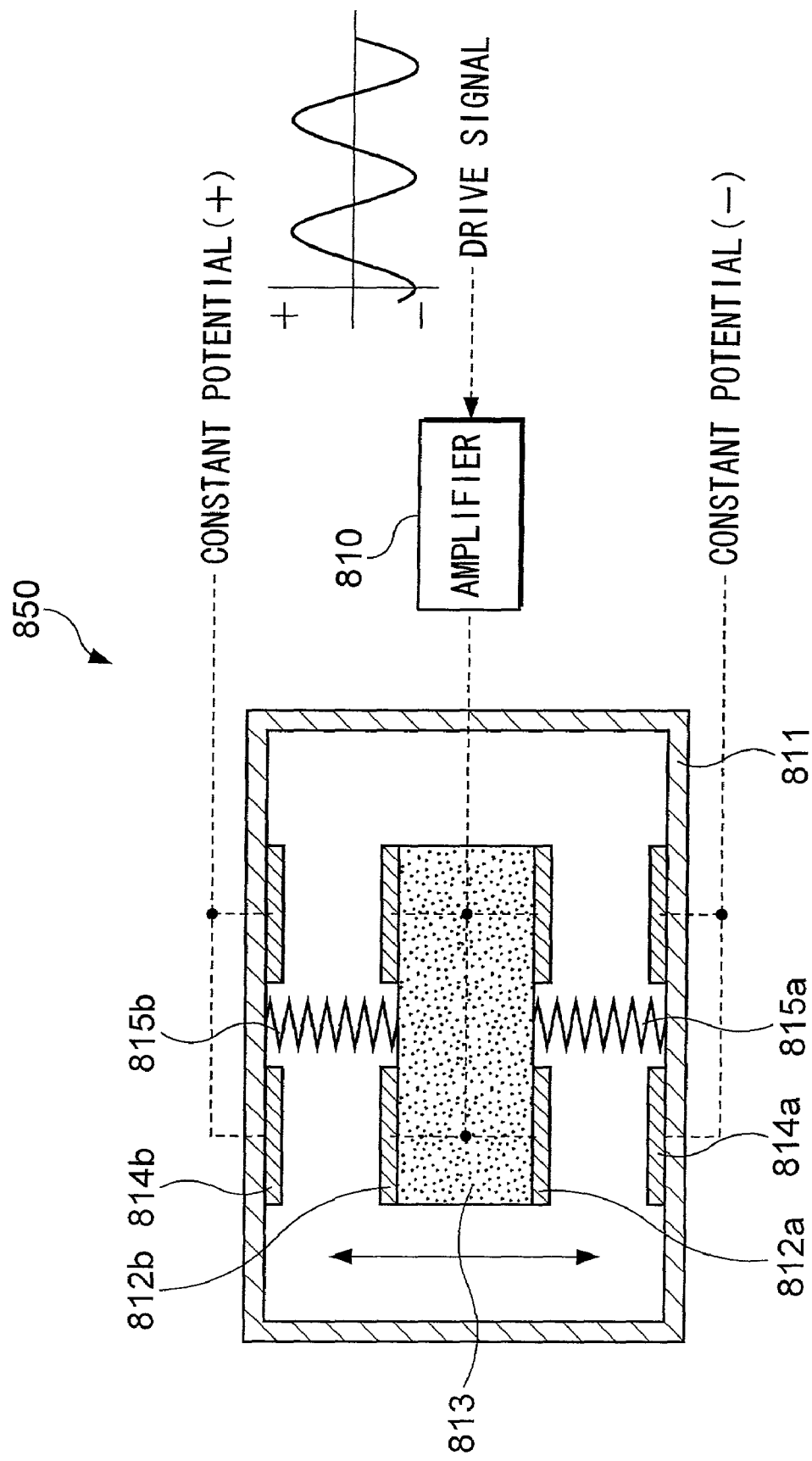
FIG. 83 is a view for explaining another electrostatic type oscillatory actuator according to the fifth modification of the present invention.

Further, FIG. 83 is a view for explaining an electrostatic type oscillatory actuator according to a second example of this modification. In the configuration shown in this figure as well, in the same way as the oscillatory actuator 800 shown in FIG. 82, the movable weight 813 reciprocates due to the electrostatic force and vibration is generated. Further, the oscillatory actuator 850 has a total of two pairs of counter electrodes, that is, the electrode 812a and electrode 814a and the electrode 812b and electrode 814b. When one pair of counter electrodes are in a repelling state, the other pair of counter electrodes are in an attracting state. Therefore, compared with the oscillatory actuator 800 shown in FIG. 82, the electrostatic force for causing the movable weight 813 to reciprocate becomes double and a greater vibration can be generated.

Note that the electrostatic type oscillatory actuators 800 and 850 shown in FIG. 82 and FIG. 83 may further be provided with brake mechanisms explained in the first example and second example of the thirteenth embodiment. Further, the electrodes, the shapes of the waveforms of the drive signals, etc. are not limited to those shown in FIG. 82 and FIG. 83.

[Modification 6]

Figure 84:
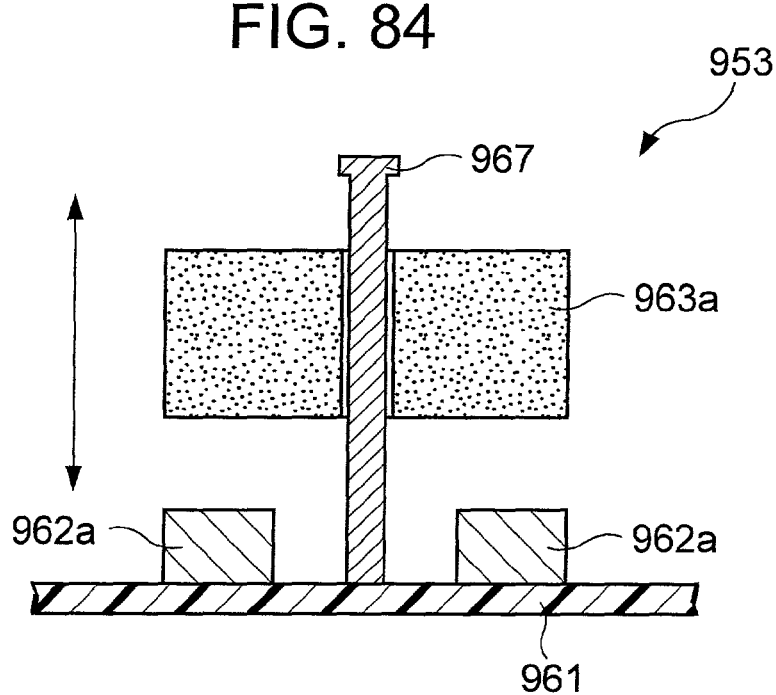
FIG. 84 is a view illustrating the internal structure of an oscillatory actuator according to a sixth modification of the present invention.

Further, in the oscillatory actuator, the support member for supporting the movable weight to be able to reciprocate in the air is not limited to a spring, rubber band, etc. For example, the support member may also be a guide rail 967 as shown in FIG. 84. In this figure, the movable weight 963a is provided with a hole passing through the vertical direction in the figure in its center. The guide rail 967 is provided to pass through the hole of the movable weight 963a. One end is fixed to the case 961 in contact with the vibratory member. Even when using such a guide rail 967, it is possible to support the movable weight 963a to be able to reciprocate in the air by the magnetic force generated from the coil 962a. Further, this guide rail 967 limits the direction of motion of the movable weight 963a and functions to cause linear reciprocation.

[Modification 7]

In the first to 12th embodiments, the operation unit for causing vibration by the vibration generator is not limited to a touch panel or operation keys. For example, it may be the keyboard itself having a plurality of operation keys or a mouse, track ball, tablet, or other of the various types of pointing devices. Further, it is possible to use a photo coupler type, resistance type, contact type, magnetic coupler type, capacity coupler type, or other various types of touch panels.

[Modification 8]

In the first embodiment to the 12th embodiments, the explanation was made of the case of application of the present invention to a PDA or an ATM. The present invention however of course may also be applied to for example a mobile phone, electronic notebook, mobile computer, wristwatch, electronic calculator, remote controller of an electronic device, and other various types of portable electronic devices. Further, the present invention may also be applied to a stationary type computer or a vending machine, cash register, car navigation system, household electric appliance, or other of various types of electronic devices not having portability.

Note that in an electronic device not having portability, it is difficult to envision a mode of use where the user inputs operations by one hand while holding the electronic device by the other hand. Therefore, when causing a location other than the operation unit to vibrate in such an electronic device, it is sufficient to cause part of the housing where part of the body of the user will contact or probably will contact during operation to vibrate.

Figure 85:
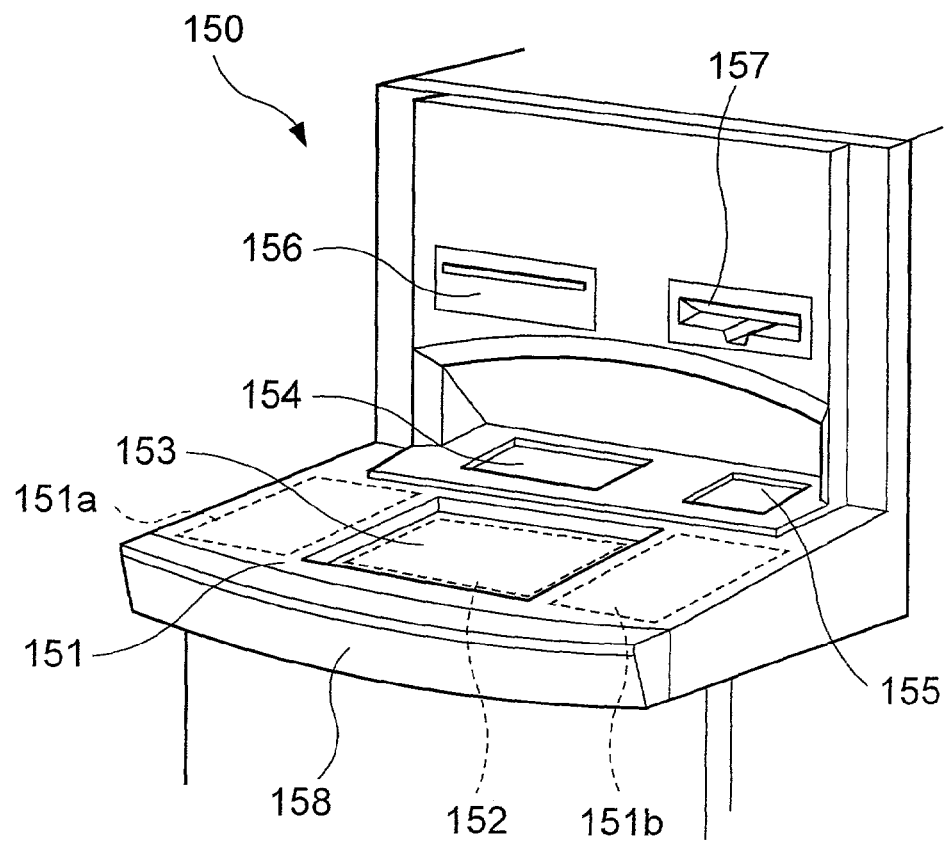
FIG. 85 is a perspective view illustrating the appearance of an ATM according to an eighth embodiment of the present invention.

For example, FIG. 85 is a perspective view illustrating the appearance of an ATM 150 according to this modification. In the figure, the operation console 151 of the ATM 150 is provided with a liquid crystal display panel 153 over which a transparent touch panel 152 is laid covering the opening. The user performs a touch operation on the touch panel 152 while standing in front of the operation console 151. Note that the operation console 151 is provided with a cash depositing/dispensing opening 154 or a coin depositing/dispensing opening 155 in addition to the touch panel 152. Further, the standing surface above the top surface of the ATM 150 is provided with a passbook insertion slot 156 or a card insertion slot 157.

When the user performs a touch operation on such an ATM 150, it can be envisioned that the hand other than the hand engaging in the touch operation is placed on the console area 151a or the console area 151b of the operation console 151. Therefore, it is sufficient for the operating unit of the ATM 150 to drive a not shown vibration generator in accordance with detection of a touch operation on the touch panel 152 and cause the console area 151a or console area 151b to vibrate. Further, similarly, when the user performs a touch operation, it can be envisioned that the thighs or part of the torso of the user contact the console edge member 158 provided in front of the operation console 151. Therefore, the operating unit of the ATM 150 can be configured to cause the console edge member 158 to vibrate in accordance with detection of a touch operation on the touch panel 152.

The invention claimed is:

1. An electronic device, comprising:
   a first casing, a surface of which comprises a hand-touched portion;
   at least one first vibration generator for generating vibration, including a second casing mounted to an inner surface of said first casing of said electronic device;
   a weight movably supported by an elastic support member extending vertically from an inner surface of said second casing;
   first excitation generating means for exciting said weight such as to cause it to move reciprocally in a vertical direction relative to the surface of said first casing of said electronic device; and
   brake means to be moved relative to said weight to cause reciprocal movement of said weight caused by said first excitation generating means to stop; and
   vibration control means for controlling said first excitation generating means to cause, in said first vibration generator, vibration which is transmitted via said second casing to the hand-touched portion of said first casing of said electronic device.

2. An electronic device according to claim 1, wherein said brake means comprises a brake member provided with a resistance imparting material on at least one surface to face and be in constant contact with an opposing surface of said weight member.

3. An electronic device as set forth in claim 2, wherein the resistance imparting material that faces and is in constant contact with the opposing surface of said weight member is flexible.

4. An electronic device according to claim 1, wherein said brake means comprises:
   a movable magnetic brake member mounted to an inner surface of said second casing and having a brake surface facing a side surface of said weight;
   a magnetic drive mounted to said casing at a side of said brake member opposite to that on which said brake surface is provided; and
   brake control means for energizing said magnetic drive so as to move said brake member.

5. An electronic device according to claim 4, wherein said brake means further comprises elastic biasing means connecting said brake member with a lower surface of said second casing, and acting to bring the brake surface of said brake member into contact with the side surface of said weight;
   wherein said magnetic drive is mounted to said casing at a side of said brake member opposite to that to which said elastic biasing member is connected; and
   wherein said brake control means energizes said magnetic drive so as to move said brake member against the force of said elastic biasing means.

6. An electronic device according to claim 5, wherein said brake member is maintained in a contact position with said weight by said elastic biasing means during a period when said weight is not being excited, whereas said brake member is pulled away from said weight during a period of excitation of said weight.

7. An electronic device according to claim 1, wherein, in a case of driving said vibration generator to cause generation of vibration, said vibration control means applies to said first vibration generator a drive signal, to cause said second casing to resonate.

8. An electronic device according to claim 1, wherein said first vibration generator causes said weight to reciprocate under excitation generated by said excitation generating means and transmits to the hand-touched portion of said first casing of said electronic device vibrational acceleration caused at said second casing by a counter force of said reciprocation.

9. An electronic device according to claim 1, wherein said first vibration generator further comprises a guide mechanism of said weight for causing said weight to move reciprocally in a vertical direction relative to the surface of said first casing of said electronic device.

10. An electronic device according to claim 1, wherein said excitation generating means causes generation of magnetic force as said excitation.

11. An electronic device according to claim 1, wherein said excitation generating means causes generation of electrostatic force as said excitation.

12. An electronic device according to claim 1, wherein
   said first vibration generator comprises a coil as said excitation generating means for causing generation of magnetic force; and
   said electronic device further including short-circuiting means for, in a case that said electronic device stops supplying current to said coil, causing an input end of said coil to short-circuit.

13. An electronic device according to claim 1, wherein
   said excitation generating means causes generation of magnetic force as said excitation; and
   wherein said weight, said elastic support member, and said excitation generating means are housed in said second casing having an anti-magnetic effect.

14. An electronic device according to claim 1, wherein
   said excitation generating means causes generation of magnetic force as said excitation; and
   wherein said weight is formed using a permanent magnet.

15. An electronic device according to claim 1, further comprising an operation unit for receiving an operation input from a user; and
   wherein the hand-touched portion includes said operation unit.

16. An electronic device according to claim 1, wherein the hand-touched portion includes a hand-held portion of said electronic device.

17. An electronic device according to claim 1, further comprising a display panel over which a touch panel is superposed; and
wherein the hand-touched portion includes the touch panel.

18. An electronic device according to any one of claims 1–14, further comprising an operation unit for receiving an operation input from a user; and
wherein said vibration control means for controlling said first vibration generator, in a case of detecting that an operation input to said control unit has been received by said operation unit, generates vibration which is transmitted via said second casing to said operation unit.

19. An electronic device as set forth in claim 18, wherein said first vibration generator causes said operation unit to vibrate in a direction of contact made by a user, and an opposite direction, said direction of contact being that made at a time of an operation input to said operation unit made by said user.

20. An electronic device as set forth in claim 18, wherein said vibration control means detects that an operation input to said control unit has been received, and then causes said first vibration generator to generate vibration for a predetermined period of not more than 1 second.

21. An electronic device as set forth in claim 18, wherein:
said operation unit is a touch panel; and
said first vibration generator causes said touch panel or a display means provided for said touch panel to vibrate.

22. An electronic device as set forth in claim 18, wherein:
said operation unit has an operating member; and
said first vibration generator causes said operating member to vibrate.

23. An electronic device as set forth in claim 18, further comprising designating means for designating whether an operation input should result in a report by vibration; and
wherein, in a case that said designating means designates execution of said report by vibration, said vibration control means causes said first vibration generator to vibrate when it detects an operation input.

24. An electronic device according to any one of claims 1–14, further comprising an operating unit for receiving an operation input;
wherein at least a part of said second casing is provided exposed to the outside from said first casing of said electronic device and transmitting vibration directly to said user, instead of mounting said second casing to said inner surface of said first casing; and
wherein said vibration control means, in a case of detecting that an operation input to said operating unit has been received, causes said first vibration generator to generate vibration.

25. An electronic device according to any one of claims 1–14, further comprising an operation unit for receiving an operation input from a user; and
wherein said vibration control means causes, in a case that it is detected that execution of processing instructed by said operation input to said operation unit has ended, said first vibration generator to generate vibration so as to transmit via said second casing the generated vibration to the hand-touched portion.

26. An electronic device as set forth in claim 25, wherein said vibration control means switches a vibration mode of said first vibration generator in accordance with a result of an execution of said processing.

27. An electronic device as set forth in claim 25, wherein said vibration generator imparts vibration to said operating unit or a hand-touched portion of said electronic device.

28. An electronic device according to any one of claims 1–14, further comprising:
an operating unit for receiving an operation input from a user;
a second vibration generator for generating vibration, including a third casing mounted to an inner surface of said first casing of said electronic device:
a weight movably supported by an elastic support member extending vertically from an inner surface of said third casing; and
second excitation generating means for exciting said weight such as to cause it to move reciprocally in a vertical direction relative to the surface of said first casing of said electronic device;
wherein said first vibration generator generates vibration which is transmitted via said second casing to said operating unit;
wherein said second vibration generator generates vibration which is transmitted via said third casing to a hand-held portion of said electronic device; and
wherein said vibration control means controls, in a case of detecting that an operation input to said operating unit has been received, at least one of said first vibration generator and said second vibration generator designated in advance by a user, to generate vibration.

29. An electronic device according to claim 28, wherein said second vibration generator further comprises brake means to be brought into contact with said weight to cause reciprocal movement of said weight caused by said second excitation generating means to stop.

30. An electronic device according to any one of claims 1–14, further comprising:
an operating unit for receiving an operation input from a user;
a second vibration generator for generating vibration, including: a third casing mounted to an inner surface of said first casing of said electronic device;
a weight movably supported by an elastic support member extending vertically from an inner surface of said casing;
second excitation generating means for exciting said weight such as to cause it to move reciprocally in a vertical direction relative to the surface of said first casing of said electronic device; and
detecting means for detecting whether said electronic device is being held by a user;
wherein said vibration control means selects, in a case of detecting that an operation input to said operating unit has been received, selecting at least one of said first vibration generator and said second vibration generator in accordance with results of detection by said detecting means and causes the said selected vibration generator to generate vibration.

31. An electronic device according to claim 30, wherein said second vibration generator further comprises brake means to be brought into contact with said weight to cause reciprocal movement of said weight caused by said second excitation generating means to stop.

32. An electronic device as set forth in claim 30, wherein, in a case that said detecting means detects that said electronic device is not being held by said user after detecting that an operation input to said operating unit has been received, said vibration control means causes only said first vibration generator to generate vibration.

33. An electronic device according to any one of claims 1–14, further comprising:
   a display panel over which a touch panel is superposed, wherein said first vibration generator is disposed on a surface of said display panel; and
   an elastic member for supporting said display panel so as to allow said display panel to vibrate under vibration generated by said vibration generator,
   wherein said vibration control means causes, in a case of detecting that a touch operation on said touch panel has been received, said first vibration generator to generate vibration.

34. An electronic device as set forth in claim 33, wherein said display panel is attached to said first casing of said electronic device through said elastic member.

35. An electronic device as set forth in claim 33, wherein said display panel is attached to a main body of said electronic device through said elastic member.

36. An electronic device as set forth in claim 33, wherein said vibration control means detects that an operation input to said touch panel has been received, and then causes said first vibration generator to generate vibration for a predetermined time of not more than 1 second.

37. An electronic device according to any one of claims 1–14, further comprising a display panel over which a touch panel is superposed, wherein said first vibration generator is disposed at said display panel so as to support said display panel, said first vibration generator generating vibration which is transmitted via said second casing to said display panel; and
   wherein said vibration control means causes, in a case of detecting that a touch operation on said touch panel has been received, causing said first vibration generator to generate vibration.

38. An electronic device as set forth in claim 37, wherein said display panel is attached to said first casing of said electronic device through said first vibration generator.

39. An electronic device as set forth in claim 37, wherein said display panel is attached to a main body of said electronic device through said first vibration generator.

40. An electronic device as set forth in claim 37, wherein said vibration control means detects that an operation input to said touch panel has been received, and then causes said first vibration generator to generate vibration for a predetermined time of not more than 1 second.

41. An electronic device according to any one of claims 1–14, further comprising:
   a display; and
   a touch panel covering a display screen of said display, wherein said first vibration generator is provided between said display and said touch panel, so as to support said touch panel on said display screen and to transmit vibration to said touch panel; and
   wherein said vibration control means causes, in a case of detecting that a touch operation on said touch panel has been received, said first vibration generator to generate vibration.

42. An electronic device as set forth in claim 41, wherein said first vibration generator is installed at a position not overlapping said display screen.

43. An electronic device as set forth in claim 41, wherein said vibration control means detects that a touch operation on said touch panel has been received, and then causes said first vibration generator to generate vibration for a predetermined period of not more than 1 second.

44. An electronic device according to any one of claims 1–14, further comprising:
   a display;
   a touch panel covering a display screen of said display, wherein said first vibration generator is disposed at said touch panel so as to transmit vibration to said touch panel; and
   a vibration absorbing member provided between said display and said touch panel for absorbing, from among vibration components generated from said first vibration generator, a vibration component which is about to be transferred to said display,
   wherein said vibration control means causes, in case of detecting that a touch operation on said touch panel has been received, causing said first vibration generator to generate vibration.

45. An electronic device as set forth in claim 44, wherein said vibration absorption member is installed at a position not overlapping said display screen.

46. An electronic device as set forth in claim 44, wherein said vibration absorbing member uses an elastic body.

47. An electronic device as set forth in claim 46, wherein said vibration absorption member is installed at a position not overlapping said display screen.

48. An electronic device as set forth in claim 46, wherein said first vibration generator is installed at a position not overlapping said display screen.

49. An electronic device as set forth in claim 46, wherein said vibration control means detects that a touch operation on said touch panel has been received, and then causes said first vibration generator to generate vibration for a predetermined period of not more than 1 second.

50. An electronic device according to any one of claims 1–14, further comprising an operating unit for receiving an operation input;
   wherein said first vibration generator generates vibration which is transmitted to a part of said first casing of said electronic device, said part of said first casing being different from said operating unit; and
   wherein said vibration control means, in a case of detecting that an operation input to said operating unit has been received, identifies a type of operation input and causes said first vibration generator to generate vibration by a vibration mode associated with said type of operation input.

51. An electronic device as set forth in claim 50, wherein said operating unit is a touch panel; and
   wherein said vibration control means, in a case of detecting that a touch operation on said touch panel has been received, detects a touched position of said touch operation on said touch panel and causes said first vibration generator to generate vibration by a vibration mode associated with said touched position.

52. An electronic device as set forth in claim 50, wherein said operating unit has a plurality of operating members; and
   wherein, in a case of detecting that an operation input to said operating unit has been received, said vibration control means identifies a type of operated operating member and causes said first vibration generator to generate vibration by a vibration mode associated with said type of said operated operating member.

53. An electronic device as set forth in claim 50, wherein, in a case of detecting that an operation input to said operating unit has been received, said vibration control means identifies a type of instruction indicated by said operation input and causes said first vibration generator to generate vibration by a vibration mode associated with said type of said instruction.

54. An electronic device according to any one of claims 1–14, further comprising:
an operating unit for receiving an operation input; and
changing means for changing a value of a parameter for controlling said electronic device in accordance with an operation input to said operating unit,
wherein said first vibration generator generates vibration which is transmitted to a part of said first casing of said electronic device, said part of said first casing being different from said operating unit; and
wherein said vibration control means causes, in a case of detecting that an operation input for changing a value of a parameter has been received at said operating unit, said first vibration generator to generate vibration by a vibration mode associated with said value of said parameter changed by said changing means in response to said operation input.

55. An electronic device according to any one of claims 1–14, further comprising an operating unit for receiving an operation input;
wherein said first vibration generator generates vibration which is transmitted via said second casing to said operating unit; and
wherein said vibration control means, in a case of detecting that an operation input has been received at said operating unit, identifies a type of operation input and causes said first vibration generator to generate vibration by a vibration mode associated with said type of said operation input.

56. An electronic device as set forth in claim 55, wherein said operating unit is a touch panel; and
wherein said vibration control means, in a case of detecting that a touch operation has been received at said touch panel, detects a touched position of said touch operation on said touch panel and causes said first vibration generator to generate vibration by a vibration mode associated with said touched position.

57. An electronic device as set forth in claim 55, wherein said operating unit has a plurality of operating members; and
wherein said vibration control means, in a case of detecting that an operation input to said operating unit has been received, identifies a type of operating member operated and causes said first vibration generator to generate by a vibration mode associated with said type of operating member operated.

58. An electronic device as set forth in claim 55, wherein, in a case of detecting that an operation input to said operating unit has been received, said vibration control means identifies a type of instruction indicated by said operation input and causes said first vibration generator to generate vibration by a vibration mode associated with said type of instruction.

59. An electronic device according to any one of claims 1–14, further comprising:
an operating member for continuously changing a value of a parameter for controlling said electronic device; and
changing means for changing said value of said parameter based on the operated amount of said operating member,
wherein said vibration control means causes, in a case of detecting that an operation input to said operating member has been received, said first vibration generator to generate vibration by a vibration mode associated with said value of said parameter changed by said changing means in response to said operation.

60. An electronic device according to any one of claims 1–14, further comprising an operating unit for receiving an operation input and detecting a level of pressure of said operation input; and
wherein said vibration control means causes, in a case of detecting that an operation input to said operating unit has been received, said first vibration generator to generate vibration by a vibration mode associated with a level of pressure of said operation input detected by said operating unit.

61. An electronic device as set forth in claim 60, wherein said operating unit is a touch panel.

62. An electronic device as set forth in claim 60, wherein, in a case that a fingertip of the operator or an operation tool touches said operating unit, said operating unit detects that said fingertip or control tool has pressed said operating unit with a force greater than a predetermined level of pressure as a different level of pressure.

63. An electronic device as set forth in claim 62, wherein said operating unit is a touch panel.

64. An electronic device as set forth in claim 60, wherein said operating unit is a combination of a first touch panel for detecting that either a fingertip of said user or an operation tool touches said operating unit and receiving this as a touch operation and a second touch panel for detecting that either said fingertip or operation tool has pressed said operating unit with a force greater than a predetermined level of pressure and receiving this as a touch operation, said first touch panel and said second touch panel overlapping each other.

65. An electronic device according to any one of claims 1–14, further comprising:
an operating unit for receiving an operation input;
sound producing means for providing an audio report to a user; and
report control means for, in a case of detecting that an operation input to said operating unit has been received, reporting to said user that said operation input has been received using at least one of said sound producing means and said first vibration generator being designated by said user in advance.

66. An electronic device according to any one of claims 1–14, further comprising:
an operating unit for receiving an operation input;
sound producing means for providing an audio report to a user;
measuring means for measuring a sound level of surroundings of said electronic device; and
report control means for, in a case of detecting that an operation input to said operating unit has been received, selecting at least one of said sound producing means and said first vibration generator based on measurement results of said measuring means and reporting to said user that an operation input has been received using said one selected.

67. An electronic device as set forth in claim 66, wherein, in a case of detecting that an amount of sound measured by said measuring means is above an amount of sound set in advance after detecting that an operation input to said operating unit has been received, said report control means reports to said user that said operation input has been received by using at least said first vibration generator.

68. An electronic device according to any one of claims 1–14, further comprising:
an operating unit for receiving an operation input;
sound producing means for providing an audio report to a user;
receiving means for receiving a signal designating at least one of said sound generating means or said first vibration generator from a base station covering an area in which said electronic device is located; and
report control means for, in a case of detecting that an operation input to said operating unit has been received, reporting to said user that said operation input has been received using at least one of said sound producing means or said first vibration generator designated by a signal received by said receiving means.

69. An electronic device according to any one of claims 1–14, further comprising:
an operating unit for receiving an operation input;
sound producing means for providing an audio report to a user;
acquiring means for acquiring location information of said electronic device; and
report control means for, in a case of detecting that an operation input to said operating unit has been received, selecting at least one of said sound producing means and said first vibration generator based on location information acquired by said acquiring means and using said selected means to report to said user that said operation input has been received.

70. An electronic device as set forth in claim 69, wherein, in a case that said electronic device is located in a preset area based on location information acquired by said acquiring means after detecting that an operation input to said operating unit has been received, said report control means reports to said user that said operation input has been received using only said first vibration generator.

71. An electronic device according to any one of claims 1–14, wherein said first vibration generator simultaneously causes generation of vibration and sound,
said electronic device further comprising:
an operating unit for receiving an operation input; and
drive control means for, in a case of detecting that an operation input to said operating unit has been received, synthesizing a drive signal for driving said first vibration generator to cause vibration and an audio signal for driving said first vibration generator to cause sound, and for applying said synthesized signal to said first vibration generator, thereby causing said first vibration generator to generate both vibration and sound.

72. An electronic device according to any one of claims 1–14, further comprising:
an operation panel for receiving a touch operation, wherein a plurality of said first vibration generators is disposed so as to transmit vibration to said operation panel; and
detecting means for detecting a touched position on said operation panel,
wherein said vibration control means, in a case of detecting that a touch operation to said operation panel has been received, selects at least one of said plurality of first vibration generators based on a touched position of said touch operation detected by said detecting means and causes said selected vibration generator to generate vibration.

73. An electronic device according to any one of claims 1–14, further comprising:
an operation panel for receiving a touch operation, a plurality of said first vibration generators is disposed so as to transmit vibration to said operation panel;
detecting means for detecting a touched position on said operation panel; and
drive signal generating means for, in a case of detecting that a touch operation to said operation panel has been received, generating a drive signal for driving each of said plurality of first vibration generators so that an amplitude of vibration caused at a touched position in said touch operation detected by said detecting means is amplified as a result of mutual interference of oscillatory waves generated by each of said plurality of first vibration generators, wherein said vibration control means applies the drive signals generated by said drive signal generating means to respective vibration generators to cause said first vibration generators to generate vibration.

74. An electronic device as set forth in claim 73, wherein, in a case of detecting that a touch operation on said operation panel has been received, said drive signal generating means adjusts phases of drive signals for driving said plurality of first vibration generators so that amplitudes of vibration caused at a touched position in said touch operation detected by said detecting means is amplified by mutual interference of oscillatory waves generated by each of said plurality of first vibration generators.

75. An electronic device as set forth in claim 73, wherein, in a case of detecting that a touch operation on said operation panel has been received, said drive signal generating means generates drive signals for driving said plurality of first vibration generators so that amplitudes of vibration caused at said position touched in said touch operation detected by said detecting means become greatest by mutual interference of oscillatory waves generated by each of said plurality of first vibration generators.

76. electronic device according to any one of claims 1–14, further comprising:
an operation panel over which a deformation layer deformable by vibration is laminated, a plurality of said first vibration generators is disposed in such a way as to transmit vibration to said operation panel;
detecting means for detecting a touched position on said operation panel; and
generating means for, in a case of detecting that a touch operation to said operation panel has been received, generating a drive signal for driving each of said plurality of first vibration generators so that, as a result of mutual interference of oscillatory waves generated from said plurality of first vibration generators, a thickness of the deformation layer at said touched position of said touch operation detected by said detecting means becomes greater or lesser than that of a time when no toughing takes place,
wherein said vibration control means applies drive signals generated by said generating means to respective first vibration generators and causes said first vibration generators to generate vibration.

77. An electronic device as set forth in claim 76, wherein said deformation layer is formed using any one of a liquid, gel, or particulate substance.

78. An electronic device as set forth in claim 1, wherein said electronic device is a portable electronic device.

79. An electronic device as set forth in claim 1, wherein the brake means and the vibration control means are controlled simultaneously such that the vibration control means controls the first excitation means to cease causing the vibration approximately simultaneously with the brake means causing the movement of said weight to stop.

80. An electronic device according to claim 1, wherein said brake means comprises:
- at least one movable brake member mounted to an inner surface of said second casing and having a brake surface facing a side surface of said weight;
- at least one drive at a side of said brake member; and
- brake control means for energizing the drive so as to move the brake member.

81. A vibration-type reporting method in an electronic device, said electronic device comprising:
- a first casing, a surface of which comprises a hand-touched portion;
- at least one vibration generator for generating vibration, including:
  - a second casing mounted to an inner surface of said first casing of said electronic device;
  - a weight movably supported by an elastic support member extending vertically from an inner surface of said second casing;
  - excitation generating means for exciting said weight such as to cause it to move reciprocally in a vertical direction relative to the surface of said first casing of said electronic device;
  - brake means to be brought into contact with moved relative to said weight to cause reciprocal movement of said weight caused by said excitation generating means to stop; and
- vibration control means for controlling said excitation generating means to cause, in said vibration generator, vibration which is transmitted via said second casing to the hand-touched portion of said first casing of said electronic device, the method comprising:
- causing said vibration generator to vibrate by causing said weight to reciprocate by said excitation generating means in a case of detecting that an operation input to an operating unit is received, thereby causing the hand-touched portion of said first casing to vibrate by vibration transmitted via said second casing; and
- causing said brake means to stop said weight when said excitation generating means is stopped by said vibration control means.

82. A vibration-type reporting method as set forth in claim 81, further comprising ceasing to cause said vibration generator to vibrate; and
- wherein ceasing to cause said vibration generator to vibrate is performed substantially simultaneously with causing said brake means to stop said weight.

* * * * *